(12) United States Patent
Matsumoto et al.

(10) Patent No.: US 8,237,808 B2
(45) Date of Patent: Aug. 7, 2012

(54) SOLID STATE IMAGING DEVICE AND IMAGING APPARATUS ADJUSTING THE SPATIAL POSITIONS OF PIXELS AFTER ADDITION BY CONTROLLING THE RATIO OF WEIGHT VALUES DURING ADDITION

(75) Inventors: Shizunori Matsumoto, Kanagawa (JP); Yasuaki Hisamatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 954 days.

(21) Appl. No.: 12/005,390

(22) Filed: Dec. 27, 2007

(65) Prior Publication Data
US 2008/0170137 A1 Jul. 17, 2008

(30) Foreign Application Priority Data

Jan. 17, 2007 (JP) .................................. 2007-008104
Nov. 9, 2007 (JP) .................................. 2007-291467

(51) Int. Cl.
*H04N 5/228* (2006.01)
(52) U.S. Cl. .................................................... 348/222.1
(58) Field of Classification Search .................. 348/241, 348/240.2, 333.11, 272; 341/169, 164, 165
See application file for complete search history.

(56) References Cited

U.S. PATENT DOCUMENTS

| | | | | |
|---|---|---|---|---|
| 5,877,715 A * | 3/1999 | Gowda et al. | ............... | 341/122 |
| 6,063,023 A * | 5/2000 | Sakiyama et al. | ............ | 600/118 |
| 6,411,745 B1 * | 6/2002 | Tai et al. | ............... | 382/300 |
| 7,088,279 B2 * | 8/2006 | Muramatsu et al. | .......... | 341/155 |
| 7,315,273 B2 * | 1/2008 | Muramatsu et al. | .......... | 341/164 |
| 7,456,866 B2 * | 11/2008 | Hirose | ............... | 348/222.1 |
| 7,714,904 B2 * | 5/2010 | Kudoh | ............... | 348/230.1 |
| 7,864,237 B2 * | 1/2011 | Muramatsu | ............... | 348/302 |
| 8,054,345 B2 * | 11/2011 | Matsumura | ............... | 348/240.2 |
| 2003/0086007 A1 * | 5/2003 | Sasai | ............... | 348/240.2 |
| 2004/0080641 A1 * | 4/2004 | Hirose | ............... | 348/272 |
| 2006/0012698 A1 * | 1/2006 | Nitta et al. | ............... | 348/308 |
| 2006/0013485 A1 * | 1/2006 | Nitta et al. | ............... | 382/194 |

FOREIGN PATENT DOCUMENTS

JP  2002-185328 A  6/2002
(Continued)

OTHER PUBLICATIONS

JPO Office Action, App. No. 2007-291467, Feb. 3, 2009 (2 pages).

*Primary Examiner* — Jason Chan
*Assistant Examiner* — Gary C Vieaux
(74) *Attorney, Agent, or Firm* — Rader Fishman & Grauer, PLLC

(57) ABSTRACT

There is provided a solid-state imaging device, which includes: a comparator for sequentially comparing a predetermined level of an analog pixel signal obtained from a plurality of pixels with a reference signal which is gradually changed and used for converting the predetermined level into digital data; a counter for performing a count processing in parallel with a comparison processing for the predetermined level in the comparator, and holding a count value at a time of completing the comparison processing to obtain digital data indicative of a value obtained by adding the plurality of pixel signals; and an addition spatial position adjusting unit for controlling a selection operation for selecting spatial positions of the plurality of pixels to be processed in the comparator and a ratio of a weight value during the addition to adjust spatial positions of pixels after addition.

11 Claims, 22 Drawing Sheets

FOREIGN PATENT DOCUMENTS

| | | |
|---|---|---|
| JP | 2004-147092 A | 5/2004 |
| JP | 2004-147094 A | 5/2004 |
| JP | 2005-278135 | 10/2005 |
| JP | 2006-033452 A | 2/2006 |
| JP | 2006-033453 A | 2/2006 |
| JP | 2006-174325 A | 6/2006 |
| JP | 2008-136043 A | 6/2008 |

* cited by examiner

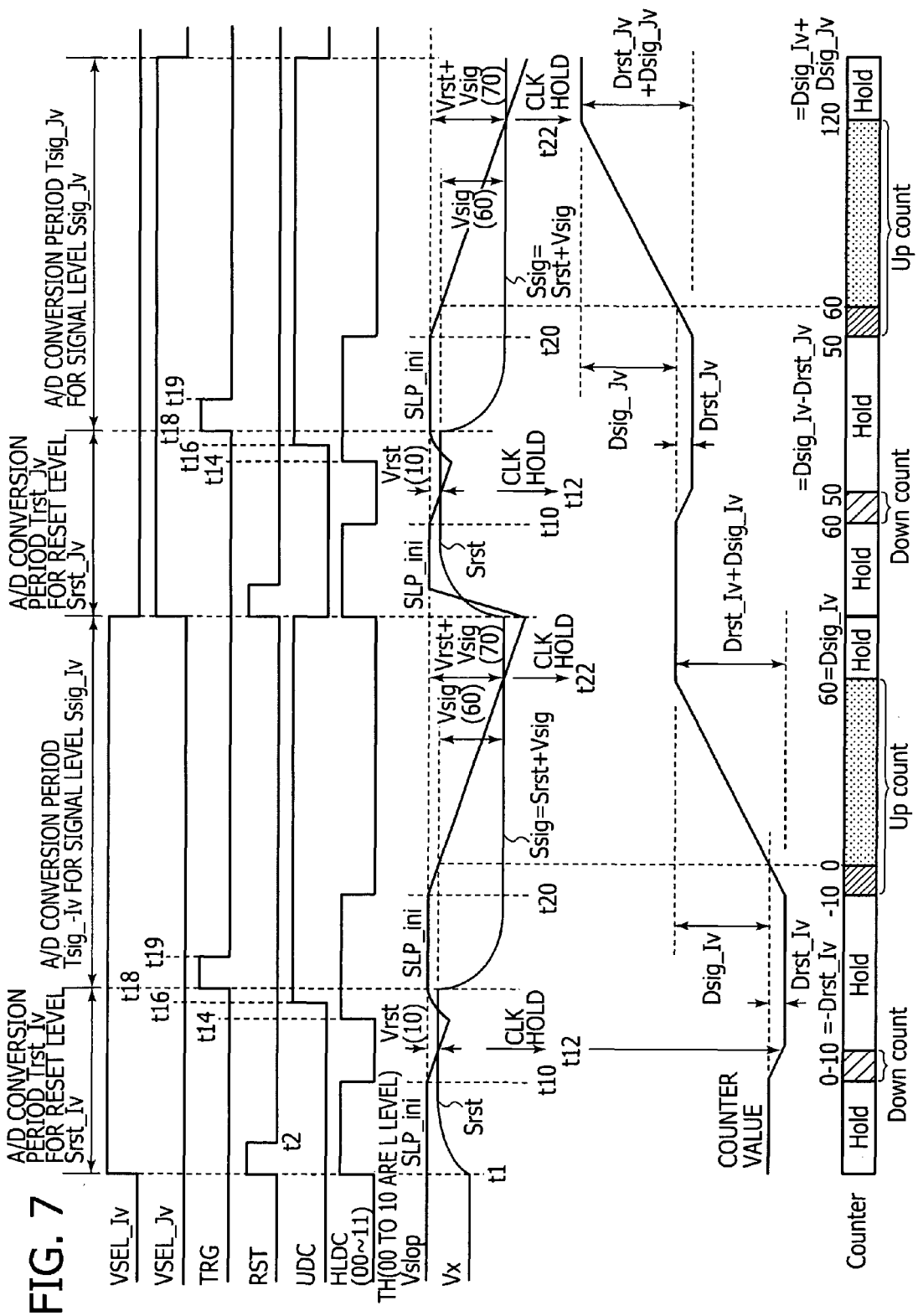

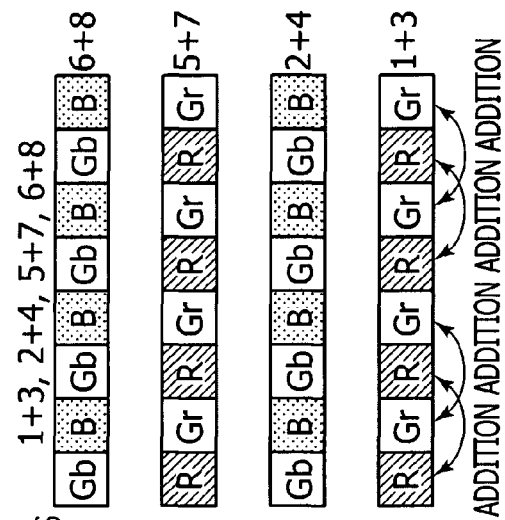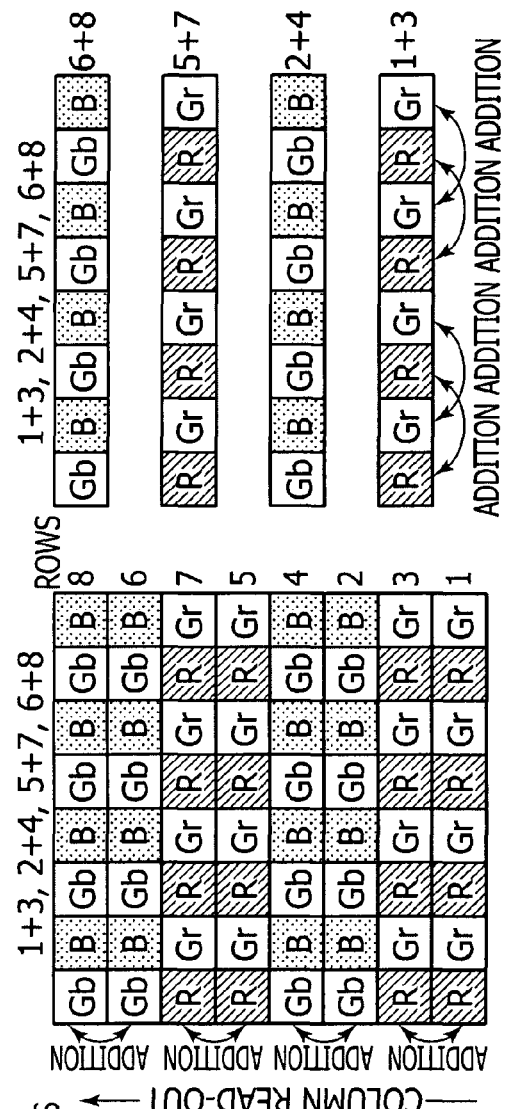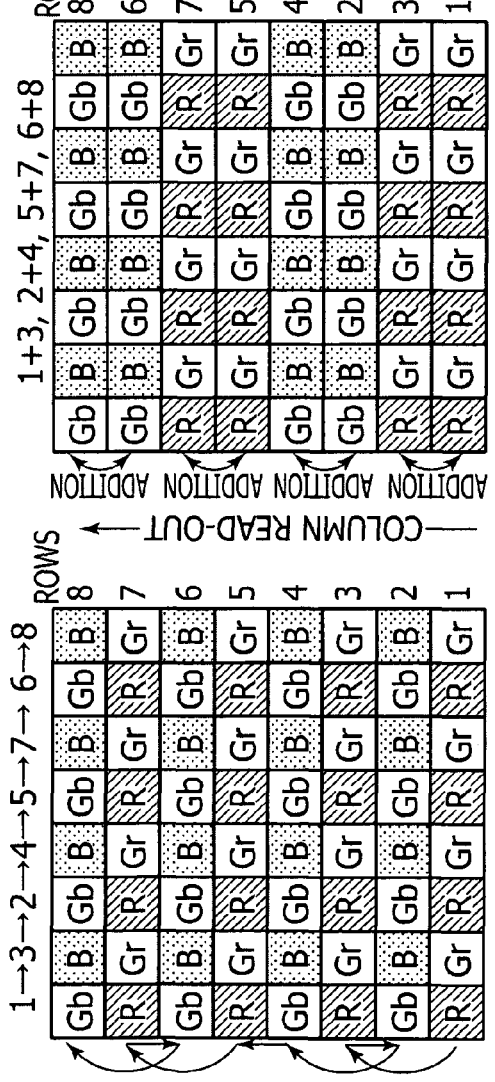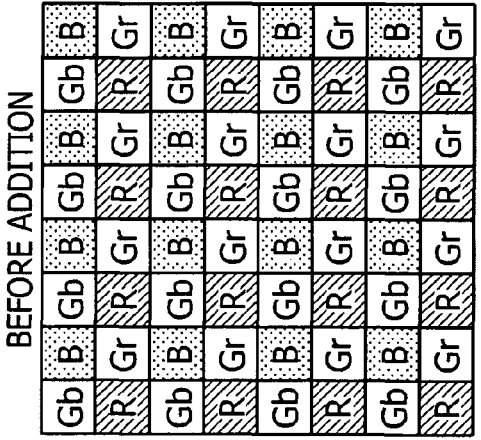

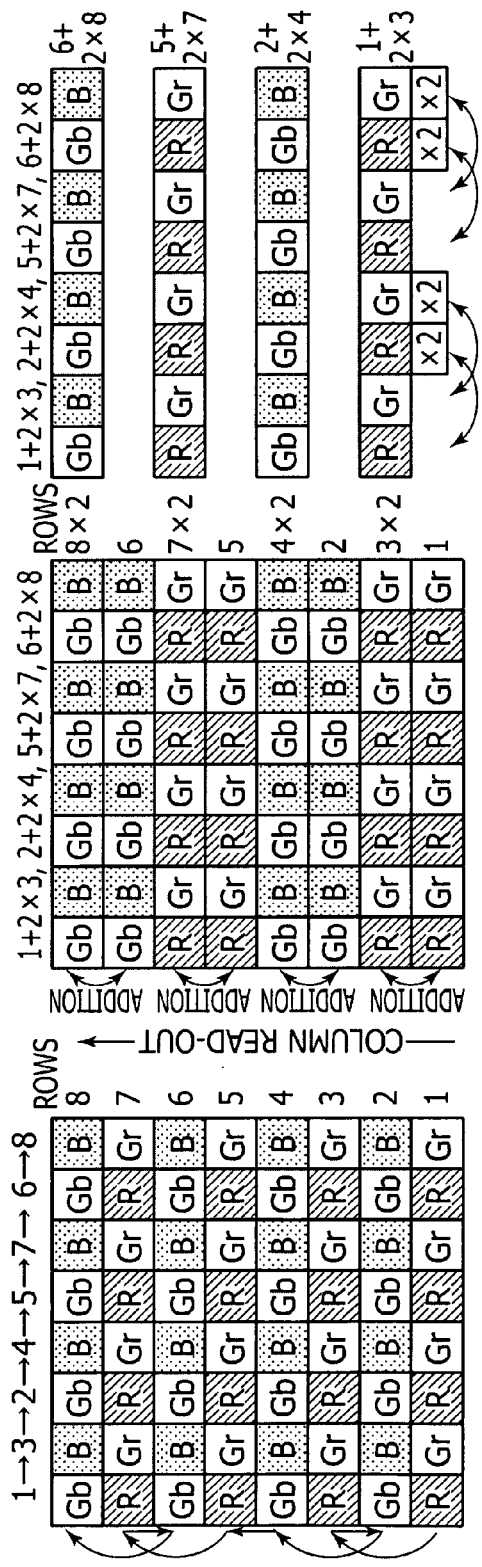
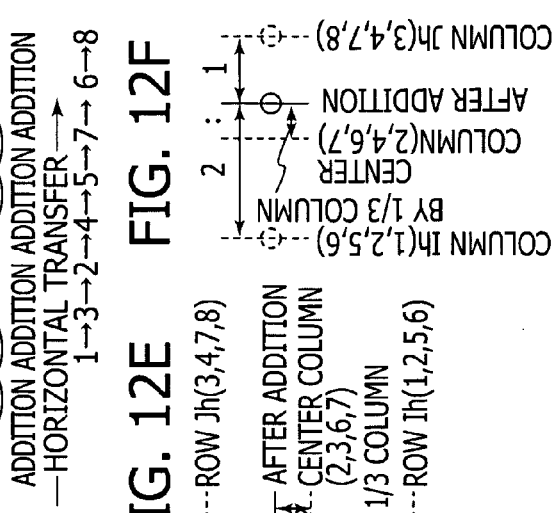

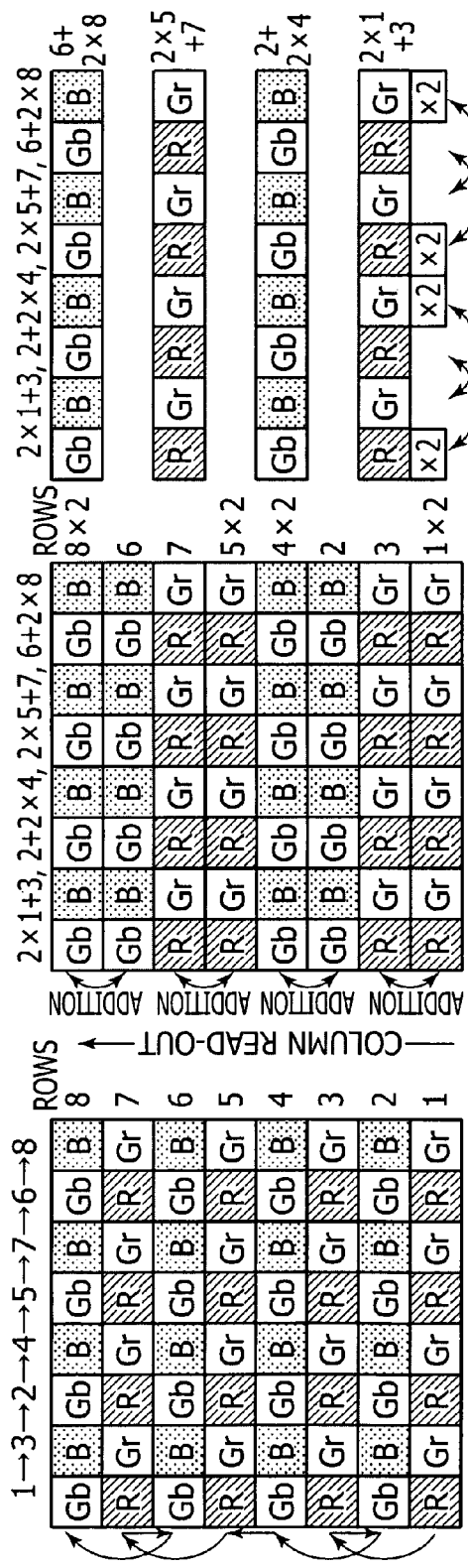
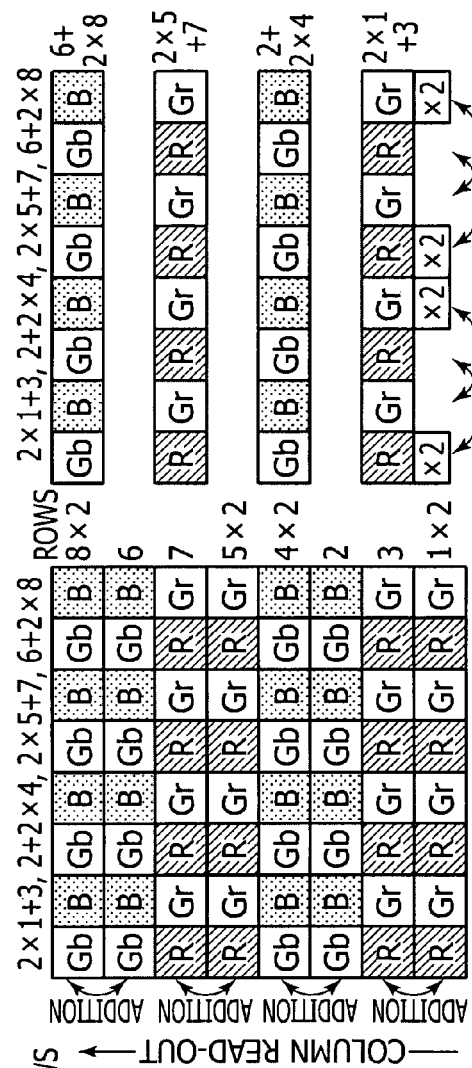
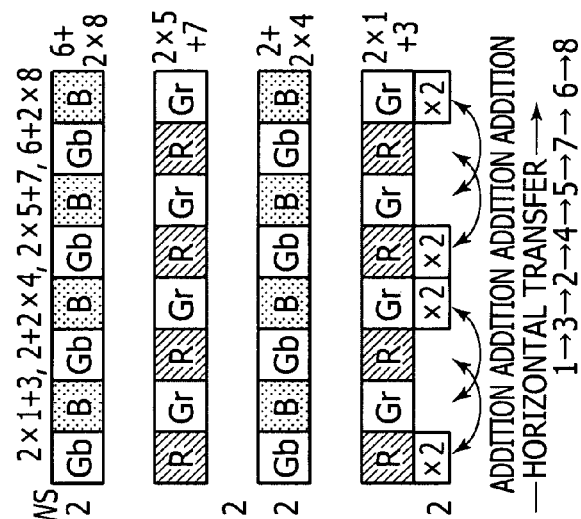
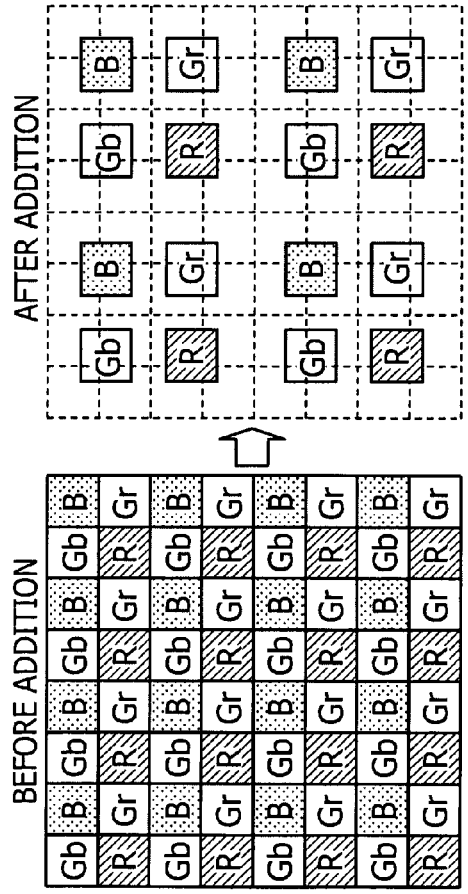
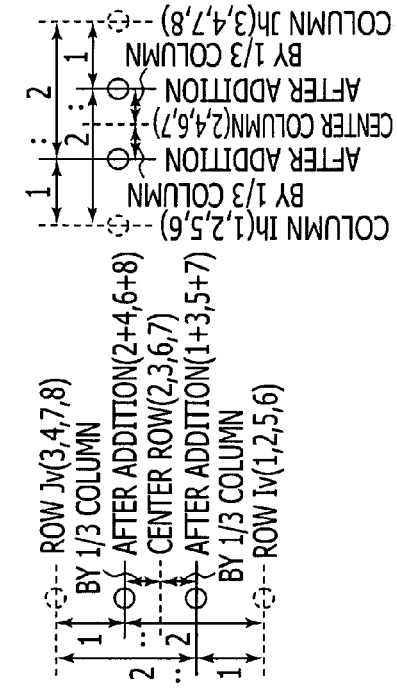

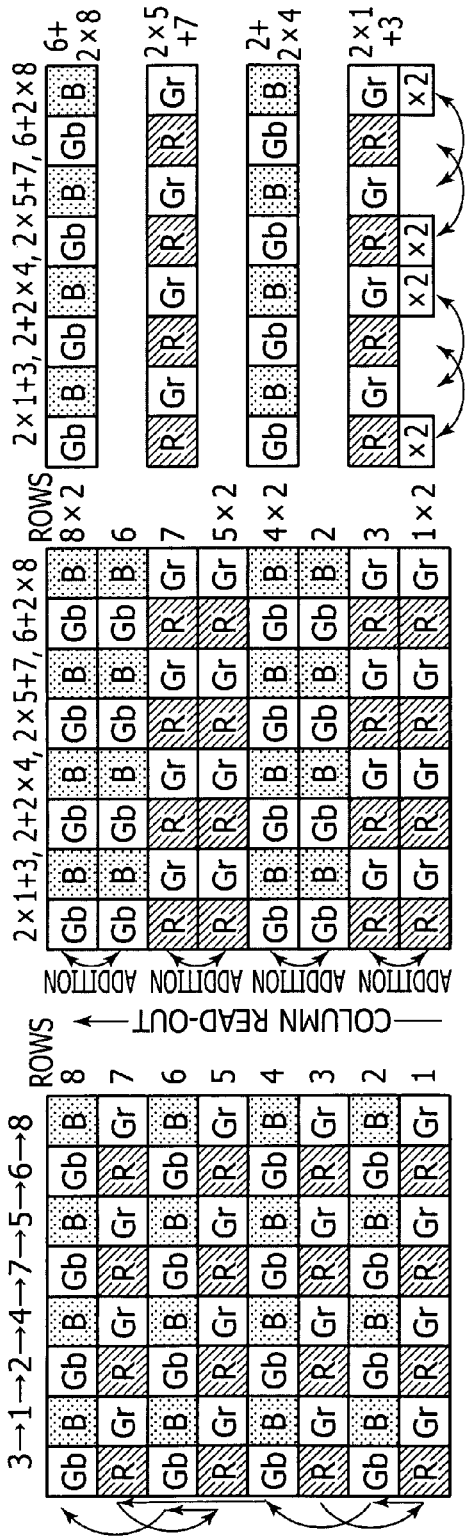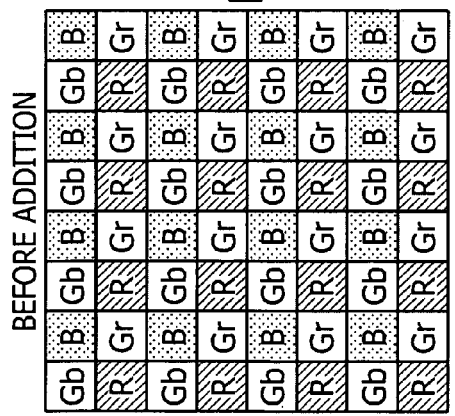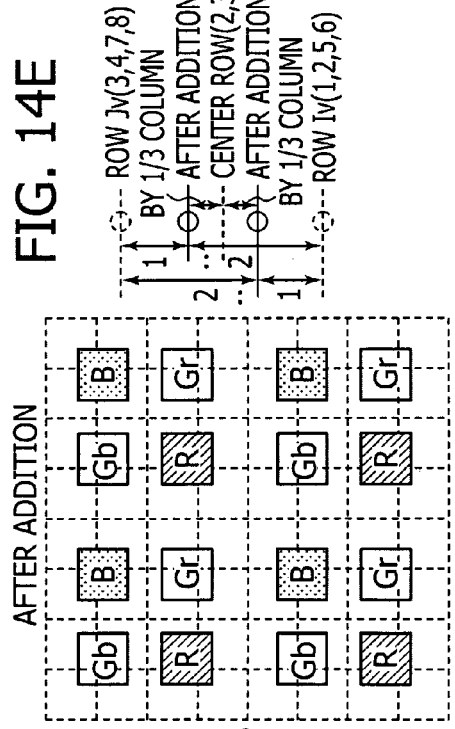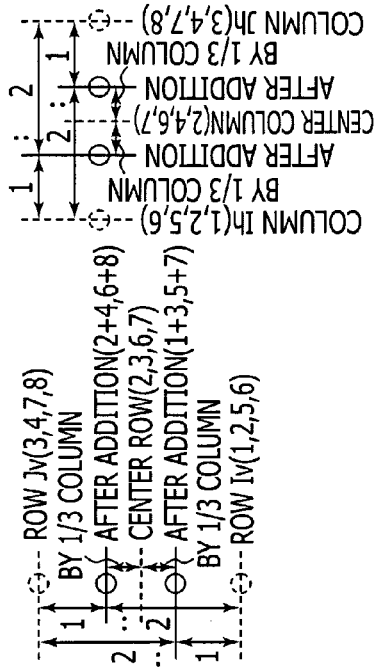

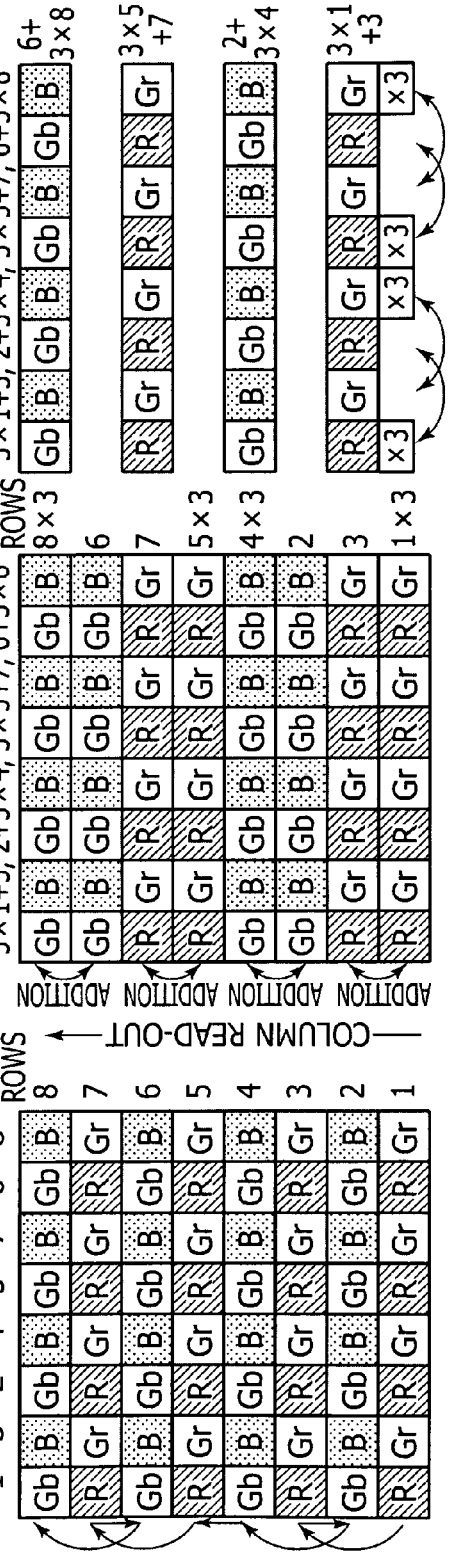
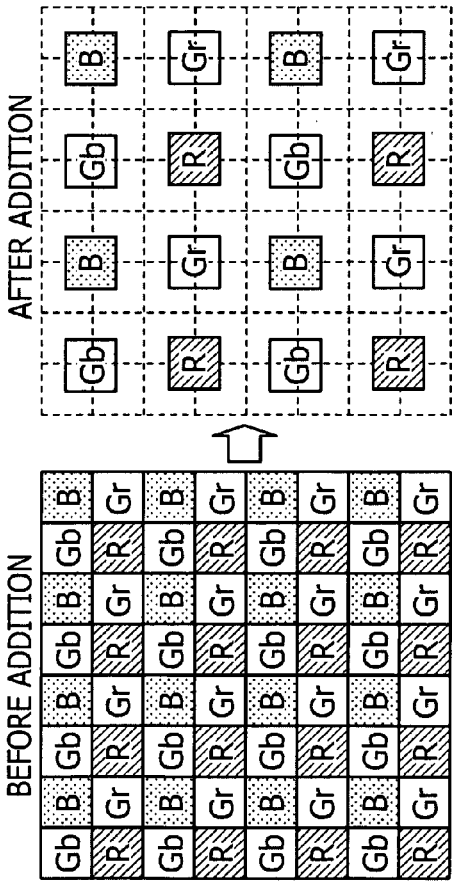
FIG. 16A, FIG. 16B, FIG. 16C, FIG. 16D, FIG. 16E, FIG. 16F

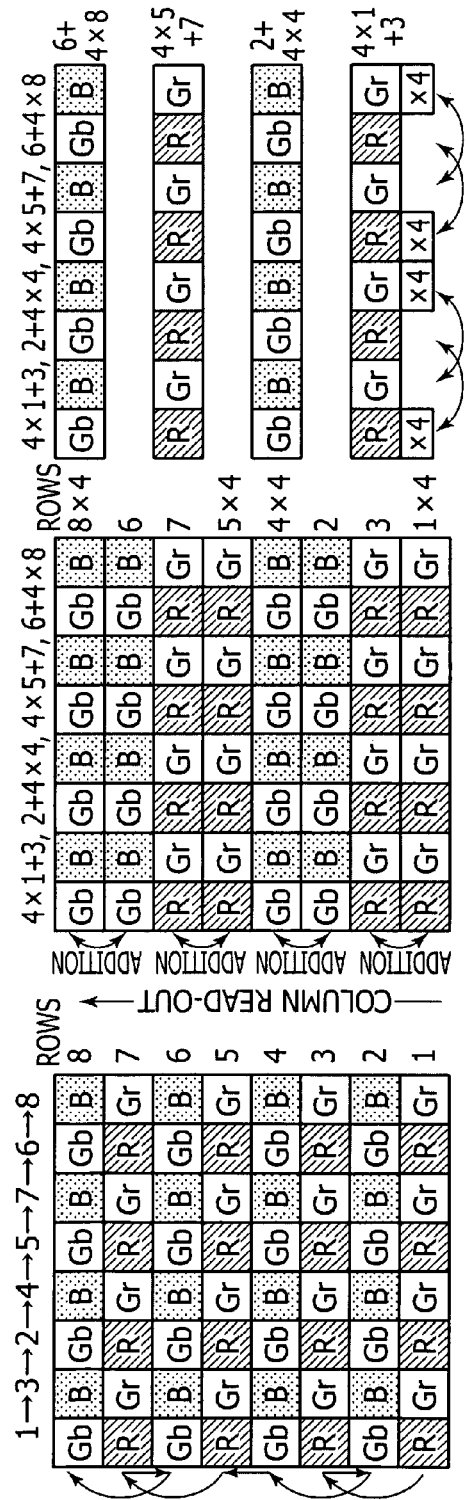
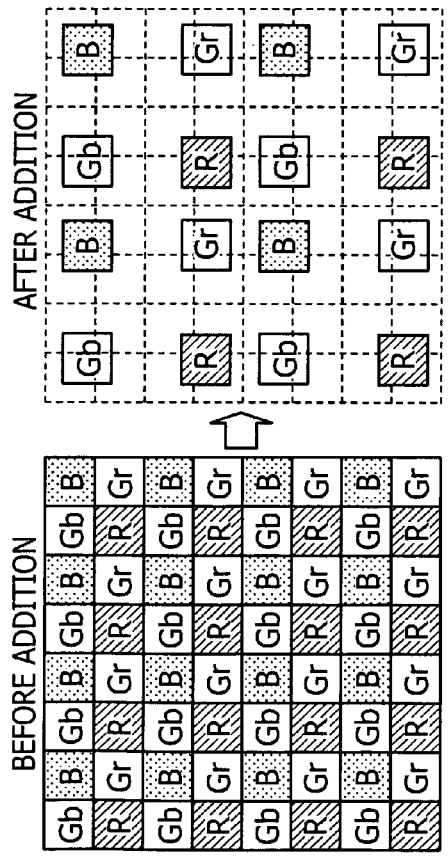

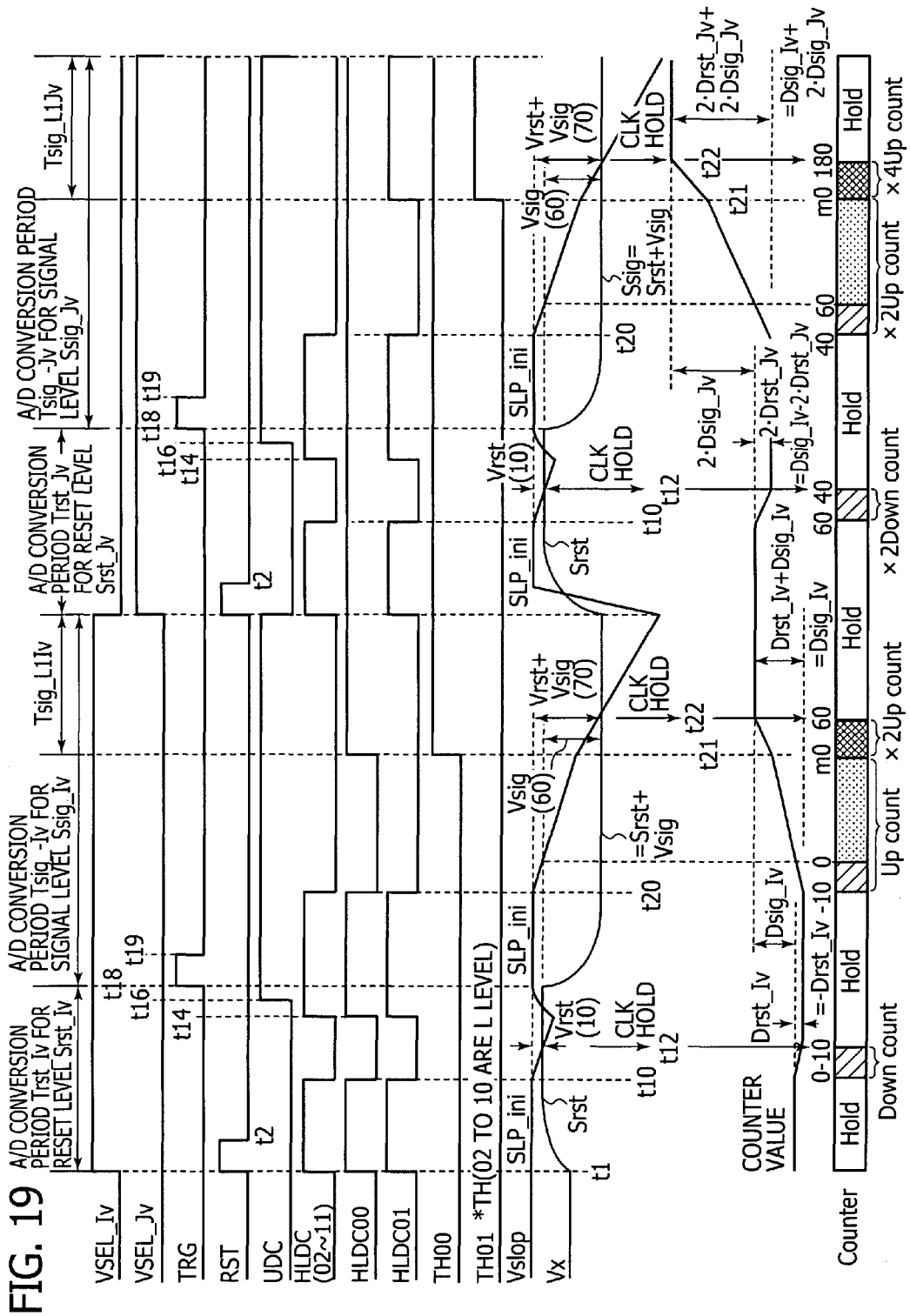

| 1 | 1 | 1 |
|---|---|---|
| 1 | 1 | 1 |
| 1 | 1 | 1 |

| 1 | 2 | 1 |
|---|---|---|
| 2 | 4 | 2 |
| 1 | 2 | 1 |

| 1 | 1 | 1 |
|---|---|---|
| 1 | 2 | 1 |
| 1 | 1 | 1 |

SOLID STATE IMAGING DEVICE AND IMAGING APPARATUS ADJUSTING THE SPATIAL POSITIONS OF PIXELS AFTER ADDITION BY CONTROLLING THE RATIO OF WEIGHT VALUES DURING ADDITION

BACKGROUND OF THE INVENTION

1. Field of the Invention

The present invention relates to a solid-state imaging device and an imaging apparatus, which are examples of a semiconductor device for detecting physical quantity distribution. More specifically, the invention relates to a mechanism including a plurality of arranged unit elements having sensitivity to electromagnetic waves input such as light or radiations from the outside, which reads out a physical quantity distribution converted into an electric signal by the unit elements as an analog electronic signal, converts the analog electronic signal into digital data, and outputs the digital data to the outside.

2. Description of Related Art

In recent years, as an example of solid-state imaging device, a Metal Oxide Semiconductor (MOS) imaging sensor and a Complementary Metal-Oxide Semiconductor (CMOS) imaging sensor have been attracted attention, which are able to solve various disadvantages of a Charge Coupled Device (CCD) imaging sensor.

For example, the CMOS imaging sensor has an amplification circuit for each pixel, such as a floating diffusion amplifier, and when the CMOS imaging sensor reads out pixel signals, as an example of address control, a method of a so-called column parallel output type or a column type is often used, in which one row in a pixel array unit is selected and pixels of the one row are concurrently accessed row by row, that is, all pixels of one row are read out from the pixel array unit, simultaneously and in parallel.

Further, the solid-state imaging device may adopt a method in which an analog pixel signal read out from a pixel array unit is converted into digital data by an Analog Digital Converter (A/D converter) and the digital data is output to the outside.

This is the same as the column parallel output-type imaging sensor, and various types of signal output circuits have been conceived. There has been proposed a method as one of the most advanced type, in which an A/D converter is provided for each column and a pixel signal is output to the outside as digital data (for, example, refer to Japanese Patent Application Publication No. 2005-278135).

Further, as an A/D conversion method, various methods have been considered in terms of the circuit scale, processing speed, and resolution. One of the A/D conversion methods is a so-called single-slope-integrating or ramp-signal-comparison A/D conversion method. In this method, an analog unit signal is compared with a reference signal used for digital signal conversion, and count processing is performed in parallel with this comparison operation. Based on a count value at the time of completing the comparison operation, a digital signal of a unit signal is obtained. This method is also adopted in the above-mentioned patent document.

SUMMARY OF THE INVENTION

There has been considered an operation for addition processing in a solid-state imaging device, such as a digital still camera which is used as a device for converting light into an electric signal to output as an image signal. As an example, the addition processing is used for reducing a number of pixels depending on a case, such that all pixels are read out when capturing still images or pixels are added or thinned when capturing moving images in order to read out at a high-speed, for example.

Since a CMOS imaging sensor converts a pixel signal into an electric signal per pixel, such addition processing function can be easily incorporated therein. The solid-state imaging device disclosed in the above-mentioned patent document also adopts this addition processing system.

However, by performing simple addition processing which makes coefficients of addition object pixels uniform, it is not always possible to obtain an addition image of high resolution due to a relation of spatial positions of pixels after the addition. This is typically because the spatial positions of pixels after addition are not arranged at equal intervals.

The present invention is made in view of the above circumstances, and provides a mechanism capable of obtaining an addition image with high resolution.

In a solid-state imaging device according to an embodiment of the present invention includes: a comparator and a counter. The comparator compares, first, a predetermined level (for example, a reset level or a signal level) of an analog pixel signal obtained from a pixel with a reference signal which is gradually changed and used for converting the predetermined level into digital data. The counter performs a count processing in parallel with the comparison processing by the comparator, and obtains the digital data of the predetermined level by holding a count value at the time of completing the comparison processing. In other words, as a mechanism of the A/D conversion with respect to pixel signals, an A/D conversion system of a so-called single-slope integration type or a ramp-signal comparison type is adopted.

In the mechanism according to the embodiment of the present invention, an addition spatial position adjusting unit is provided. The addition spatial position adjusting unit adjusts the spatial positions of pixels after the addition by controlling a selection operation for selecting the spatial positions of a plurality of pixels to be processed by the comparator and a ratio of weight values during the addition.

The phrase "adjusting the spatial positions of pixels after the addition by controlling the ratio of weight values during the addition" means that the spatial positions of the pixels after the addition are adjusted so that the resolution of the addition image to be higher than a case of performing the simple addition in which each weight value of the addition object pixel is uniform. For that purpose, preferably, the addition spatial position adjusting unit controls the ratio of weight values during the addition so that the spatial positions of each pixel after the addition are arranged at equal intervals.

If pixels are provided with color filters for generating color images, the addition spatial position adjusting unit controls the selection operation for selecting the spatial positions of a plurality of pixels to be processed by the comparator so that the pixels having the same color are added, and controls the ratio of the weight value during the addition so that the spatial positions of each pixel are arranged at equal intervals.

If the spatial position of each pixel after the addition is adjusted by setting an appropriate weight value, the pixel positions after the addition can be arranged at equal intervals in the optimum state. As a result, it is possible to certainly prevent the resolution from lowering or decrease the possibility of resolution lowering, whereas the resolution is sometimes lowered if images are added by the simple addition processing.

The solid-state imaging device may be a one-chip type or a module type having an imaging function, which packages therein an imaging unit, a signal processor or an optical system together.

Further, the present invention is applicable not only for the solid-state imaging device but also for an imaging apparatus. In this case, the imaging apparatus can obtain similar advantages to the case of solid-state imaging device. The imaging apparatus may be, for example, a camera or mobile equipment having an imaging function. In addition, "imaging" is not only for capturing normal images by a camera but includes fingerprint detection in a broad sense.

These and other features and aspects of the invention are set forth in detail below with reference to the accompanying drawings in the following detailed description of the embodiments.

BRIEF DESCRIPTION OF THE DRAWINGS

FIG. 7 is a timing chart illustrating an addition processing in a vertical direction which is performed in parallel with an A/D conversion processing operation;

FIGS. 8A to 8D are diagrams illustrating disadvantages of a digital addition processing in the vertical direction by the counter and a digital addition processing in the horizontal direction by a digital arithmetic unit;

FIGS. 12A to 12F are diagrams (first example) showing a pixel arrangement during an addition operation in the vertical direction and in the horizontal direction in the resolution improving method of the first embodiment;

FIGS. 13A to 13F are diagrams (second example) showing the pixel arrangement during the addition operation in the vertical direction and in the horizontal direction in the resolution improving method of the first embodiment;

FIGS. 14A to 14F are diagrams (third example) showing the pixel arrangement during the addition operation in the vertical direction and in the horizontal direction in the resolution improving method of the first embodiment;

FIGS. 16A to 16F are diagrams showing a case of "the addition in a ratio of 3 to 1+the addition in a ratio of 1 to 3" where a weight value is set to "3";

FIGS. 17A to 17F are diagrams showing a case of "the addition in the ratio of 4 to 1+the addition in the ratio of 1 to 4" where the weight value is set to "4";

FIG. 19 is a timing chart illustrating the addition processing in the vertical direction performed in parallel with the A/D conversion processing, which explains an example of a second embodiment;

DETAILED DESCRIPTION OF THE EMBODIMENTS

Embodiments of the present invention will be hereinafter described in detail with reference to the accompanying drawings. In the following example, it takes a case where a CMOS solid-state imaging device is used as a device, which is an example of an X-Y address type solid-state imaging device. Further, every pixel in the CMOS solid-state imaging device is composed of an NMOS.

However, this is an example and the device is not limited to a MOS imaging device. All embodiments to be described later can be applied to all semiconductor devices for detecting physical quantity distribution, which includes a plurality of unit elements arranged in a line or matrix shape, having sensitivity to light or electromagnetic waves input from the outside.

[Overview of Solid-State Imaging Device]

Figure 1:
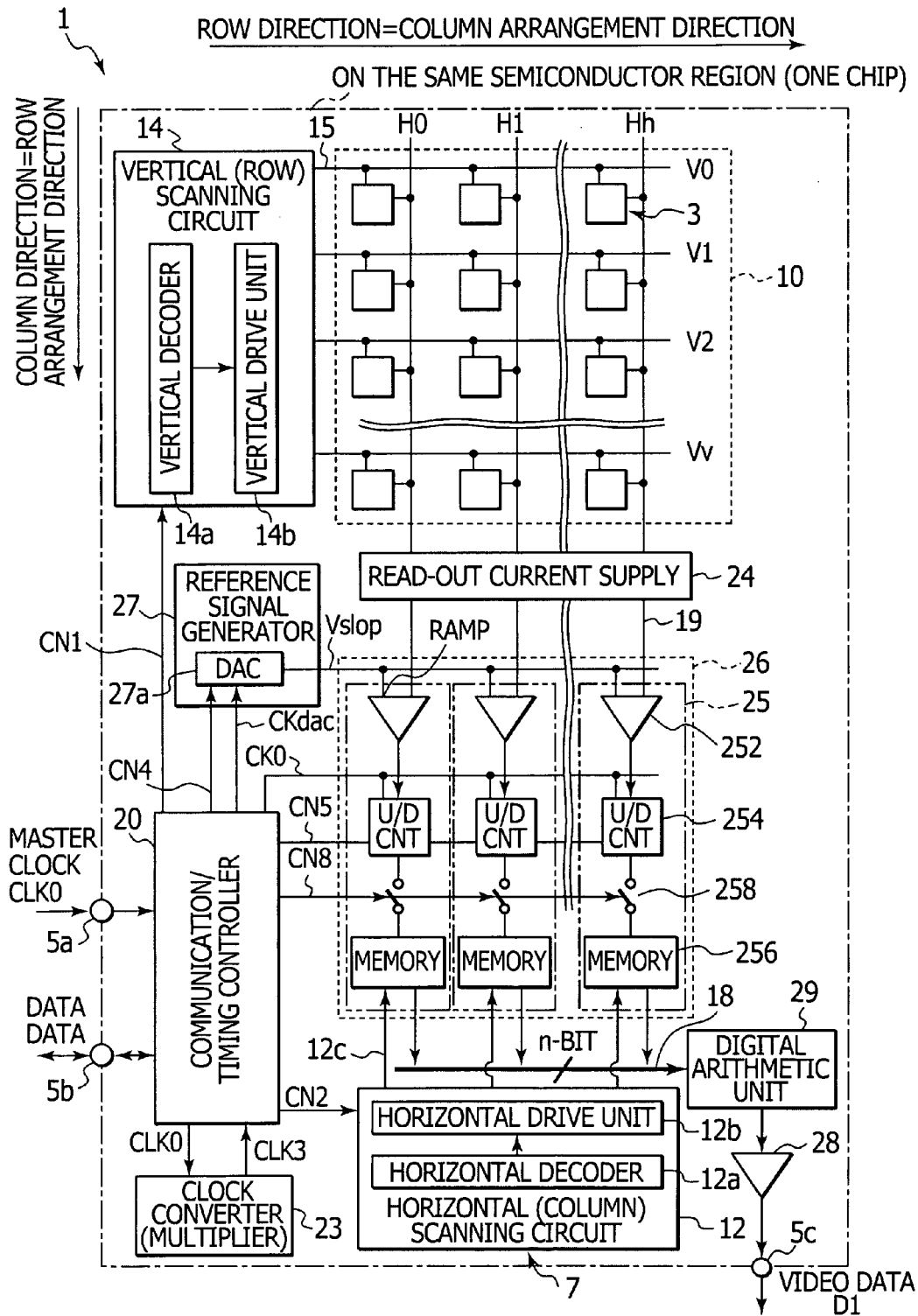
FIG. 1 is a schematic diagram of a CMOS solid-state imaging device according to an embodiment of the present invention.

FIG. 1 is a schematic diagram of a CMOS solid-state imaging device (CMOS imaging sensor) according to an embodiment of the present invention.

A solid-state imaging device 1 has a pixel unit in which a plurality of pixels including light-receiving elements (an example of charge generator), which output a signal corresponding to an incident light amount, are arranged in rows and columns (that is, a two-dimensional matrix shape). A signal output from each pixel serves as a voltage signal. The solid-state imaging device 1 also includes a correlated double sampling (CDS) processing functional unit and an analog digital converter (ADC), which are disposed in a column-parallel manner.

The phrase "CDS processing functional units and ADCs are disposed in a column-parallel manner" means that a plurality of CDS processing functional units and ADCs are provided substantially in parallel with respect to a vertical signal lines (an example of a column signal line) 19 in vertical columns.

A plurality of functional units may be disposed only on the side of one end in the column direction of a pixel array unit 10 (the output side in the lower part of the figure), when the device is viewed in plan. Alternatively, the functional units may be separately disposed on the side of one end in the column direction of the pixel array unit 10 (the output side in the lower part of the figure) and on the other side opposite to the one end (in the upper part of the figure). In the latter case, it is preferable that horizontal scanners for performing read-out scanning (horizontal scanning) in the row direction be disposed on both sides of the pixel array unit 10, so that the horizontal scanners can operate independently.

For example, a typical example having the CDS processing functional units and the ADCs disposed in a column-parallel manner is of a column-type, in which the CDS processing functional units and the ADCs are disposed for each vertical column in a portion referred to as a column region disposed at the output side of an imaging unit, and signals are sequentially read out to the output side. Alternatively, not only the column-type, but one CDS processing functional unit and one ADC may be assigned to a plurality of (for example, two) adjacent vertical signal lines 19 (vertical columns), or one CDS functional unit and one ADC may be assigned to N vertical signal lines 19 (vertical columns) in N other lines (N is a positive integer; there are (N−1) lines between two lines).

Since any of the forms other than the column type has a structure in which one CDS processing functional unit and one ADC are commonly used by a plurality of vertical signal lines 19 (vertical columns), a switch circuit (switch) is provided for supplying pixel signals of a plurality of columns from the pixel array section 10 to one CDS processing functional unit and one ADC. A memory for storing output signals may be necessary depending on the processing at the subsequent stage.

In either case, by assigning one CDS processing functional unit and one ADC to a plurality of vertical signal lines 19 (vertical columns), signal processing can be performed on pixel signals after the pixel signals are read in units of pixel columns. Accordingly, the configuration of each unit pixel can be more simplified than a case of performing a similar signal processing in each unit pixel, and thus, a multi-pixel, smaller, and less expensive image sensor can be implemented.

Additionally, pixel signals in a single row can be simultaneously processed in parallel by a plurality of signal processors disposed in a column-parallel manner. Accordingly, the signal processors can be operated at a lower speed than a case of performing processing by one CDS function and one ADC in an output circuit or outside the device, which is more advantageous in terms of the power consumption, the band performance, noise and the like. In other words, when the power consumption and the band performance are set similarly, the entire sensor can be operated at a higher-speed.

The column type configuration can be operated at a low speed and has advantages on power consumption, band performance and noise as well as a merit of requiring no switching circuit (switch). The following embodiments describe the column type, unless otherwise stated.

As shown in FIG. 1, the solid-state imaging device 1 according to an embodiment of the present invention includes: the pixel array unit 10 in which a plurality of unit pixels 3 are disposed in rows and columns, which is also called a pixel unit or an imaging unit; a drive controller 7 provided outside the pixel array unit 10; a read-out current supply 24 for supplying an operating current (read-out current) for reading out pixel signals to the unit pixels 3 in the pixel array unit 10; a column processor 26 including column A/D circuits 25 disposed in each vertical column; a reference signal generator 27 for supplying a reference signal Vslop used for A/D conversion to the column processor 26; and a digital arithmetic unit 29. These functions are provided on the same semiconductor substrate.

Any reference signal Vslop can be used if it is a signal having a waveform changing linearly with a predetermined slope, and that having a smooth slope-shaped waveform changing smoothly, or a stepped-shaped waveform changing its levels sequentially may be employed.

The column A/D circuit 25 in the present embodiment has functions including an A/D converter that converts a reset level Srst serving as a basic level of a pixel signal So and a signal level Ssig into digital data independently, and a difference processor that performs difference processing between an A/D conversion result of the reset level Srst and an A/D conversion result of the signal level Ssig and obtains digital data of signal components indicated by a difference between the reset level Srst and the signal level Ssig.

In a preceding stage or a subsequent stage of the column processor 26, an Auto Gain Control (AGC) circuit having a signal amplification function can be disposed in the same semiconductor region where the column processor 26 is disposed, if necessary. Analog amplification is performed in the case of AGC in the preceding stage of the column processor 26, whereas digital amplification is performed in the case of AGC in the subsequent stage of the column processor 26. Since the tone is likely to be damaged when n-bit digital data is simply amplified, it may be preferable that data is amplified in analog form and then digitally converted.

The drive controller 7 includes control circuit functions for sequentially reading signals from the pixel array unit 10. For example, the drive controller 7 includes a horizontal scanning circuit (column scanning circuit) 12 having a horizontal decoder 12a and a horizontal drive unit 12b, which controls column addressing or column scanning, a vertical scanning circuit (row scanning circuit) 14 having a vertical decoder 14a and a vertical drive unit 14b, which controls row addressing or row scanning, and a communication/timing controller 20 having a function of generating an internal clock.

In the vicinity of the communication/timing controller 20 in FIG. 1, a clock converter 23, which is an example of a high-speed clock generator generating pulses having a clock frequency faster than an input clock frequency may be disposed. The communication/timing controller 20 generates an internal clock on the basis of an input clock (master clock) CLK0 input through a terminal 5a or a high-speed clock generated in the clock converter 23.

Using a signal based on a high-speed clock generated in the clock converter 23 enables A/D conversion processing at a high-speed. The use of a high-speed clock also makes it possible to perform motion extraction or compression that requires fast computation. It is also possible to convert parallel data output from the column processor 26 into serial data and to output to the outside of the device as video data D1. With this configuration, a high-speed operation can be implemented with a smaller number of terminals than the number of bits of the A/D converted digital data.

The clock converter 23 has a built-in multiplier circuit for generating pulses having a clock frequency higher than the input clock frequency. The clock converter 23 receives a low-speed clock CLK2 from the communication/timing controller 20, and generates a clock having a frequency at least twice as high as the low-speed clock CLK2. If k1 is a multiple of the frequency of the low-speed clock CLK2, a k1 multiplier circuit may be provided for the clock converter 23, and various known circuits can be used as the multiplier circuit.

In FIG. 1, for simplicity of illustration, not all of the rows and columns are shown. In reality, however, several tens of to several thousands unit pixels 3 are disposed in each row or each column to form the pixel array unit 10. Typically, each unit pixel 3 includes a photodiode, which serves as a light receiving element (charge generator), and an in-pixel amplifier having an amplifying semiconductor element (for example, a transistor).

The in-pixel amplifier may be one capable of outputting a signal charge generated and accumulated in the charge generator in the unit pixel 3 as an electric signal, and various structures may be possible for the in-pixel amplifier. Generally used is a floating diffusion amplifier structure. As an example, a floating diffusion amplifier including four transistors provided for a single charge generator, which are generally used in a CMOS-type sensor. The four transistors are: a read-out selection transistor which is an example of a charge read-out unit (transfer gate/read-out gate); a reset transistor which is an example of a reset gate; a vertical selection transistor; and an amplification transistor of a source follower structure which is an example of a detection element for detecting a potential change in a floating diffusion (for example, refer to FIG. 2 to be described later).

Alternatively, it is possible to use a floating diffusion amplifier having three transistors, that is, an amplification transistor connected to a drain line (DRN) for amplifying a signal voltage corresponding to a signal charge generated by the charge generator; a reset transistor for resetting the charge generator; and a read-out selection transistor (transfer gate) scanned by a vertical shift register through a transfer line (TRF).

In the solid-state imaging device 1, the pixel array unit 10 can be made to perform color imaging by using a color separation filter. More specifically, any one of color filters of the color separation filter, which is made of a combination of the color filters having a plurality of colors, is disposed in, for example, a so-called Bayer arrangement, on the light-receiving surface for receiving electromagnetic waves (light in this embodiment) of each charge generator (such as a photodiode) in the pixel array unit 10, thereby enabling color imaging.

If the color filters are arranged in the Bayer arrangement, as shown in the FIG. 8 and FIGS. 12-14, G (green) and R (red) color filters or B (blue) and G (green) color filters are disposed in the same row, so that they are arranged in a two-dimensional lattice shape.

The unit pixel 3 is connected to the vertical scanning circuit 14 through a row control line 15 for selecting a row and to the column processor 26 in which the column A/D circuit 25 is disposed in each vertical column through a vertical signal line 19, respectively. The row control line 15 denotes all the lines entering from the vertical scanning circuit 14 to the pixel.

The horizontal scanning circuit 12 has a function of a read-out scanner for reading out a count value from the column processor 26 to a horizontal signal line 18. An output circuit 28 is provided at the subsequent stage (output side) of the horizontal signal line 18.

If necessary, a digital arithmetic unit 29 may be provided at the preceding stage of the output circuit 28. The phrase "if necessary" means that a case where addition processing is needed with respect to a horizontal direction. Accordingly, the digital arithmetic unit 29 basically has a function of performing the addition processing on data of a plurality of columns with respect to the horizontal direction. In addition, depending on a wire connection to the horizontal signal line 18, a memory is provided for storing data of a plurality of addition object columns. For example, the memory is not required in a case of a wire connection in which a plurality of addition object columns are transmitted to the digital arithmetic unit 29 through the horizontal signal line 18 of individual systems, whereas if a plurality of addition object columns are transmitted through the horizontal signal line 18 of one system, the memory is required to store the data of the addition object columns.

The horizontal scanning circuit 12 sequentially selects the column A/D circuits 25 in the column processor 26 in synchronism with the low-speed clock CLK2, and leads the signal to the horizontal signal line (horizontal output line) 18. For example, the horizontal scanning circuit 12 has the horizontal decoder 12a for defining a read-out column in the horizontal direction (selecting the individual column A/D circuit 25 in the column processor 26), and the horizontal drive unit 12b for leading each signal of the column processor 26 to the horizontal signal line 18 in accordance with the reading address defined by the horizontal decoder 12a. The horizontal signal lines 18 are disposed, for example, for the number of bits n (n is a positive integer) to be handled by the column A/D circuit 25, for example, if it is 10 (=n) bits, 10 lines are disposed corresponding to the number of bits.

Each element of the driving controller 7, such as the horizontal scanning circuit 12 and the vertical scanning circuit 14, are formed integrally with the pixel array unit 10, on a semiconductor region made of a monocrystal silicon or the like, by using a technique similar to a semiconductor integrated circuit manufacturing technique, thereby forming a solid-state imaging device as an example of a semiconductor system.

Those respective function units form a part of the solid-state imaging device 1 in the present embodiment, as a so-called "one-chip type" (provided on the same semiconductor substrate) including each of the function units integrally formed on a semiconductor region made of a monocrystal silicon or the like, by using a technique similar to a semiconductor integrated circuit manufacturing technique, and as a CMOS imaging sensor, which is an example of a semiconductor system.

The solid-state imaging device 1 may be the one-chip type in which respective elements are integrally formed on the same semiconductor substrate or, although it is not shown, may be a module-type having an imaging function, which packages therein an optical system such as a taking lens, an optical low-pass filter, or an infrared light cut filter in addition to the various signal processors such as the pixel array unit 10, the drive controller 7 and the column processor 26.

The horizontal scanning circuit 12 and the vertical scanning circuit 14 include, for example, a decoder, and start a shifting operation (scanning) in response to control signals CN2 and CN1 supplied from the communication/timing controller 20. Accordingly, the row control lines 15 include various pulse signals for driving the unit pixels 3 (for example, a pixel reset pulse RST, a transfer pulse TRG, and a vertical selection pulse VSEL).

Although it is not shown, the communication/timing controller 20 has a function block of a timing generator TG (an example of a read-out address control apparatus) that supplies a clock and a predetermined timing pulse signals necessary for the operation of each unit, and a function block of a communication interface that receives a master clock CLK0 supplied from an external main controller through a terminal 5a, also receives data DATA for instructing an operation mode and the like supplied from the external main controller through a terminal 5b and outputs data including information of the solid-state imaging device 1 to the external main controller.

For example, the communication/timing controller 20 outputs a horizontal address signal to the horizontal decoder 12a, and outputs a vertical address signal to the vertical decoder 14a. Each of the decoders receives the signal and selects the corresponding row or column.

At this time, since the unit pixels 3 are disposed in a two-dimensional matrix, it is preferable to achieve high-speed reading of the pixel signals and pixel data by following procedure: performing (vertical) scan reading in which analog pixel signals generated by a pixel signal generators 5 and output in the column direction through the vertical signal lines 19 are accessed and read in units of rows (in a column-parallel manner), and then, performing (horizontal) scan reading in which pixel signals (digitized pixel data in this example) are accessed in the row direction, which is the arrangement direction of the vertical columns, and are read out to the output side. Of course, not only the scan reading, but random access is also possible by directly designating the address of the unit pixels 3 to be read out so that information only concerning the necessary unit pixels 3 can be read.

The communication/timing controller 20 supplies a clock CLK1 having the same frequency as the master clock CLK0 input through the terminal 5a, a clock obtained by dividing the clock CLK1 by two, or a low-speed clock obtained by further dividing the clock CLK1, to each unit in the device, for example, to the horizontal scanning circuit 12, the vertical scanning circuit 14, and the column processor 26. In the following, the clock obtained by dividing by two or all clocks having lower frequencies than the obtained clock are collectively referred to as a low-speed clock CLK2.

The vertical scanning circuit 14 selects a row of the pixel array unit 10, and supplies a necessary pulse to the selected row. For example, the vertical scanning circuit 14 has the vertical decoder 14a for defining a read-out row in the vertical direction (selecting a row of the pixel array unit 10), and the vertical drive unit 14b for supplying a pulse to the control line 15 for the unit pixel 3 on the reading address (in the row direction) defined by the vertical decoder 14a for driving. The vertical decoder 14a also selects a row for an electronic shutter in addition to defining a read-out row.

In this embodiment, it is possible to selectively perform the A/D conversion operation in accordance with each operation mode, that is, a normal frame mode of progressive scanning for reading out information of all unit pixels 3, and a high-speed frame mode for increasing a frame rate by N times, for example twice the speed, of the normal frame mode.

It is preferable that the horizontal scanning circuit 12 or the vertical scan circuit 14 includes an address decoder to arbitrarily select rows and columns to be processed, in addition to perform the sequential scanning by the horizontal decoder 12a and in the normal frame rate mode, so that an addition read-out operation or a decimation read-out operation can be performed in the high-speed frame rate mode.

In particular, in a case where the color separation filter for capturing color images is provided on each unit pixel 3 in the pixel array unit 10, in the relation to the addition read-out operation, it is preferable that the addition processing can be implemented on the unit pixels 3 having the same color, at least in the vertical scanning circuit 14. In order to perform the addition processing in the vertical direction in parallel with the A/D conversion processing, it is preferable to provide the vertical decoder 14a for selecting an arbitrary control line 15 at least in the vertical scanning circuit 14.

When capturing color images, if the addition processing is performed on the pixels having different color filter elements, a color mixture occurs. On the other hand, if the addition processing is performed on the pixels having the same color, for example, the pixel in odd-numbered rows or in even-numbered rows in the Bayer arrangement, no color mixture occurs.

The phrase "perform the addition processing in the vertical direction in parallel with the A/D conversion processing" means that a counter value obtained as a result of the A/D conversion processing on a last addition processing object row in a plurality of addition processing object rows shows a state in which results of the A/D conversion processing performed on a pixel signal of the unit pixel 3 in a plurality of processing object rows for the addition process are added. In particular, if the CDS processing is performed together with the A/D conversion in a counter 254, the counter value shows an addition result of the pixel signal components. In other words, the phrase means that the addition processing in the vertical direction is performed together with the A/D conversion processing in the column A/D circuit 25.

This is, of course, not essential in principle. It may be possible to perform the addition processing by digital arithmetic processing after a read-out row is read out in the vertical direction by the sequential scanning, using a simple scanning circuit for sequentially selecting read-out rows, instead of using the vertical decoder 14a capable of arbitrarily selecting the read-out row. In this case, however, an external memory (line memories for a plurality of rows) is necessary for storing data of a plurality of addition object rows.

Alternatively, it is also conceivable that a plurality of addition object rows are individually read out and the addition processing performed on them by the digital arithmetic processing, at the outside of the column processor 26. In this case, an external memory (line memories for a plurality of row) is not required, however, there is a disadvantage that the circuit scale becomes large because the column processor 26 (column A/D circuit 25), the reference signal generator 27, the horizontal scanning circuit 12, and the vertical scanning circuit 14 are need to be disposed in each system of a plurality of rows. For example, if the addition processing is performed for two rows, two circuits as above are disposed with the pixel array unit 10 inbetween.

In contrast to the above, if the addition processing in the vertical direction is performed in parallel with the A/D conversion processing in the column A/D circuit 25, there is an advantage that an external memory or a plurality of system column processor 26 is unnecessary. Focusing on this point, the present embodiment adopts a mechanism for performing the addition processing in the vertical direction together with the A/D conversion processing in the column A/D circuit 25.

On the other hand, the addition processing in the horizontal direction for the unit pixels 3 having the same color may be performed by selecting the addition object unit pixels 3 having the same color in the digital arithmetic processing, after reading out in the horizontal direction by the sequential scanning, using a simple sequential scanning circuit for sequentially selecting read-out columns, instead of using the horizontal decoder 12a capable of arbitrarily selecting the read-out column to the output circuit 28. Alternatively, the addition processing may be performed, while enabling appropriate switching of the order of selecting read-out rows by the horizontal decoder 12a so that the components of the addition object unit pixels 3 having the same color are sequentially transferred, after reading out according to the order of selected in the horizontal direction, on the components of the unit pixels having the same color transferred in sequence by the digital arithmetic processing (for example, using a digital arithmetic unit 29).

Further, as described in Japanese Patent Application Publication No. 2005-278135, in specific, the fourth and the fifth embodiments thereof, a configuration may be adopted in which it is possible to implement the addition of pixels, for example, in the odd-numbered columns (for example, a first column and a third column), or in the even-numbered columns (for example, a second column and a fourth column), or in which a combination of columns for pixel addition can be arbitrary switched, by disposing a selection switch for switching a read-out object column between the pixel array unit 10 and the column A/D circuit 25, and by arranging each pair of the column processors 26 (column A/D circuit 25), the reference signal generators 27, the horizontal scanning circuits 12, and the vertical scan circuits 14 so as to sandwich the pixel array unit 10.

In the solid-state imaging device 1 having such configuration, a pixel signal output from the unit pixel 3 is supplied to the column A/D circuit 25 in the column processor 26, per each vertical column, through the vertical signal line 19.

Each column A/D circuit 25 in the column processor 26 receives an analog signal So of the pixel in one row and processes the analog signal So. For example, each column A/D circuit 25 has an analog digital converter (ADC) circuit that converts the analog signal into, for example, a 10-bit digital signal with use of, for example, the low-speed clock CLK2.

The A/D conversion processing performed in the column processor 26 employs a method of performing A/D conversion in parallel for each row on the analog signal stored in parallel for each row by using the column A/D circuits 25 disposed in each column. In this case, the single-slope-integrating (or ramp-signal-comparison) A/D conversion technique is used. Since this technique can implement an AD converter with a simple structure, the circuit scale is not increased even if AD converters are disposed in parallel.

To perform the single-slope integration A/D conversion, a processing object analog signal is converted into a digital signal on the basis of the time period from the start of the conversion until matching a reference signal Vslop and a processing object signal voltage. In principle, a ramp-shaped reference signal Vslop is supplied to a comparator (voltage comparator) and at the same time, counting is started with clock signals. The AD conversion is performed in that counting the clocks until a pulse signal is obtained, which indicates a result of the comparison between an analog pixel signal input through the vertical signal line 19 and the reference signal Vslop.

Further, at this time, by introducing an appropriate circuit, with respect to a pixel signal in a voltage mode input through the vertical signal line 19, it is possible to perform, with the A/D conversion, an operation for removing a difference between a signal level (referred as a noise level or reset level) immediately after resetting the pixel and a true signal level Vsig which corresponds to an amount of light. This operation is equivalent to a so-called CDS processing. In this way, a noise signal component such as a fixed pattern noise (FPN) or reset noise is thus removed.

[Details of Reference Signal Generator and Column A/D Circuit]

The reference signal generator 27 includes a digital analog converter (DAC) 27a. In synchronism with a count clock CKdac, the reference signal generator 27 generates a stepped-shape sawtooth waveform, or ramp waveform, signal (hereinafter, also referred to as a reference signal Vslop) from the initial value represented by control data CN 4 from the communication/timing controller 20, and then supplies the generated stepped-shape sawtooth waveform reference signal Vslop as a reference voltage, or an ADC reference signal, used for A/D conversion to each column A/D circuit 25 in the column processor 26. Although it is not shown, it is preferable to provide a noise suppression filter.

The reference signal Vslop generated on the basis of a multiplied clock (high-speed clock) generated by a multiplier circuit in the clock converter 23 can be changed faster than a case where it is generated based on the master clock CLK0 input through the terminal 5a.

The control data CN4 supplied from the communication/timing controller 20 to the DA converter 27a of the reference signal generator 27 contains information to conform a rate of change of digital data with respect to the time so that the reference signal Vslop for each comparison processing basically has the same rate of change. More specifically, in synchronization with the count clock CKdac, one count value is changed per unit time, and the count value is converted into a voltage signal by a DA converter of a current adding type.

Under control of the communication/timing controller 20, the DA converter 27a of the present embodiment can change (or, make larger, in a specific sense) a change characteristic (a slope, in a specific sense) of the reference signal Vslop during the comparison processing in a voltage comparator 252.

The slope of the reference signal can be adjusted by employing a method of changing a frequency (clock cycle) of the count clock CKdac. For example, while the frequency of the count clock CKdac to be supplied to the DA converter 27a is initially set to the same as that of the count clock CK0, it is preferable that the frequency of the count clock CKdac is made $2^{\wedge}m$ times as fast as that of the count clock CK0 once a predetermined count is reached. In specific, when a first predetermined count is reached, the frequency of the count clock CKdac is made twice as fast as that of the count clock CK0, and when a second predetermined count is reached, the frequency of the count clock CKdac is made four times as fast as that of the count clock CK0.

The method described above is merely one example, and the slope change is not limited to such method. For example, an arbitrary circuit can be used by a method in which, while keeping the cycle of the count clock CKdac supplied to the reference signal generator 27 to be constant, a potential calculated by $y = \alpha - \beta^* x$, where x is the counter value, $\alpha$ is an initial value, and $\beta$ is the slope (rate of change) of the reference signal Vslop contained in the control data CN4, is output, or, a method in which according to the information indicating the slope (rate of change) of the ramp voltage, which is contained in the control data CN4, a change in the voltage $\Delta$SLP for each count clock CKdac is adjusted. The adjustment for the slope of the reference signal Vslop can be implemented by adjusting $\Delta$SLP per clock by changing a current amount of a unit current source in addition to changing the clock cycle.

The column A/D circuit 25 includes the voltage comparator 252 and the counter 254, and has an n-bit A/D conversion function. The voltage comparator 252 compares the reference signal Vslop generated by the D/A converter 27a in the reference signal generator 27 with the analog pixel signal supplied from the unit pixels 3 for each row control line 15 (V0, V1, ... ) through the vertical signal lines 19 (H0, H1, ... ). The counter 254 counts time until the voltage comparator 252 completes the comparison processing, and stores the resulting count.

In the present embodiment, the reference signal Vslop is commonly supplied from the DA converter 27a to the voltage comparators 252 disposed in respective rows, and the comparison processing is performed by using the common reference signal Vslop on a pixel signal voltage Vx to be processed by each voltage comparator 252.

The communication/timing controller 20 has a control function of switching a count processing mode of the counter 254 depending on whether the voltage comparator 252 performs the comparison operation on either the reset level Vrst or the signal component Vsig of the pixel signal. A control signal CN5 is supplied from the communication/timing controller 20 to the counter 254 in each column A/D circuit 25 to instruct the counter 254 to perform a down-counting mode or an up-counting mode.

The stepped-shape reference signal Vslop generated by the reference signal generator 27 is commonly input to one input terminal RAMP of the voltage comparator 252 and to other input terminals RAMP of other voltage comparator 252. To another input terminal of the voltage comparators 252, the vertical signal line 19 of the corresponding vertical column is connected, and the pixel signal voltages from the pixel array unit 10 are individually input. The output signal of the voltage comparator 252 is supplied to the counter 254.

The count clock CK0 is commonly input to a clock terminal CK of the counter 254 and to other clock terminals CK of the other counters 254 from the communication/timing controller 20.

Similar to the reference signal Vslop, the multiplied clock (high-speed clock) generated by the multiply circuit of the clock converter 23 can be used as the count clock CK0. In this case, a higher resolution can be achieved than the case of using the master clock CLK0 input through the terminal 5a.

The counter 254 has the feature in which by the use of a common up/down counter (U/D CNT) regardless of the counting mode, the counting processing can be performed by switching (alternately, in a specific sense) between the down-counting operation and the up-counting operation.

The counter 254, although the configuration thereof is not shown, can be implemented by modifying the wiring arrangement of a data storage unit 256 configured with a latch into a synchronous counter, and the internal counting is performed by receiving a single count clock CK0.

However, use of an asynchronous counter is preferable as the counter 254 in the present embodiment, which outputs a count output value without synchronization with the count clock CK0. Basically, a synchronous counter can also be used, however, in the case of using the synchronous counter, the operation of all the flip-flops, in other words, counter basic elements, is restricted by the count clock CK0. Thus, if a higher frequency operation is required, the use of an asynchronous counter suitable for the high-speed operation is preferable since the operation limit frequency is determined only by the limit frequency of the first flip-flop.

Although the details will be described later, the column processor 26 (particularly, the column A/D circuit 25) and the reference signal generator 27 in the present embodiment have characteristic features as follows: during the high-speed frame rate mode using the addition read-out operation, the frequency of the count clock (referred as a count cycle) for each bit and/or the slope of the reference signal Vslop supplied to the column A/D circuit 25 for each row are/is suitably changed to perform the addition processing in the vertical direction with different weights applied for each row, and accordingly, a spatial position of each color in the vertical direction after the addition can be adjusted at suitable intervals so as to obtain images with high resolution. Preferably, a weighted addition is performed by the digital arithmetic unit 29, not only in the vertical direction, but also in the horizontal direction, so that the spatial position of each color in the horizontal direction after the addition can be adjusted at suitable intervals to obtain images with high resolution.

More specifically, during the addition processing, by performing a weighted digital addition processing to vary the weights of the addition object pixels, the pixel center after the addition does not become the centroid in the vertical direction or horizontal direction, but shifts to the side to which a larger weight is applied.

The phrase "to vary the weights of the addition object pixels" means that, in each of the vertical direction and the horizontal direction, at least one pixel of the addition object pixels has a weight different from that of other pixels. For example, if the addition processing for two pixels, respective weights may be set in a ratio of 1 to n (n is more than 1). Preferably, n is a positive integer more than 2 or an arbitrary value, such as 2, 3, 4, . . . and so on, and more preferably, n is a power of two, such as 2, 4, 8, . . . and so on.

Further, during the digital addition processing, in terms of the processing time or the dynamic range in particular, it is preferable to adopt a method in which, while keeping the slope of the reference signal Vslop the same when processing for a plurality of addition object rows, the frequency of the counter clock is switched. Considering speeding up the flip-flop for each bit, it is more preferable to adopt a method in which only the flip-flops in the higher-order bit or in the lower-order bits are made to operate at a high-speed, instead of making the flip-flops for all bits to operate at a high-speed.

A control pulse is input to the counter 254 from the horizontal scanning circuit 12 through the control line 12c. The counter 254 has a latch function for holding a count result, and thus holds a counter value until receiving a control pulse as an instruction through the control line 12c.

At each output side of the column A/D circuits 25, an output from the counter 254, for example, can be connected to the horizontal signal line 18. Alternatively, as shown in the drawing, a data storage unit 256, which serves as an n-bit memory, for storing the count result held in the counter 254, and a switch 258 disposed between the counter 254 and the data storage unit 256 can be arranged in the subsequent stage of the counter 254.

If the configuration including the data storage unit 256 is adopted, a memory transfer instruction pulse CN8 serving as a control pulse is commonly supplied from the communication/timing controller 20 to the switch 258 and to other switches 258 in other vertical column at a predetermined timing. Upon receiving the memory transfer instruction pulse CN8, the switch 258 transfers the count value of the corresponding counter 254 to the data storage unit 256. The data storage unit 256 holds/stores the transferred count value.

The mechanism of storing the count value of the counter 254 to the data storage unit 256 at a predetermined timing is not limited to the configuration having the switch 258 disposed between them. For example, the mechanism can be realized by adopting a configuration in which the counter 254 is directly connected to the data storage unit 256 and an output enable of the counter 254 is controlled by the memory transfer instruction pulse CN8, or, a configuration in which the memory transfer instruction pulse CN8 is used as a latch clock to determine a data acquiring timing of the data memory 256.

The data storage unit 256 receives a control pulse from the horizontal scanning circuit 12 through the control line 12c. The data storage 256 stores the count value acquired from the counter 254, until receiving the control pulse as the instruction through the control line 12c.

The horizontal scanning circuit 12 has a function as a read-out scan unit, and reads out the count value stored in each data storage unit 256 in parallel with the processes in charge of each voltage comparator 252 and the counter 254 in the column processor 26.

The output of the data storage unit 256 is connected to the horizontal signal line 18. The horizontal signal line 18 has an n-bit width signal line that is the bit width of the column A/D circuit 25, and is connected to the output circuit 28 through n number of sense circuits corresponding to respective output lines, which are not shown.

Particularly, if the data storage unit 256 is included in the configuration, the count result stored by the counter 254 can be transferred to the data storage unit 256. Thus, the counting operation of the counter 254, that is, the A/D conversion processing, and the read-out operation of the count-result to the horizontal signal line 18 can be controlled independently, so that a pipeline operation is realized, in which the A/D conversion processing and the signal read-out operation to the outside can be conducted in parallel with each other.

In such configuration, the column A/D circuit 25 performs the counting operation during a pixel signal read-out period corresponding to a horizontal blanking period, and outputs the count result at a predetermined timing. More specifically, first, the voltage comparator 252 compares the ramp waveform voltage supplied from the reference signal generator 27 with a pixel-signal voltage input through the vertical signal line 19, and when both of the voltages become equal to each other, a comparator output of the voltage comparator 252 is inverted. For example, the voltage comparator 252 shifts an H level of a source potential set to be inactive, to an L level (active state) when the pixel signal voltage and the reference signal Vslop become equal to each other.

The counter 254 starts the counting operation in the down-counting mode or the up-counting mode in synchronization with the ramp waveform voltage supplied from the reference signal generator 27, and when receiving information of the comparator output inversion, the counter 254 stops the counting operation and latches (holds/stores) the count value as pixel data at that time, thereby completing the A/D conversion.

After that, the counter 254 sequentially outputs the stored/held pixel data to the outside of the column processor 26 or the outside of the chip having the pixel array unit 10 through an output terminal 5c on the basis of a shifting operation by a horizontal selection signal CH(i) input from the horizontal scanning circuit 12 through the control line 12c at a predetermined timing.

Other various signal processing circuits may be contained in the elements forming the solid-state imaging device 1, though they are not shown since they are not directly related to this embodiment.

[Pixel Unit]

Figure 2:
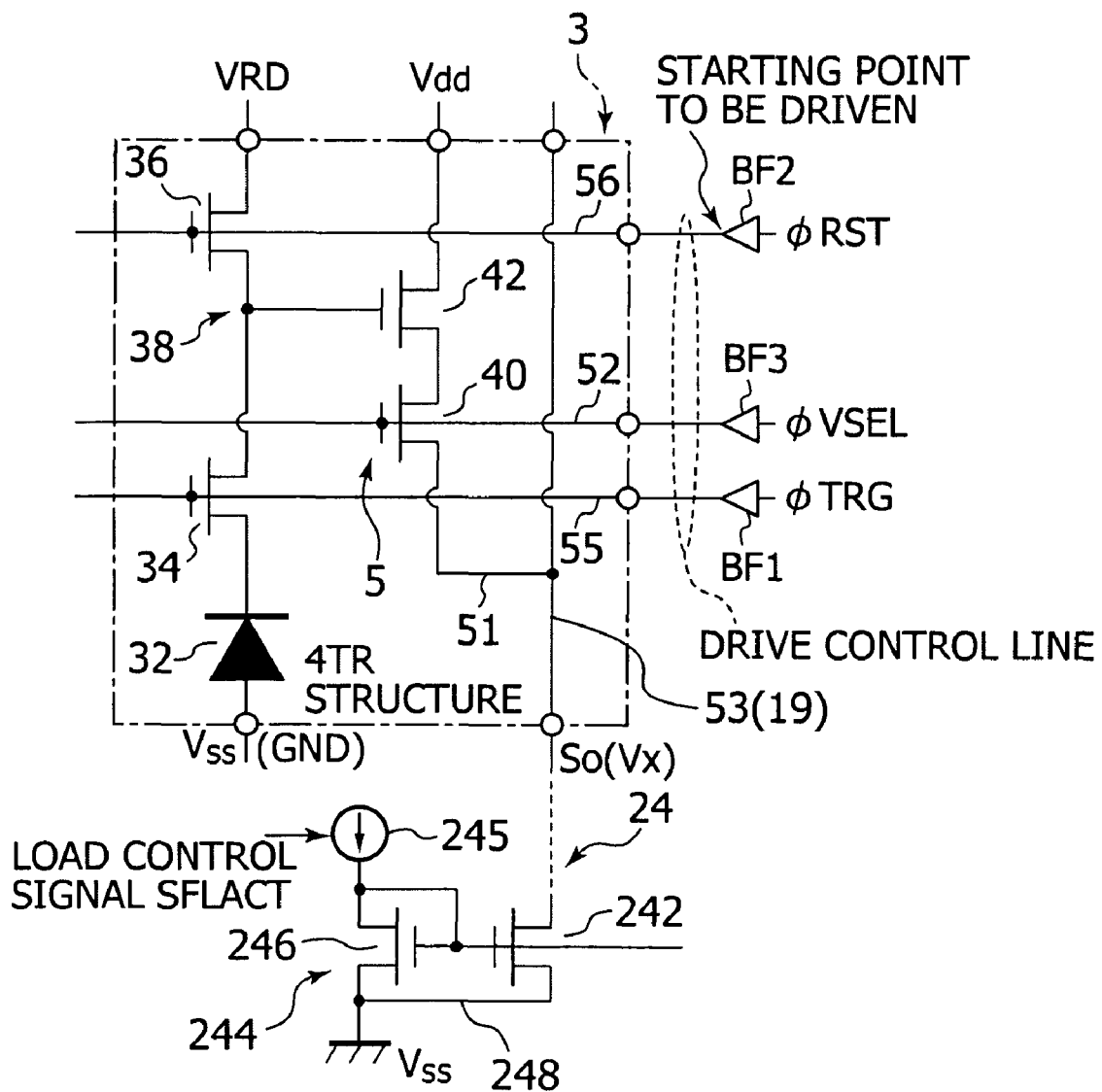
FIG. 2 is a diagram showing a configuration example of a unit pixel used in the solid-stage imaging device shown in FIG. 1 and a wire connection between drive units, drive control lines, and pixel transistors.

FIG. 2 shows a configuration example of the unit pixel 3 used in the solid-stage imager 1 shown in FIG. 1 and the wire connection between drive units, drive control lines, and pixel transistors. The structure of each unit pixel (pixel cell) 3 in the pixel array unit 10 is similar to that of a general CMOS image sensor. In this embodiment, a 4TR structure generally used in a CMOS sensor or a 3TR structure including three transistors can be used. Needless to say, these pixel structures are only examples, and any structure can be used as long as it is an array structure used in a general CMOS image sensor.

As an in-pixel amplifier, for example, a floating diffusion amplifier can be used. As an example, an in-pixel amplifier having four transistors (hereinafter, referred to as a "4TR structure"), which is generally used in a CMOS sensor, can be used for each charge generator. The 4TR structure includes a read-out selection transistor which is an example of a charge read-out unit (transfer gate/read-out gate), a reset transistor which is an example of a reset gate, a vertical selection transistor, and a source-follower amplifying transistor which is an example of a detector for detecting a change in potential of the floating diffusion.

For example, the unit pixel 3 having the 4TR structure shown in FIG. 2 includes a charge generator 32 and four transistors connected thereto. In specific, the charge generator 32 has a charge accumulation function for accumulating the electric charge as well as a photoelectric conversion function for receiving light and converting the received light into an electric charge. The four transistors includes a read-out selection transistor (transfer transistor) 34 which is an example of a charge read-out unit (transfer gate/read out gate), a reset transistor 36 which is an example of a reset gate, a vertical selection transistor 40, and a source-follower amplifying transistor 42 which is an example of a detector for detecting a change in potential of the floating diffusion 38.

The unit pixel 3 includes a floating diffusion amplifier (FDA) pixel signal generator 5 including the floating diffusion 38. The floating diffusion is an example of a charge injection unit having a charge accumulation function, and is a diffusion layer having a parasitic capacitance.

The read-out selection transistor (second transfer unit) 34 is driven through a transfer line (read-out selection line TX) 55 by a transfer driving buffer BF1 to which a transfer signal φTRG is supplied. The reset transistor 36 is driven through a reset line (RST) 56 by a reset driving buffer BF2 to which a reset signal φRST is supplied. The vertical selection transistor 40 is driven through a vertical selection line (SEL) 52 by a selection driving buffer BF3 to which a vertical selection signal φVSEL is supplied. Each of the driving buffers can be driven by the vertical drive circuit 14b in the vertical scanning circuit 14.

The reset transistor 36 in the pixel signal generator 5 is connected at its source to the floating diffusion 38 and at its drain to a power supply VRD (may be common with a power supply Vdd), and a pixel reset pulse RST is input to the gate (reset gate RG) from the reset driving buffer BF2.

As an example, the vertical selection transistor 40 is connected at its drain to the source of the amplifying transistor 42, at its source to a pixel line 51, and at its gate (particularly referred to as the "vertical selection gate SELV") to the vertical selection line 52. However, the wiring configuration is not limited to the above, the vertical selection transistor 40 may be connected at its drain to the power supply Vdd and at its source to the drain of the amplifying transistor 42, and the vertical selection gate SELV may be connected to the vertical selection line 52.

The vertical selection signal φVSEL is applied to the vertical selection line 52. The amplifying transistor 42 is connected at its gate to the floating diffusion 38, at its drain to the power supply Vdd through the vertical selection transistor 40, and at its source to the pixel line 51 and to a vertical signal line 53 (19).

Further, one end of the vertical signal line 53 extends toward the column processor 26, and the vertical signal line 53 is connected to the read-out current supply 24 on the path toward the column processor 26, thereby forming a source follower configuration in which a substantially constant operating current (read-out current) is supplied between the vertical signal line 53 and the amplifying transistor 42.

Specifically, the read-out current supply 24 includes an NMOS transistor (particularly referred to as a "load MOS transistor") 242 disposed in each vertical column, and a reference current source 244 including a current generator 245 shared by all the vertical columns and an NMOS transistor 246 whose gate and drain are commonly connected and whose source is connected to a source line 248.

Each load NMOS transistors 242 is connected at its drains to the corresponding vertical signal lines 53 disposed in the columns and its source is commonly connected to the source line 248 serving as a ground line. Accordingly, the gate of the load MOS transistor 242 disposed in each vertical column is connected to the gate of the NMOS transistor 246 to form a current mirror circuit, which functions as a current source to the vertical signal line 19.

The source line 248 is connected at its ends in the horizontal direction (vertical columns shown on the left and right of FIG. 1) to ground (GND) which is a substrate bias. The operating current (read-out current) with respect to the grounding of the load NMOS transistor 242 is supplied from both left and right ends of the chip.

A load control signal SFLACT for allowing the current generator 245 to output a predetermined current only when necessary is supplied from a not-shown load controller to the current generator 245. When reading out a signal, the current generator 245 having received an active load control signal SFLACT continuously allows a predetermined constant current to flow using the load NMOS transistor 242 connected to the amplifying transistor 42. In other words, the load NMOS transistor 242 supplies the read-out current to the amplifying transistor 42 by forming a source follower together with the amplifying transistor 42 disposed in a selected row, thereby outputting a signal to the vertical signal line 53.

In the 4TR structure described above, since the floating diffusion 38 is connected to the gate of the amplifying transistor 42, the amplifying transistor 42 outputs a signal corresponding to a potential (hereinafter referred to as an "FD potential") of the floating diffusion 38 in a voltage mode through the pixel line 51 to the vertical signal line 53 (19).

The reset transistor 36 resets the floating diffusion 38. The read-out selection transistor (transfer transistor) 34 transfers the signal charge generated by the charge generator 32 to the floating diffusion 38. Many pixels are connected to the vertical signal line 19, and in order to select a pixel, only the vertical selection transistor 40 in a selected pixel is switched on. Accordingly, only the selected pixel is connected to the vertical signal line 19, and a signal of the selected pixel is output to the vertical signal line 19.

[Interface Example Between the Voltage Comparator and the Counter]

Figure 3:
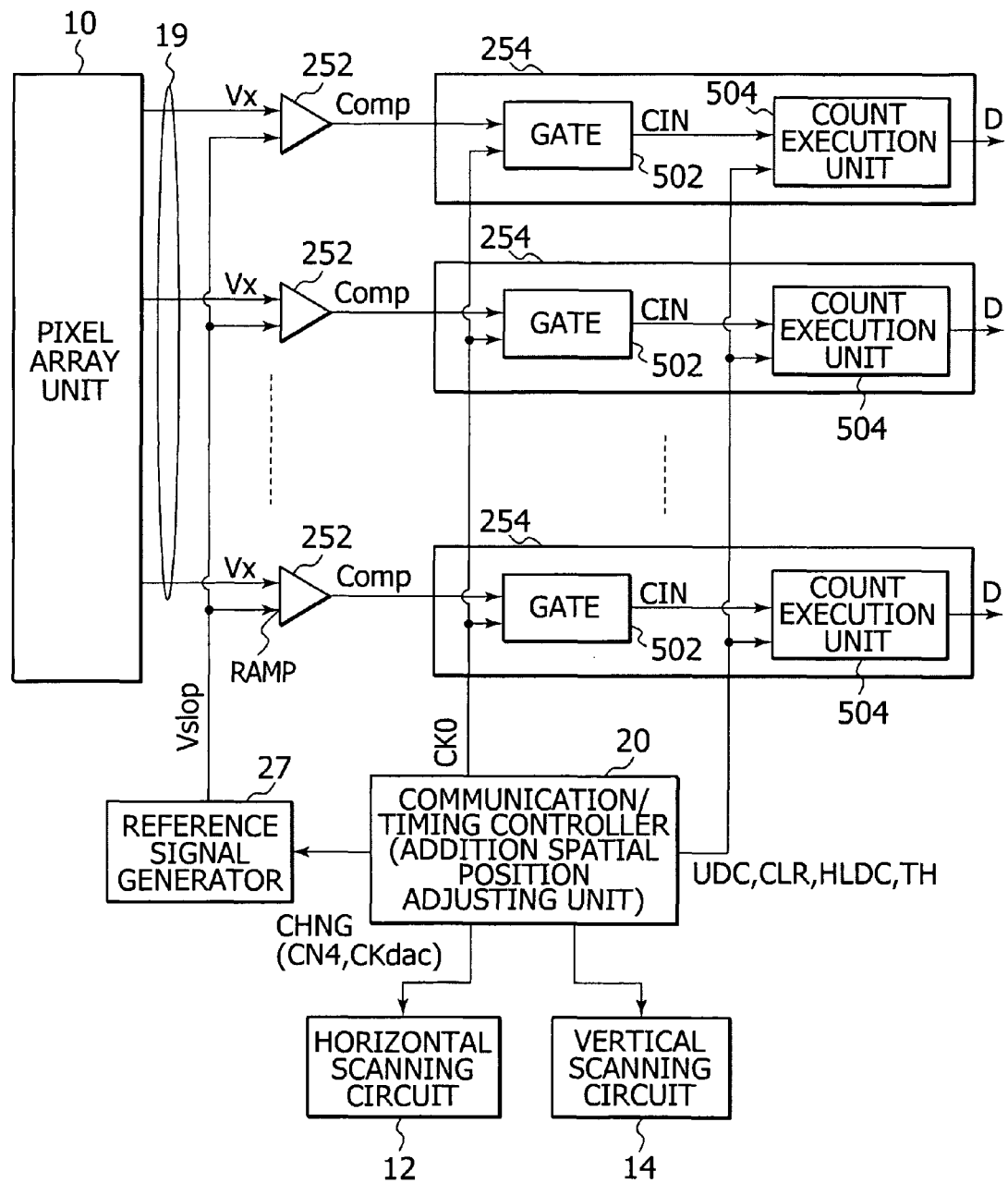
FIG. 3 is a diagram illustrating an example of a connection interface around a voltage comparator and a counter section.

FIG. 3 is a diagram illustrating an example of a connection interface around the voltage comparator 252 and the counter 254.

The voltage comparator 252 in each column corresponding to the vertical signal line 19 inverts a comparator output Comp to an active state (for example, a low level) from an inactive state (for example, a high level) when the pixel signal voltage Vx read out from the pixel array unit 10 and the reference signal Vslop supplied from the reference signal generator 27 are matched.

The counter 254 includes a gate 502 for controlling (gating) an output of the count clock CK0 on the basis of the comparator output Comp from the voltage comparator 252 and a count execution unit 504 for performing an counting operation on the basis of a count clock CIN from the gate 502.

The communication/timing controller 20A supplies a slope change instruction signal CHNG to the reference signal generator 27, and a count mode control signal UDC, a reset control signal CLR, a data holding control pulse HLDC, and a count clock control signal TH to the count execution unit 504, respectively.

As the slope change instruction signal CHNG, a signal suitable for the configuration according to which the DA conversion circuit 27a changes the slope of the reference signal Vslop is used. As an example, the slope change instruction signal CHNG may be the count clock CKdac capable of appropriately switching a frequency (clock cycle), or may be contained in the control data CN4 as a slope of the reference signal Vslop (rate of change) β.

The communication/timing controller 20 can adjust a timing of changing the slope of the reference signal Vslop and a timing of the changing the count cycle of the counter 254 (count execution unit 504), independently. The communication/timing controller 20 has also a function of an addition spatial position adjusting unit that adjusts a spatial position of a pixel after the addition, by controlling the vertical scanning circuit 14 to control a selection operation for selecting a spatial positions of a plurality of pixels to be processed by the voltage comparator 252, and by controlling a weight value during the addition through adjustment of a frequency dividing speed in the processing for a plurality of rows to be added.

For example, in the addition processing operation of a first embodiment to be described later, in a process for a plurality addition object of rows, the slope of the reference signal Vslop for each row is kept at the same, the count cycle (dividing speed) is switched according to the weight values. As an example, in a case where a large weight is applied to a subsequent row (addition row) than that of a previous row (addition target row), in order to make the count cycle faster by making the higher-order bit flip-flop to operate the frequency dividing operation at a high-speed, the count mode control signal UDC, the reset control signal CLR, the data holding control pulse HLDC, and the count clock control signal TH are supplied to the count execution unit 504 in the counter 254, thereby changing the frequency dividing operation of each bit output to be L-times the speed. If the speed of the frequency dividing operation is changed to L-times the speed, while keeping the slope of the reference signal Vslop at the same, practically, the A/D conversion is performed with an A/D conversion gain of L-times larger. As a result, the addition processing can be performed with a weight of L-times heavier.

Further, in the addition processing operation in a second embodiment to be described later, in addition to the addition processing operation in the first embodiment, even in the processing for one row, at the time of the processing for the signal level Ssig, before the comparison is completed in the comparison processing by the voltage comparator 252, the slope change instruction signal CHNG is supplied to the reference signal generator 27 to change the slope of the reference signal Vslop to be J-times larger. At the same time, the count mode control signal UDC, the reset control signal CLR, the data holding control pulse HLDC, and the count clock control signal TH are supplied to the count execution unit 504 in the counter 254 so that the frequency dividing operation of each bit output in the count execution unit 504 is changed to the dividing speed K-times of (preferably, K-times=J-times) the previous operation.

If the slope of the reference signal Vslop is set J-times larger and the frequency dividing operation is changed to K-times of the speed, practically, the period of the A/D conversion processing is shortened by 1/J-times and the A/D conversion is executed with the A/D conversion gain of K/J-times larger. By setting K-times=J-times, practically, the period of the A/D conversion processing can be shortened by 1/J-times and the A/D conversion gain can be kept at a constant value, so that the linearity of the A/D conversion result is not impaired.

If the L-times weighed row in the addition processing operation of the first embodiment is combined to the above addition processing, it is possible to obtain the A/D conversion result "Vsig1+K·Vsig2" with respect to pixel signals Vsig1 and Vsig2 corresponding to two rows, without impairing respective linearity, while reducing the period of the A/D conversion processing by 1/J-times (=1/K-times).

The communication/timing controller 20 determines on/off timings for the slope change instruction signal CHNG, the count mode control signal UDC, the reset control signal CLR, the data holding control pulse HLDC, and the and count clock control signal TH, in accordance with data DATA supplied from an external main controller.

These on/off timings are determined in accordance with the weight setting in the addition processing operation of the first embodiment. In the addition processing operation of the second embodiment, these on/off timings are determined, on the basis of the relation between a photon shot noise and a quantization noise, depending on the purpose of whether higher accuracy or faster speed.

When the comparator output is the inactive state, the gate 502 transfers the input count clock CK0, as the count clock CIN, without change, to the count execution unit 504, but when the comparator output is inverted to the active state, the gate 502 stops transferring the count clock CK0.

When the count clock CK0 is stopped, the count execution unit 504 stops the counter from operating and holds a count value reflecting the pixel signal voltage Vx at that time, that is, the count execution unit 504 converts the pixel signal voltage Vx into digital data and holds the digital data.

[Counter]

Figure 4:
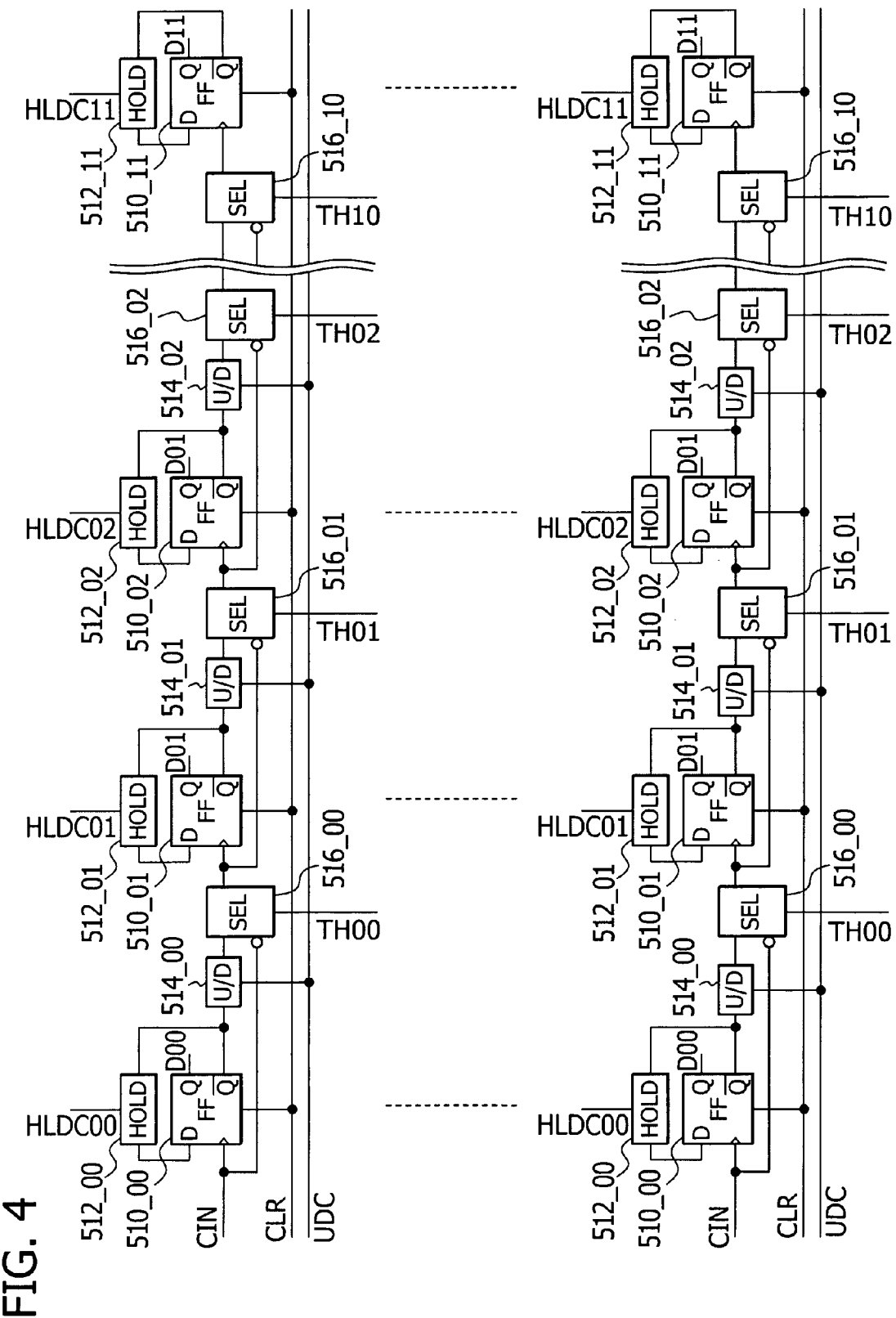
FIG. 4 is a diagram showing a first configuration example of a count execution unit.
Figure 5:
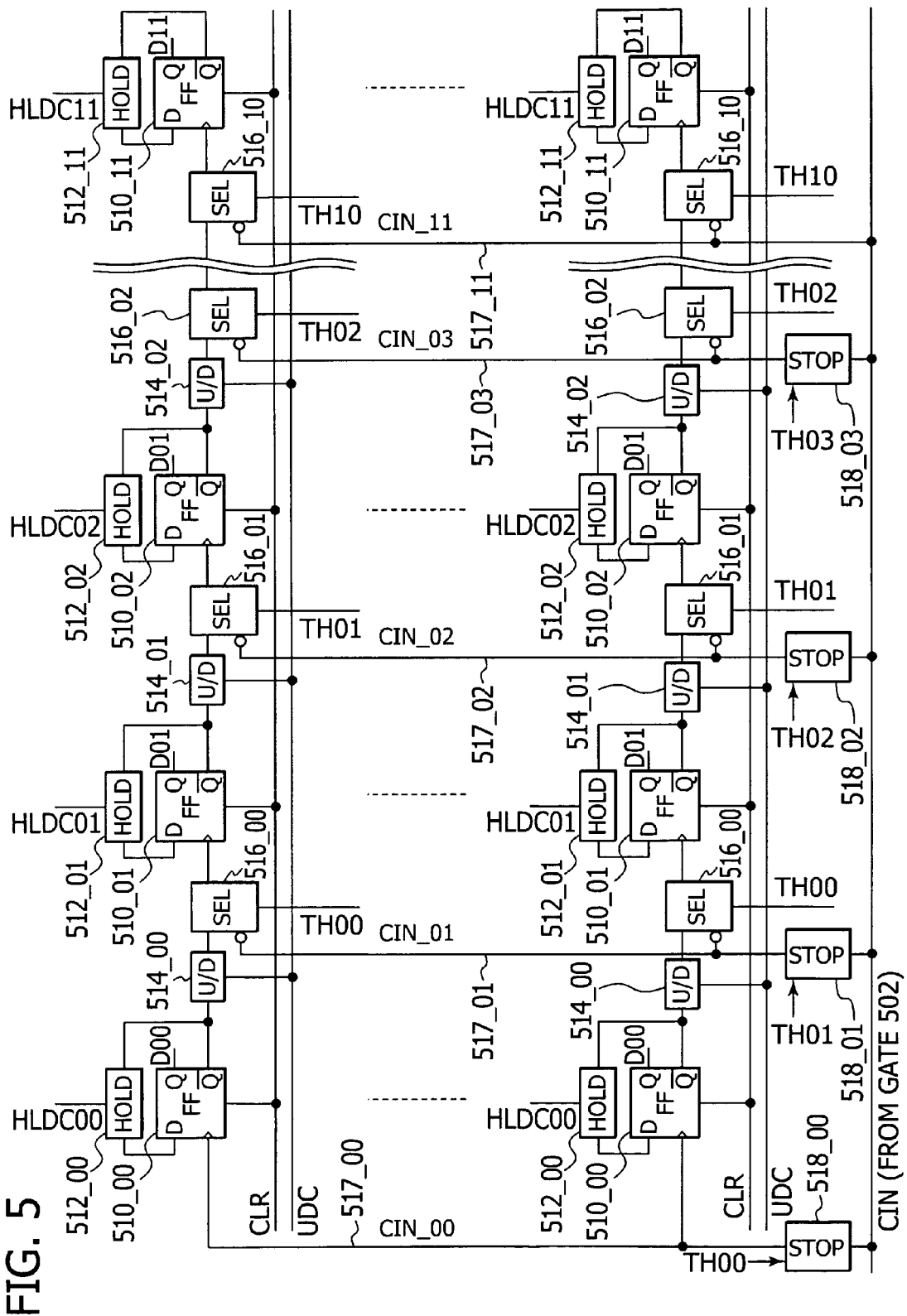
FIG. 5 is a diagram showing a second configuration example of the count execution unit.

FIG. 4 and FIG. 5 are diagrams each showing a configuration example of the count execution unit 504 in the counter 254. Here, the configuration supporting 12 bits is shown.

The count execution unit 504 in each column corresponding to each vertical signal line 19 has basically an asynchronous counter configuration in which D-type flip-flops (FF) are cascaded and a count output in the preceding stage is input to a clock terminal CK in the subsequent stage.

Further, the characteristic feature of the present embodiment is the configuration in which each flip-flop can control an on/off operation of a holding function to an inverted output NQ separately when the flip-flop returns own inverted output NQ to a D input terminal. In addition, between the stages, there are provided a functional unit for switching the counting mode between up-counting and down-counting, and a functional unit for switching a count clock between a pulse on the basis of a count output of the preceding stage and the count clock CIN from the gate 502.

Specifically, the count execution unit 504 has, first, flip-flops (FF) 510_00 to 510_11 (hereafter, collectively indicated as 510). The count execution unit 504 has data holding units (HOLD) 512_00 to 512_11 (hereafter, collectively indicated as 512) capable of holding data of inverted output terminals NQ (denoted by Q with a bar over it in the drawings) between the inverted output terminals NQ of the flip-flops 510 and the D input terminals. Each data holding unit 512 is controlled by other data holding control pulses HLDC (00 to 11). The data holding unit 512 has a function for holding the count output regardless of the input state of the flip-flops 510, for example, it is possible to implement by an exclusive OR.

For example, the data holding unit 512 holds the input data (inverted outputs NQ of the flip-flops 510) when the data holding control pulse HLDC is at an active H (H: high level), and releases the holding operation when the data holding control pulse HLDC is at an inactive L (L: low level) to transfer the input data (inverted outputs NQ of the flip-flop 510) as it is to the D input terminals of the flip-flops 510.

The reset control signal CLR is commonly input to each of reset terminals R of flip-flops 510. The flip-flops 510 set, for example, a noninverted output Q to an L level and the inverted output terminals NQ to the H level when the reset control signal CLR is at the active H.

Further, the count execution units 504 include count mode switches (U/D) 514_00 to 514_10 (hereafter, collectively indicated 514) for switching the count mode to either of up-counting or down-counting between the stages of each flip-flop 510. The count mode switch 514 switches the mode whether data of the inverted output terminal NQ of the flip-flop 510 at the preceding stage is output as it is or after being inverted, in response to the count mode control signal UDC. The count mode switch 514 can be implemented, for example, by an exclusive OR.

For example, the count mode switch 514 switches between inversion and noninversion for data of the inverted output terminals NQ of the flip-flops 510 so that the count execution unit 504 operates the up-counting operation when the count mode control signal UDC is at a high level and operates down-counting when the signal UDC is at a low level.

Further, the count execution units 504 include count clock switches (SEL) 516_00 to 516_10 (hereinafter, collectively indicated as 516) between the stages of each flip-flop 510 and at the subsequent stage of the count mode switch 514. The count clock switch (SEL) 516 switches an output pulse of the count mode switch 514 and the count clock CIN from the gate 502 in response to the count clock control signals TH_00 to TH_10 (hereinafter, collectively referred to as TH), respectively, and supplies them to the clock terminals CK of the flip-flops 510 at the subsequent stage.

Each count clock switch 516 is controlled by the other count clock control signals TH. The count clock control signals TH at the preceding stages become active first and the signals TH at the subsequent stages sequentially becomes active at a predetermined delayed timing (details to be described later).

For example, the count clock switch 516 transfers an output of the count mode switch 514 when the count clock control signal TH is at the inactive L, and transfers the count clock CIN from the gate 502 when the count clock control signal TH is switched to the active H.

The count clock switch 516 takes the count clock CIN from the gate 502 in the following manner. In a first example shown in FIG. 4, wiring is arranged so that a clock pulse input to the flip-flop 510 at the preceding stage is handled for each column. On the other hand, in a second example shown in FIG. 5, count clock lines 517_00 to 517_11 (hereinafter, collectively referred to as 517) are provided and wired commonly for each column and between the stages of each flip-flop 510, and the count clock CIN from the gate 502 is taken from the count clock line 517.

In the first example shown in FIG. 4, less wiring lines are required for the count clock CIN than that of the second example in FIG. 5. However, when the count clock CIN is sequentially transferred to the higher-order bit flip-flop 510, the lower-order bit flip-flop 510 is still operated even a data output therefrom is handled as invalid.

On the other hand, in the second example shown in FIG. 5, although more wiring lines are required for the count clock CIN than that of the first example shown in FIG. 4, there is an advantage to achieve lower power consumption. This is because the counting operation for the flip-flop 510 at the preceding stage can be stopped after the switching, for example, by providing clock stop units (STOP) 518(_00 to _10) between the gate 502 and the count clock lines 517 for respective stages to stop supplying the count clock to the flip-flops 510 in response to the count clock control signals TH.

Both configurations of the first example and the second example may be employed for allowing the count execution unit 504 to operate as an asynchronous binary counter, and the count execution unit 504 has a function to transfer each clock input of the flip-flop 510 at each stage to the clock input of the flip-flop 510 at the subsequent stage (lower-order bit side) by allowing the count clock switch 516 to operate in response to the count clock control signal TH. In other words, a higher-speed clock used for the lower-order bit output is sequentially transferred to the subsequent stage side (higher-order bit side) at a predetermined timing so that a frequency dividing operation of the higher-order bit output for the count clock CIN is sequentially made to be faster. For example, a ¼ frequency dividing operation for the count clock CIN before the switching can be changed to a ½ frequency dividing operation for the count clock CIN after the switching.

After the count clock is switched, since the counting operation (dividing operation) is performed by a clock faster than before, the A/D conversion can be performed at a higher-speed while keeping the linearity of the A/D conversion by adjusting the relation with the slope of the reference signal Vslop. This will be described in more detail later.

[Operation of the Solid-State Imaging Device: Basic Operation]

Figure 6:
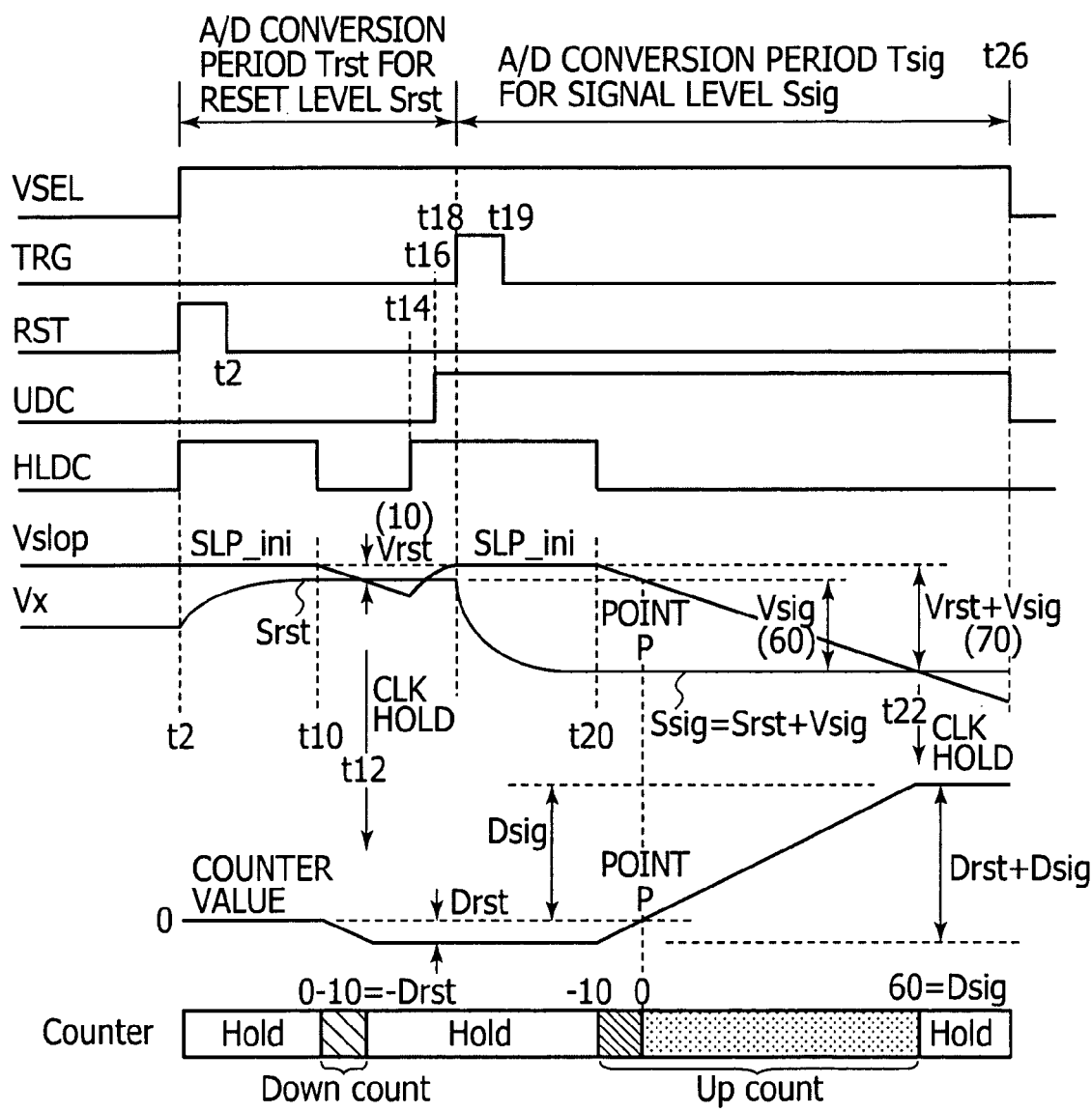
FIG. 6 is a timing chart illustrating signal acquisition addition processing which is a basic operation in a column A/D circuit of the solid-state imaging device shown in FIG. 1.

FIG. 6 is a timing chart illustrating signal acquisition differential processing which is a basic operation in the column A/D circuit 25 of the solid-state imaging device 1 shown in FIG. 1.

An analog pixel signal detected by each unit pixel 3 of the pixel array unit 10 is converted into a digital signal in accordance with the following operation. For example, search is performed to find a point at which a reference signal Vslop decreasing with a predetermined slope in a ramp waveform and each voltage of a reference component or a signal component of the pixel signal from the unit pixel 3 are matched. A count clock counts the time period from a point of generating the reference signal Vslop to be used for comparison processing to a point at which the electronic signal corresponding to the reference component or the signal component and the reference signal are matched. As a result, a count value corresponding to each value of the reference component and the signal component is obtained.

In other words, the voltage comparator 252 of the column A/D circuit 25 disposed in each column compares an analog pixel signal voltage Vx read out to the vertical signal line 19 with the reference signal Vslop. At this time, the counter 254 disposed in each column similar to the voltage comparator 252 is made to operate, a certain potential of the reference signal Vslop and the counter 254 are changed to correspond in one to one relation, the pixel signal voltage Vx is converted into digital data. In the description, the change of the reference signal Vslop is to convert the change of voltage into the change of time. The counter 254 counts the time by quantizing with a certain cycle (clock) to convert into digital data. If it is assumed that the reference signal Vslop is changed by ΔV in the time period Δt and the counter 254 is operated at Δt cycle, a counter value becomes N when the reference signal Vslop is changed by N×ΔV.

The pixel signal So (pixel signal voltage Vx) output from the vertical signal line 19 has, time-sequentially, the signal level Ssig appeared after the reset level Srst containing noise of the pixel signal as a reference level. If a first operation is performed on the reference level (reset level Srst, practically equivalent to the reset level Vrst), a second operation is performed on the signal level Ssig obtained by adding the signal component Vsig to the reset level Srst. This operation is specifically described below.

In the first operation, that is, in an A/D conversion period Trst for the reset level Srst, the communication/timing controller 20 first sets a reset control signal CLR to the active H, and resets a count value output from a noninverted output terminal Q of each flip-flop 510 in the counter 254 to "0", and also sets the counter 254 to be in the down-counting mode (t1). At this time, the communication/timing controller 20 sets the data holding control pulse HLDC to be the active H and the count mode control signal UDC to be a low level (that is, down-counting mode).

At this time, in the unit pixel 3 the vertical selection signal φVSEL in a read-out object row Vn is set to the active H and the pixel signal So is allowed to be output to the vertical signal line 19, and almost simultaneously, the reset signal φRST is set to the active H and the floating diffusion 38 is set to a reset potential (t1 to t2). The reset potential is output to the vertical signal line 19 as the pixel signal So. Accordingly, the reset level Srst appears in the vertical signal line 19 as the pixel signal voltage Vx. At this time, due to the variations of the in-pixel amplifiers (pixel signal generator 5) for each unit pixel 3, the potentials of the reset levels Srst to be converged are varied.

After the first read-out operation for reading out the pixel signal from the unit pixel 3 in the read-out object row Vn to the corresponding vertical signal line 19 (H0, H1, . . . ) is stabilized, that is, after the reset level Srst is converged, the communication/timing controller 20 supplies the control data CN4 for generating the reference signal Vslop to the reference signal generator 27. Here, in order to make the reference signal Vslop start changing simultaneously with the counting operation by the counter 254, the data holding control pulse HLDC is used as the control data CN4 and is set to the inactive L (t10).

In response to the above, the reference signal generator 27 inputs, as the reference signal Vslop served as a comparison voltage to one input terminal RAMP of the voltage comparator 252, a stepped or linear shaped voltage waveform which is changed in a sawtooth waveform (RAMP shape) over time, as a whole, and starts from an initial voltage SLP_ini. The voltage comparator 252 compares the reference signal Vslop with the pixel signal voltage Vx of the vertical signal line 19 supplied from the pixel array unit 10.

Simultaneously with the input of the reference signal Vslop to the input terminal RAMP of the voltage comparator 252, the comparison period in the voltage comparator 252 is measured by the counter 254 disposed in each row, in synchronization with the reference signal Vslop supplied from the reference signal generator 27. Practically, the data holding control pulse HLDC is set to the inactive L to generate the reference signal Vslop, which releases the holding operation of the data holding unit 512, thus the counter 254 starts down-counting from the initial value 0 as the first counting operation. More specifically, the counting operation is started in the negative direction.

The voltage comparator 252 compares the ramp reference signal Vslop from the reference signal generator 27 with the pixel signal voltage Vx input through the vertical signal line 19, and when the both voltages become equal to each other, the voltage comparator 252 inverts the comparator output from the H level to the L level. In other words, the voltage comparator compares the voltage signal (reset level Srst) corresponding to the reset level Vrst with the reference signal Vslop, and generates an active-low (L) pulse signal having a level in a temporal axis direction, corresponding to the level of the reset level Vrst, and supplies the generated pulse signal to the counter 254.

As a result thereof, the counter 254 stops the counting operation almost at the same time as the inversion of the comparator output, and latches (holds/stores) the count value at that time as the pixel data, thereby completing the A/D conversion. In other words, the width of the pulse signal of the active-low (L) having a level in the temporal axis obtained by the comparison operation in the voltage comparator 252 is counted by the count clock CK0, a count value showing a digital value Drst (−Drst, if adding a sign) corresponding the level of the reset level Vrst.

After the elapse of a predetermined down-counting period, the communication/timing controller 20 sets the data holding control pulse HLDC to the active H (t14). Accordingly, the communication/timing controller 20 stops the generation of the ramp-shape reference signal Vslop (t14) and returns to the initial voltage SLP_ini.

Since in the first operation, the voltage comparator 252 detects the reset level Vrst in the pixel signal voltage Vx and the counter 254 performs the counting operation, the reset level Vrst of the unit pixel 3 is read out to perform the A/D conversion on the reset level Vrst.

The reset level Vrst contains offset noise which varies by the unit pixel 3. However, the variations of the reset level Vrst is generally small, and the reset level Vrst is generally the same for all the pixels. Accordingly, the output value of the reset level Vrst of the pixel signal voltage Vx of an arbitrary vertical signal line 19 is substantially known.

Accordingly, in the first read-out operation and the A/D conversion for the reset level Vrst, the down-counting period (comparison period) can be shortened by adjusting the reference signal Vslop. For example, the comparison operation is performed on the reset level Srst (the reset level Vrst) by setting the longest period for the comparison operation (that is, the AD conversion period for the reset components) to a 7-bit counting period (128 clocks).

In the subsequent second operation, that is, in the A/D conversion period Tsig for the signal level Ssig, the signal component Vsig responsive to an amount of incident light per unit pixel 3 is read out, in addition to the reset level Vrst, and a similar operation as the first reading operation is performed. More specifically, the communication/timing controller 20 first sets the count mode control signal UDC to a high level and sets the counter 254 to be in the up-counting mode (t16).

At this time, in the unit pixel 3, while keeping the vertical selection signal φVSEL in the read-out object row Vn at the active H, a transfer signal φTRG is set to the active H and the signal level Ssig is read out to the vertical signal line 19 (t18 to t19).

After the second reading out from the unit pixel 3 in the read-out object row Vn to the vertical signal line 19 (H0, H1, . . . ) is stabilized, the communication/timing controller 20 supplies the control data CN4 for generating the reference signal Vslop to the reference signal generator 27. Also in this case, in order to make the reference signal Vslop start changing simultaneously with the counting operation by the counter 254, the data holding control pulse HLDC is used as the control data CN4, and is set to the inactive L (t20).

In response to the above, the reference signal generator 27 inputs, as the reference signal Vslop served as a comparison voltage to one input terminal RAMP of the voltage comparator 252, a stepped or linear shaped voltage waveform which is changed in a sawtooth waveform (RAMP shape) over time and starts from the initial voltage SLP_ini. The voltage comparator 252 compares the reference signal Vslop with the pixel signal voltage Vx of the vertical signal line 19 supplied from the pixel array unit 10.

Simultaneously with the input of the reference signal Vslop to the input terminal RAMP of the voltage comparator 252, the comparison period in the voltage comparator 252 is measured by the counter 254 disposed in each row, in synchronization with the reference signal Vslop supplied from the reference signal generator 27. Practically, also in this case, the data holding control pulse HLDC is set to the inactive L to generate the reference signal Vslop, which releases the holding operation of the data holding unit 512. Thus, as the second counting operation, the counter 254 starts up-counting inversely to the first operation, from the digital value Drst (herein, a negative value) of the reset level Srst of the pixel signal voltage Vx obtained by the first reading and the A/D conversion operations. In the other words, the counting operation is started in the positive direction.

The voltage comparator 252 compares the ramp reference signal Vslop supplied from the reference signal generator 27 with the pixel signal voltage Vx input through the vertical signal line 19, and when the both voltages become equal to each other, the voltage comparator 252 inverts the comparator output from the H level to the L level (t22). In other words, the voltage comparator 252 compares the voltage signal (signal level Ssig of the pixel signal voltage Vx) corresponding to the reset level Vrst with the reference signal Vslop, and generates an active-low (L) pulse signal having a level in a temporal axis direction, corresponding to the level of the signal component Vsig, and supplies the generated pulse signal to the counter 254.

As a result thereof, the counter 254 stops the counting operation almost at the same time as the inversion of the comparator output, and latches (holds/stores) the count value at that time as the pixel data, thereby completing the A/D conversion. In other words, the width of the pulse signal of the active-low (L) having a level in the temporal axis obtained by the comparison operation in the voltage comparator 252 is counted by the count clock CK0, a count value corresponding the signal level Ssig in the pixel signal voltage Vx is obtained.

After the elapse of a predetermined up-counting period, in the unit pixel 3, the vertical selection signal φVSEL in the read-out object row Vn is set to the inactive L, the output of the pixel signal So to the vertical signal line 19 is stopped, and the vertical selection signal φVSEL is set to the active H level for the next row of the read-out object row Vn+1 (t26). At this time, the communication/timing controller 20 prepares to process the next read-out object row Vn+1. For example, the count mode control signal UDC is set to the low level and the counter 254 is to be in the down-counting mode.

In the second operation, since the counting operation is performed by detecting the signal level Ssig of the pixel signal voltage Vx by the voltage comparator 252, the signal component Vsig of the unit pixel 3 is read out to perform the A/D conversion on the signal level Ssig.

Since the signal level Ssig is a level obtained by adding the signal component Vsig to the reset level Srst, the count value of the A/D conversion result for the signal level Ssig is basically "Drst+Dsig". However, since the up-counting is started from "−Drst" which is the AD conversion result of the reset level Srst, a count value to be actually held becomes "−Drst+(Dsig+Drst)=Dsig".

If it is assumed that a voltage value (conversion coefficient) per one digit for the A/D conversion period Trst for the reset level Srst and for the A/D conversion period Tsig for the signal level Ssig is set to α[V/digit], and the A/D conversion period count value Dsig is converted into a voltage value, the voltage value of the signal component Vsig becomes α·Dsig.

For example, as shown in FIG. 6, which indicates a digital value in brackets at the position of the pixel signal voltage Vx, the reset level Srst of the pixel signal voltage Vx in the vertical signal line 19 is 10, the signal component Vsig is 60, and the signal level Ssig is 70 as a digital value.

In the A/D conversion period Trst for the reset level Srst, when the counter value Drst becomes −10, the reference signal Vslop and the pixel signal voltage Vx are matched (crossed) and the comparator output from the voltage comparator 252 is inverted to the active L level so that the counter 254 stops the down-counting operation. Accordingly, the A/D conversion result of the reset level Srst becomes −10, and this value is held until the A/D conversion period Tsig for the signal level Ssig, which is a period for reading out the next pixel signals.

Next, in the A/D conversion period Tsig for the signal level Ssig, the signal level Vsig is read out from the unit pixel 3 so that the counter 254 starts up-counting. When the reference signal Vslop becomes equal to the potential of the pixel signal voltage Vx in the A/D conversion period Trst (a point P in the drawing), the counter value becomes 0, and when the reference signal Vslop and the signal level Ssig of the pixel signal voltage Vx are equal to each other, the comparator output from the voltage comparator 252 is inverted to the active L, whereby the counter 254 stops the up-counting operation.

At this time, an actual count number of up-counting counted by the counter 254 is 70, however the counter 254 has started up-counting from the negative value −10, the actual counter value is "−10+70=60," so that it becomes equal to the digital value Dsig=60 of the signal component Vsig.

In other words, in the present embodiment, the counter 254 performs the down-counting for the first operation and performs the up-counting for the second operation. Accordingly, in the counter 254, differential processing (subtraction processing) is automatically performed between the count value "−Drst" which is the A/D conversion period and the count value "Drst+Dsig" which is the A/D conversion period of the signal level Ssig, and the count value Dsig corresponding to the result of the differential processing is held in the counter 254. The count value Dsig corresponding to the result of the differential processing and to be held in the counter 254 is corresponding to the signal component Vsig.

As described above, by performing two comparison processes for the reset level Srst (=the reset component Vrst, practically) and for the signal level Ssig, and the down-counting operation and the up-counting operation working with the comparison processing, the count value corresponding to the result of the subtraction "(the count value in the second comparison period)−(the count value in the first comparison period)" is held. At this time, the offset component of the column A/D circuit 25 has to be considered in practice.

Accordingly, the equation of (the count value in the second comparison period)−(the count value in the first comparison period)=(the reset level Srst+the signal component Vsig+the offset component of the column A/D circuit 25)−(the reset level Srst+the offset component of the column A/D circuit 25)=(the signal component Vsig) is accomplished. By performing the above two read-out processes and the automatic differential processing in the counter 254, it is possible to eliminate, in addition to the reset component Vrst containing the variations per each unit pixel 3, the offset component for each column A/D circuit 25. Thus, it is possible to obtain the A/D conversion result of the only signal component Vsig corresponding to the amount of incident light per each unit pixel 3.

Accordingly, the column A/D circuit 25 of the present embodiment operates not only as a digital conversion unit for converting an analog pixel signal into digital pixel data, but also as a CDS processing function unit.

In the second operation, the A/D conversion is performed by reading out the signal component Vsig corresponding to the amount of incident light. Accordingly, in order to judge the level of the quantity of light in a wide range, it is necessary to set the up-counting period (t20 to t24: comparison period) to be long so that the reference signal Vslop to be supplied to the voltage comparator 252 can be greatly changed.

Thus, in the present embodiment, the longest period of the comparison processing for the signal level Ssig is set, for example, to 12-bit count period (4096 clocks), and the comparison is performed on the signal level Ssig. In other words, the longest period of the comparison processing (the A/D conversion period for the reset component) for the reset level Srst (reset level Vrst/reference component) is set to be shorter than the longest period of the comparison processing (that is, the A/D conversion period for the signal component) for the signal level Ssig. The longest period of the comparison processing of the reset level Srst is set to be shorter than the longest period of the comparison processing for the signal level Ssig, rather than being set to be equal to both of the longest periods of the comparison processing, that is, the maximum values for the A/D conversion periods to be equal, for the reset level Srst and for the signal level Ssig. Accordingly, the total length of the two A/D conversion periods is shortened.

In this case, although the number of comparison bits are different between the first time and the second time, the communication/timing controller 20 supplies control data to the reference signal generator 27, and the reference signal generator 27 generates the reference signal Vslop on the basis of the control data. Accordingly, the slope of the reference signal Vslop, that is, the change rate of the reference signal Vslop is made the same between the first time and the second time. If the reference signal Vslop is generated under digital control, the slope of the reference signal Vslop is easily made the same between the first time and the second time. In this manner, the accuracy of the A/D conversion can be made equal, and the subtraction processing result by the up-down-counter can be obtained correctly.

The column A/D circuit 25 of the present embodiment has the data storage unit 256 at the subsequent stage of the counter 254. Before the operation of the counter 254, the count result which is obtained by the processing for the previous row Hx−1 is transferred to the data storage unit 256 on the basis of the memory transfer instruction pulse CN8 from the communication/timing controller 20.

In other words, after the A/D conversion period ends, data in the counter 254 is saved in the data storage unit 256, and the column A/D circuit 25 starts the A/D conversion processing for the next row Vx+1. Behind the A/D conversion processing, the data saved in the data storage unit 256 is sequentially selected by the horizontal scanning circuit 12 and can be read out by the output circuit 28.

In the configuration without providing the data storage unit 256, since pixel data is output to the outside of the column processor 22 only after the second read-out processing, that is, the A/D conversion processing is completed, there is a restriction on the read-out processing. On the other hand, by disposing the data storage unit 256, the count value indicating a last subtraction processing result is transferred to the data storage unit 256, prior to the first read-out processing (A/D conversion processing), and thus, there is no restriction on the read-out processing.

Furthermore, since the count result held in the counter 254 can be transferred to the data storage unit 256, the counting operation of the counter 254, that is, the A/D conversion, and the read-out operation for reading out the count result to the horizontal signal line 18 can be independently controlled. Thus, it is possible to implement the pipeline operation that performs the A/D conversion processing and the read-out operation for reading out the signals to the outside in parallel.

As described above, in the solid-state imaging device 1 of the present embodiment, the up-counting and the down-counting can be switched. At this case, the up-down counter capable of switching the count mode by itself is used to perform the counting processing twice while switching the processing modes. The structure in which the unit pixels 3 are arranged in rows and columns is configured with the column parallel column A/D circuit in which the column A/D circuit 25 is disposed for every vertical column.

Therefore, it is possible to directly obtain a result of the subtraction processing between the reference level (the reset level Srst) and the signal level Ssig as a result of the second count processing for each of the vertical columns. A memory device for storing the count results of the reset level Srst and the signal level Ssig is implemented with a latch function of the counter. Therefore, no dedicated memory for storing AD converted data separately from the counter is required.

In addition, it becomes unnecessary to prepare a special subtracter for calculating a difference between digital data of the signal level (reset level Srst) corresponding to the reference component and digital data of the signal level corresponding to the signal component. The configuration may be achieved by combining individual up-counter and down-counter. In this case, however, a function element may be necessary, for example, to start the counting operation after loading a count value of one counter (the down-counter in the above example) to the other counter (the up-counter in the above example), or, to subtract each count value by digital calculation processing.

For example, it becomes possible that the down-counting is performed during the A/D conversion period for the reset level Srst to hold the A/D conversion result of the reset level Srst of the unit pixel 3, and the up-counting is performed during the A/D conversion period Tsig for the signal level Ssig to obtain the A/D conversion result for the signal component Vsig from the reset level Srst. This is, practically, functions of the A/D conversion for the signal component Vsig and the CDS processing are simultaneously implemented. Further, since pixel data indicated by the count value held in the counter 254 shows a positive signal voltage, it is unnecessary to perform complementary computation for changing a negative signal voltage to a positive signal voltage, which is highly compatible with existing systems.

Furthermore, by providing the data storage unit 256 at the subsequent stage of the counter 254, it becomes possible to perform a signal output operation from the data storage unit 256 to the outside through the horizontal signal line 18 and the output circuit 28, and the read-out operation for the present row Hx and the counting operation of the counter 254 in parallel, thereby enabling more efficient signal output. The count value Dsig which is obtained by converting the signal component Vsig of the pixel signal voltage Vx into digital data is stored in the data storage unit 356 and then sequentially read out by the horizontal scanning circuit 12 to the outside. In this manner, since a signal charge generated by the charge generator 32 is processed to be an analog electric signal and further to be digital data in parallel for each row and it is transferred as digital data thereafter, a high-speed calculation is possible and high-speed processing can be achieved.

[A/D Conversion+Addition Processing: Basic Operation]

FIG. 7 is a timing chart illustrating the addition processing in the vertical direction, performed in parallel with the A/D conversion processing operation. For simplicity of the description, the offset component of the column A/D circuit is ignored.

Each of timings and signals in FIG. 7 are represented by same timings and signals for one line shown in FIG. 6, regardless of whether a processing object row or not. In the description, timings or signals are distinguished by denoting with reference numerals of a processing object row. This is the same for other similar timing charts to be described later.

The addition processing in the vertical direction performed in parallel with the A/D conversion processing operation is performed during a high-speed frame mode, which is achieved by setting an exposure period of the unit pixel to ½ time compared with a normal frame mode in which pixel information is read out from all the unit pixel 3 in the pixel array unit 10.

The counter 254 can hold a count value indicating the A/D conversion result even after the A/D conversion processing is performed for the signal level Ssig by n-bit, for the unit pixel 3 in a certain row. In the present embodiment, by utilizing this data-holding characteristic of the counter 254, a process for adding A/D conversion values of the unit pixels 3 in a plurality of rows is implemented in the counter 254.

A plurality of rows to be subjected to the addition processing may be two or more rows, or any plural number of rows more than three. Acceptable relationship between a plurality of rows is not only the adjacent rows but also for several rows. For example, typically, if the pixel array unit 10 is for the color image capturing, in order to match the color arrangement of a color separation filter, that is, the same color components are to be added, appropriate rows are selected. For example, if it is the Bayer arrangement, the addition processing is performed on odd-numbered rows or on even-numbered rows.

This is the same for the addition processing in the horizontal direction. A plurality of columns to be subjected to the addition processing may be two or more columns, or any plural number of columns more than three. Acceptable relationship between a plurality of columns is not only the adjacent columns but also for several columns. For example, typically, if the pixel array unit 10 is for the color image capturing, in order to match the color arrangement of a color separation filter, that is, the same color components are to be added, appropriate columns are selected to be subjects. For example, if it is the Bayer arrangement, the addition processing is performed on odd-numbered columns or on even-numbered columns.

Description is made on the assumption as follows: the addition processing is performed between two rows of an arbitrary row Iv and an arbitrary row Jv (an adding calculation for a unit of two rows) by the counter 254 having an up/down-count function in the column A/D circuit 25, after that, the addition processing is performed between two columns of an arbitrary column Ih and an arbitrary column Jh (an addition calculation for a unit of two columns) by the digital arithmetic unit 29. In other words, the description is made by assuming that the addition calculation is performed on two rows and two columns which have a predetermined relationship. Further, it is assumed that the row Iv is an addition target row and the A/D conversion thereof is performed first, and then the A/D conversion is performed on the row Jv.

As can be understood from the basic operation description of the signal acquisition differential processing, in a case where a signal of the unit pixel 3 in the row Iv is read out and the A/D conversion processing is performed, first, a vertical selection signal φVSEL_Iv of the read-out object row Iv is set to the active H, and output of the pixel signal So to the vertical signal line 19 is permitted. At this time, all of the data holding control pulses HLDC00 to HLDC11 are initially set to the active H (t1_Iv to t10_Iv), and set to the inactive L during the comparison processing and the count processing (t10_Iv to t14_Iv), and although it is not shown, all of the count clock control signals TH00 to TH11 are set to the inactive L (t1_Iv to t26_Iv).

It is assumed that a reset component of the row Iv is Vrst_Iv and a reset level thereof is Srst_Iv, and a signal component of the row Iv is Vsig_Iv and a signal level thereof is Ssig_Iv. By performing the comparison processing and the count processing (t1_Iv to t26_Iv) on them, the counter 254 holds a digital value Dsig_Iv (t26_Iv) obtained by the equation where: (the count value in the second comparison period)−(the count value in the first comparison period)="(Srst_Iv+Vsig_Iv)− Srst_Iv=Vsig_Iv".

After the A/D conversion period for the row Iv is completed, without resetting the counter 254, the read-out operation and the A/D conversion processing for a signal of the unit pixel 3 in the row Jv are successively performed, and the read-out operation similar to the processing for the row Iv is repeated. Accordingly, first, the vertical selection signal φVSEL_Iv of the previous read-out object row Iv is set to the inactive L, the vertical selection signal φVSEL_Jv of a next read-out object row Jv is set to the active H, and the output of the pixel signal So to the vertical signal line 19 is permitted (t1_Jv=t26_Iv).

At this time, all of the data holding control pulses HLDC00 to HLDC11 are initially set to the active H (t1_Jv to t10_Jv), and set to the inactive L during the comparison processing and the count processing (t10_Iv to t14_Iv), and although it is not shown, all of the count clock control signals TH00 to TH11 are set to the inactive L (t1_Jv to t26_Jv).

It is assumed that a reset component in the row Jv is Vrst_Jv, a reset level thereof is Srst_Jv, and a signal component in the row Jv is Vsig_Jv and a signal level thereof is Ssig_Jv. By performing the comparison processing and the count processing (t1_Iv to t26_Iv) on them, after the A/D conversion for the row Jv, the counter 254 holds a digital value obtained by the equation where: "Vsig_Iv+(Srst_Jv+ Vsig_Jv)−Srst_Jv=Vsig_Iv+Vsig_Jv". In other words, the count value obtained by adding two signal components Vsig_Iv and Vsig_Jv of the rows Iv and Jv in the vertical direction is held in the counter 254 (t26_Jv).

For example, as shown in FIG. 7, in which a digital value is indicated in brackets on the line plot of the pixel signal voltage Vx, it is assumed that both the reset levels Srst_Iv in the row IV and Srst_Jv in the row Jv are 10, both the signal components Vsig_Iv and Vsig_Jv are 60, and both the signal levels Ssig_Iv and Ssig_Jv are 70.

In this case, in the A/D conversion for the signal level Ssig_Iv (signal component Vsig_Iv) in the row Iv, by performing the up-counting from the count value Drst_Iv (=−10) obtained by the A/D conversion for the reset level Srst_Iv, as a starting point, the count value Dsig_Iv to be held in the counter 254 after processing becomes "−10+70=60."

After that, in the A/D conversion for the row Jv, the count value Dsig_Iv (=60) obtained by the A/D conversion for the row Iv is used as a starting point, the down-counting is first performed on the reset level Srst_Jv, and the value Drst_Jv to be held in the counter 254 becomes "60−10=50." Further, the up-counting is performed on the signal level Ssig_Jv with the use of the count value Drst_Jv (=50) as a starting point, and a count value ADD to be held in the counter 254 after the processing becomes "50+70=120." This value represents the result of adding the value of the signal component Vsig_Iv in the row Iv to the signal component Vsig_Jv in the Jv.

In the previous example, the digital addition processing is performed in the column A/D circuit 25 by switching the up-counting and the down-counting. At this time, if a counter capable of switching the count mode by itself is used, there is an advantage that it is possible to automatically perform the CDS processing for eliminating the reset component Vrst from the signal component Vsig of the unit pixel 3 and the addition processing. Such configuration may be achieved by combining individual up-counter and down-counter, however, in this case, a function element may be required, for example, to start the counting operation after loading a count value of one counter (the down-counter in the above example) to the other counter (the up-counter in the above example), or, to subtract or add each count value by digital calculation processing.

After the A/D conversion processing, the counter 254 transfers the count value to the horizontal signal line 18 through the data storage unit 256. In this manner, the digital data indicating the addition result obtained by adding the signal component Vsig_Iv and Vsig_Jv of two rows Iv and Jv in the vertical direction is sequentially supplied to the digital arithmetic unit 29.

By repeating operations similar to the above, it is possible to obtain an image in which pixel information is decimated to ½ in the vertical direction (vertical (column) direction on a sensor surface). As a result, a frame rate can be increased twice as high as the normal frame rate mode in which all pixel information is read out.

The digital arithmetic unit 29 adds the digital data indicating the addition result obtained by adding the signal component Vsig_Iv and Vsig_Jv of two rows Iv and Jv in the vertical direction (hereinafter, may also be referred to as row addition data ADD) supplied from the column processor 26 to the row addition data ADD_Ih in a column Ih and the row addition data ADD_Jh in a column Jh, and finally obtains digital data indicating an addition result of two rows and tow columns.

As an example, it is assumed that the counter 254 performs the addition processing with respect to an odd-numbered row and an even-numbered row adjacent thereto, and the digital arithmetic unit 29 performs the addition processing with respect to an odd-numbered column and an even-numbered column adjacent thereto. In this case, the digital arithmetic unit 29 reads out the row addition data of the even-numbered columns and the odd-numbered columns from the data storage unit 256 and adds them, thereby performing the addition operation between two columns.

As a result, the digital arithmetic unit 29 obtains digital data indicating the addition result obtained by adding the signal components Vsig_IvIh and Vsig_IvJh of two columns, the odd-numbered column Ih at the odd-numbered column Ih in the horizontal direction and the adjacent even-numbered columns Jh, and the signal components Vsig_JvIh and Vsig_JvJh of two columns, the odd-numbered columns Ih in the horizontal direction at the even-numbered rows Jv adjacent to the odd-numbered rows Iv. In other words, the addition operation is performed on four pixels arranged in the adjacent two rows and two columns.

The pixel signal voltage Vx output from the unit pixel 3 through the vertical signal line 19 is converted into a digital value by the column A/D circuit 25, and the digital value is added between a plurality of unit pixels 3 in the vertical direction (column direction)(unit pixel 3 arranged in two rows in the previous example). With the above operation, it is possible to obtain the following effects.

For example, from the terms of a quantity of pixel information, it is the same as a case of decimated read out (skipping read-out) of pixel information in the vertical direction by ½. However, since the pixel information is added between two pixels in the vertical direction, a quantity of information for a piece of pixel information is doubled. Accordingly, even if an exposure period for the unit pixel 3 is set to ½ time in order to make the frame rate, for example, twice higher, the digital value is added between two rows of unit pixels during the A/D conversion, and a quantity of information for one pixel information is doubled. Thus, the sensitivity is not lowered compared to that of the operation in the normal frame rate mode.

In other words, a shorter exposure time for unit pixel 3 does not result in a decreased quantity of information for one pixel information. Therefore, without lowering the sensitivity, the higher frame rate can be achieved. Furthermore, since the addition processing is operated by switching the mode between the up-counting and the down-counting by the column A/D circuit 25 provided with a built-in up/down-counter, the higher accuracy addition operation can be implemented without using an external memory device, separated from the chip on which the pixel array unit 10 and the column processor 26 are mounted on the same semiconductor region, or using an additional circuit device as a column parallel ADC.

In the above example, the pixel addition performed between two rows is taken as an example and explained, however, it is not limited to the processing for the two rows addition, but is also possible for a plurality of rows. In this case, if a number of rows to be added is M, a quantity of image data can be compressed to 1/M.

Furthermore, when a quantity of image data is compressed to 1/M, a frame rate is increased to M times higher by changing a data output rate. Similarly to the technique disclosed in the above-mentioned patent document, paragraphs 68 to 71, 87, the various modifications can be made. The detailed description thereof is omitted here.

[Disadvantages of the Digital Addition Processing]

FIGS. 8A to 8D are diagrams illustrating disadvantages of the digital addition processing in the vertical direction by the counter 254 and the digital addition processing in the horizontal direction by the digital arithmetic unit 29. The diagram shows the pixel arrangement in the addition operation performed in the vertical direction and horizontal direction.

If the digital addition processing is performed as described above, a spatial center of the pixels in an image after the addition is a middle position of the addition object pixels. This relation is sequentially accumulated, and the pixel positions in the image after the addition are determined.

If a row order or a column order of the addition object pixels are in sequence, such as 1, 2, 3, 4, there is no problem, but if, for example, a row order or a column order are not in sequence, such as 1, 3, 2, 4, there is a problem. Practically, when capturing monochrome images, it may be no problem in most cases because it is rare to change the order of the addition object pixels to perform the addition processing. However, in a case of adding the addition object pixels having the same color when capturing color images by using a single chip-type imaging device, a problem probably occurs because the order of the addition object pixels has to be determined in accordance with a color arrangement of a color separation filter.

For example, it is assumed that the Bayer arrangement filter is used as a color separation filter, which has color filters of R, G, B (Gr for G in a row R and Gr for G in a row B) as shown in FIG. 8A.

When the addition processing is performed on two rows and two columns, the vertical selection signal φVSEL assigns the rows in the order of a first row, third row, second row, fourth row, fifth row, seventh row, sixth row and eighth row . . . from the bottom. Accordingly, as shown in the schematic diagram (FIG. 8B) in which the pixels are rearranged in the order to be read out by the column processor 26, two rows having the same color, that is, the odd-numbered rows and the even-numbered rows, are supplied to the column processor 26.

Each column A/D circuit 25 disposed in each vertical column of the column processor 26 performs the addition operation when the same colors are input in the vertical direction. For example, the column A/D circuit 25 sequentially performs the addition operation on: each of pixel signals having the R component and the Gr component in the first row and the third row; each of pixel signals having the Gb component and the B component in the second row and the fourth row; each of pixel signals of the R component and the Gr component in the fifth row and seventh row; and each of pixel signals having the Gb component and the B component in the sixth row and eighth row. In other words, when the same color components of two pixels in the vertical direction are input to the column A/D circuit 25, the column A/D circuit 25 performs the addition operation on the same color components.

The schematic diagram after the addition operation is shown in FIG. 8C. The center row of the two addition object rows, that is, a centroid in the vertical direction during the addition, becomes the center of the pixels after the addition. For example, each of the center positions are: the second row after the addition for the first row and the third row; the third row after the addition for the second row and the fourth row; the sixth row after the addition for the fifth row and the seventh row; and the seventh row after the addition for the sixth row and eighth row.

Having such an image as a target, the digital arithmetic unit 29 sequentially takes the row addition data ADD, and performs the addition operation when the same colors are input in the horizontal direction. For example, the digital arithmetic unit 29 sequentially performs the addition operation on: each of pixel signals having the R component and the Gb component in the first column and the third column; each of pixel signals having the Gr component and the B component in the second column and the fourth column; each of pixel signals of the R component and the Gb component in the fifth column and seventh column; and each of pixel signals having the Gr component and the B component in the sixth column and eighth column. In other words, when the same color components of two pixels in the horizontal direction are input to the digital arithmetic unit 29, the digital arithmetic unit 29 performs the addition operation on the same color components.

In the schematic diagram after the addition operation, with respect to the horizontal direction, the center column of the two addition object columns, that is, a centroid in the horizontal direction during the addition, becomes the center of the pixels after the addition. For example, each of the center positions are: the second column after the addition for the first column and the third column; the third row after the addition for the second column and the fourth column; the sixth column after the addition for the fifth column and the seventh column; and the seventh column after the addition for the sixth column and eighth column.

If the center pixels after the addition with respect to the vertical direction as shown in FIG. 8C are combined to the above, as shown in the right side in FIG. 8D, the center of 2×2 grid formed by each color becomes the spatial positions of colors after the addition. For example, four rows and four columns are assumed as one combination, according to an operator n (n is 0 or positive integer), the center of the pixel R is "2+4n" row and "2+4n" column, the center of the pixel Gr is "2+4n" row and "3+4n" column, the center of the pixel Gb is "3+4n" row and "2+4n" column, and the center of the pixel B is "3+4n" row and "3+4n" column.

In this case, as can be understood from the comparison with the original positions of the pixels shown the left side in FIG. 8D, the spatial positions of each color are arranged at equal intervals before the addition, while, after the addition, the spatial positions of each of colors are grouped by four rows and four columns at the center thereof, and other groups of four rows and four columns are considered, pixels are not arranged at equal intervals. This causes a problem in terms of the resolution of the images after the addition. Specifically, it is difficult to obtain the addition image with high resolution.

[Resolution Improving Method for Addition Image: First Embodiment]

Figure 9:
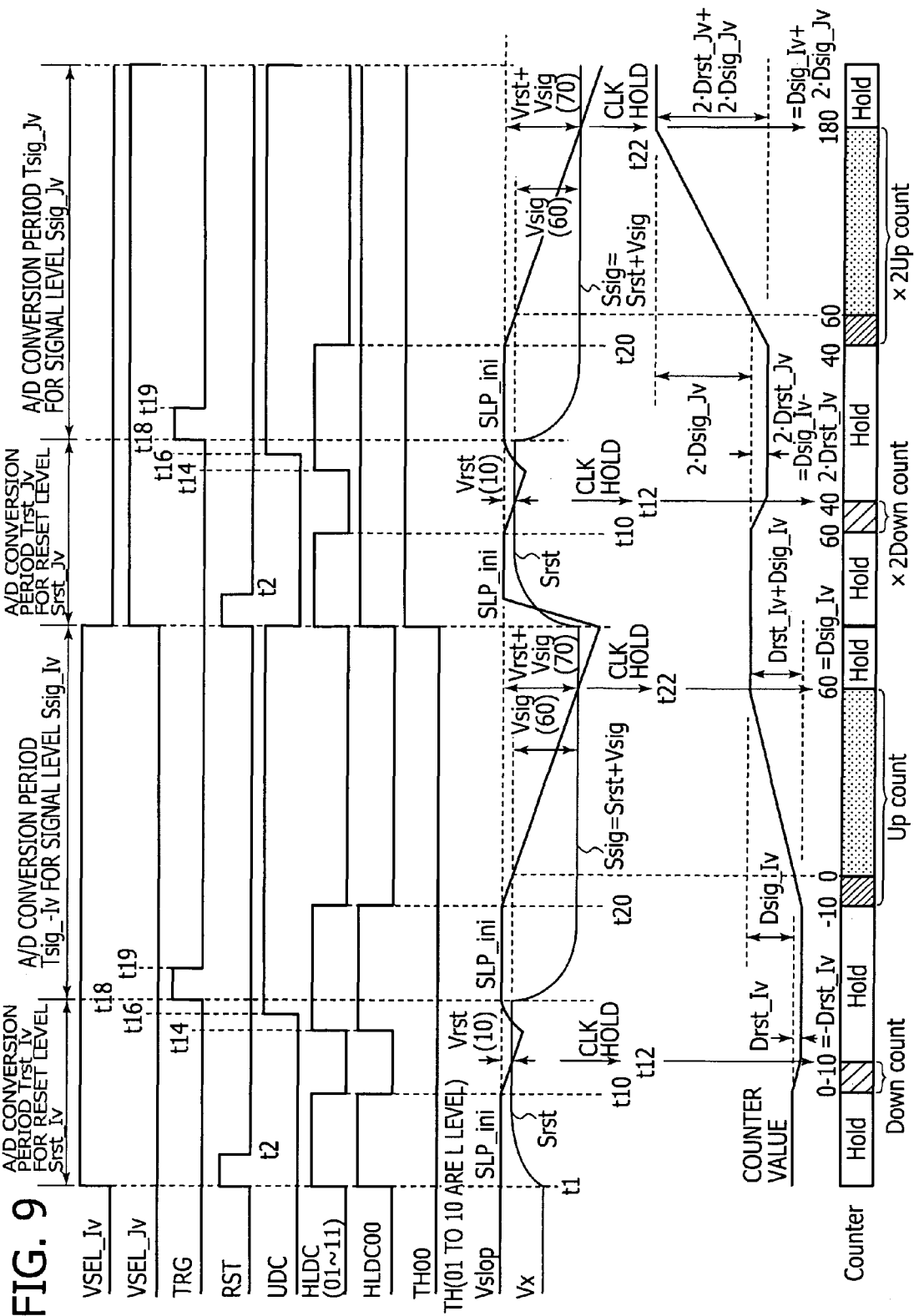
FIG. 9 is a timing chart (first example) illustrating a weighted addition processing in the vertical direction performed in parallel with an A/D conversion processing operation, in a resolution improving method of a first embodiment.
Figure 10:
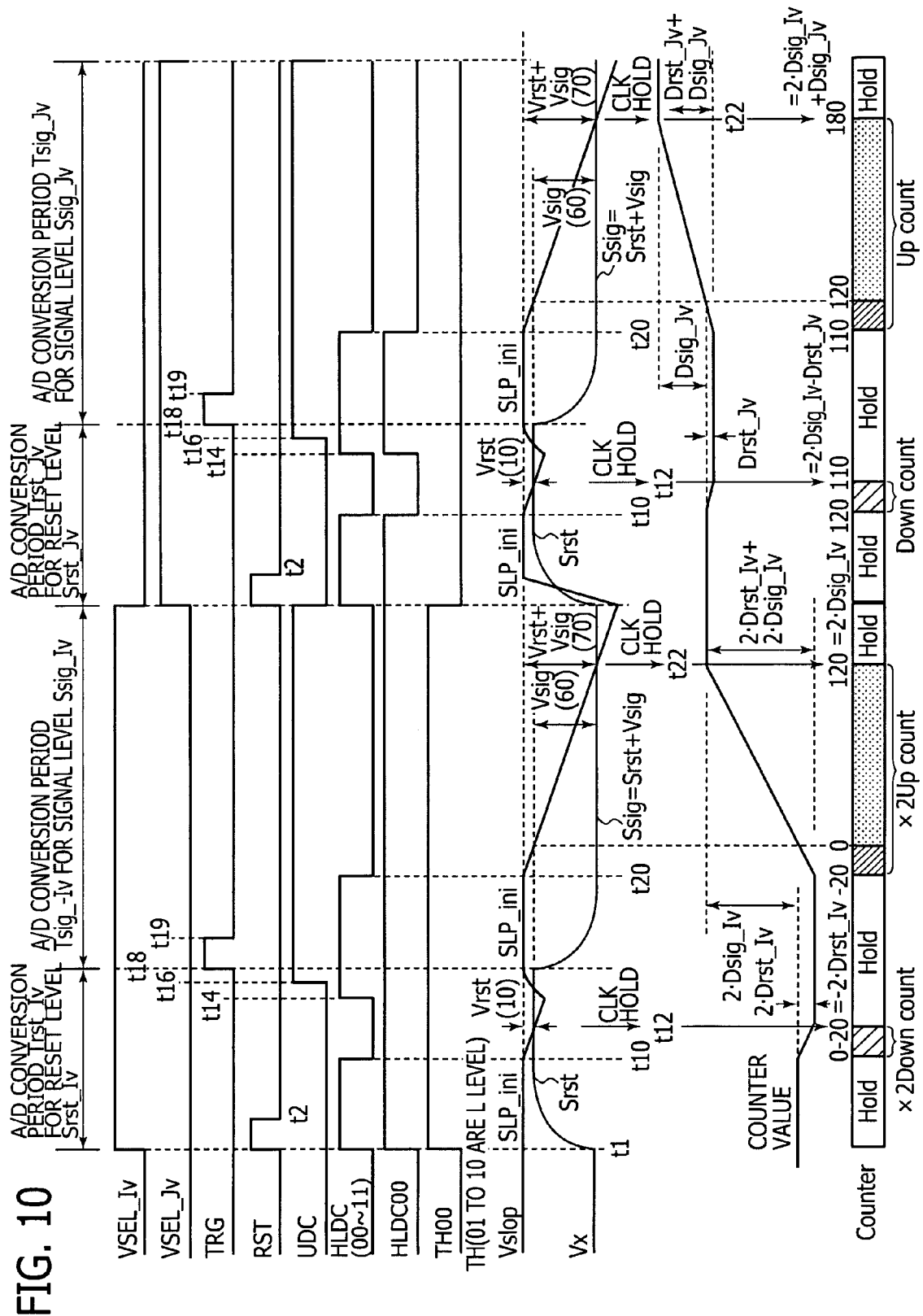
FIG. 10 is a timing chart (second example) illustrating the weighted addition processing in the vertical direction performed in parallel with the A/D conversion processing operation, in the resolution improving method of the first embodiment.
Figure 11:
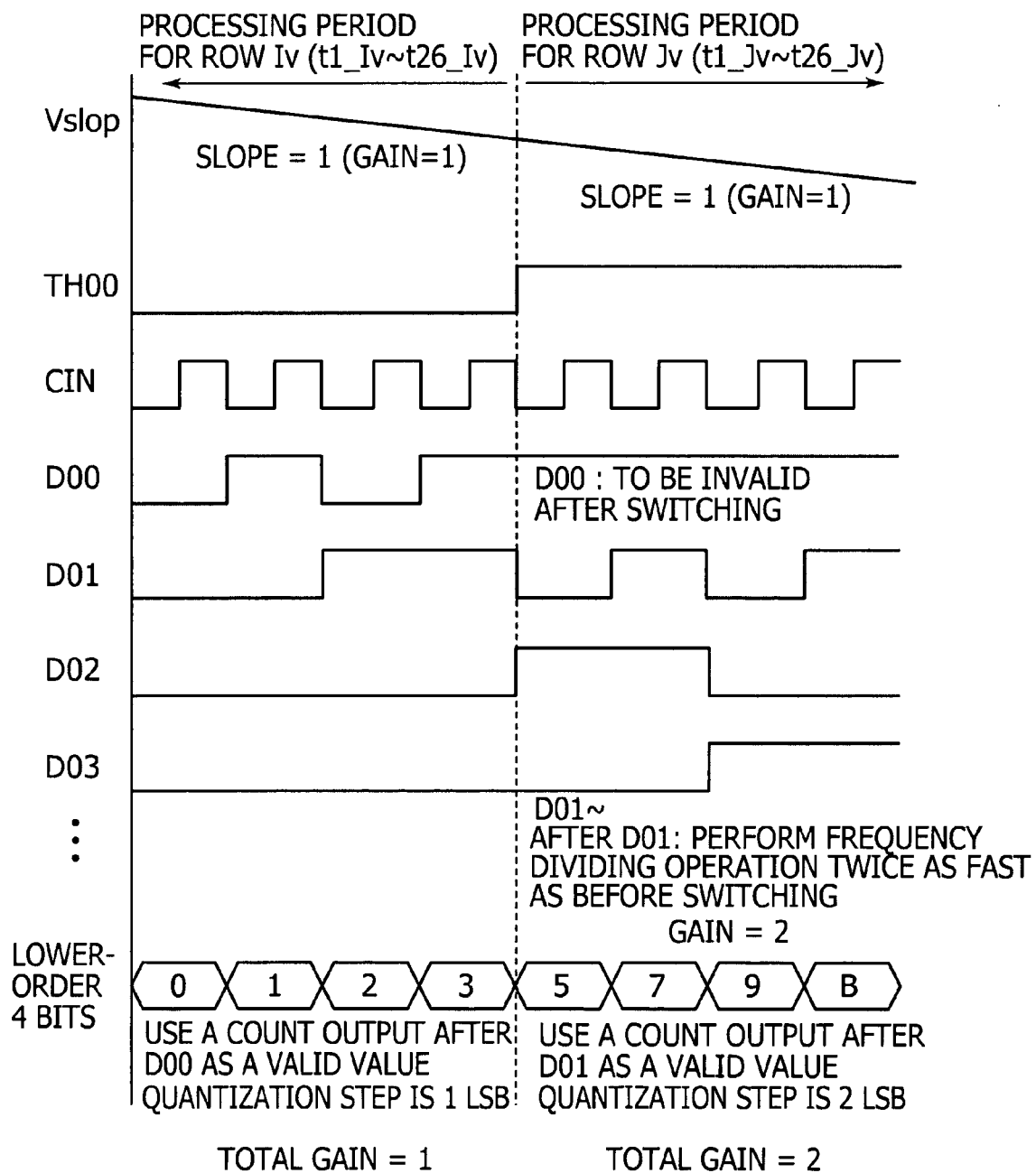
FIG. 11 is a diagram illustrating an effect when a count clock switch is operated in the resolution improving method of the first embodiment.

FIGS. 9 to 11 are diagrams illustrating an example of a first embodiment of a method for solving the lowering of resolution in the digital addition processing in the vertical direction by the counter 254 and in the digital addition processing in the horizontal direction by the digital arithmetic unit 29.

FIGS. 9 and 10 are timing charts illustrating weighted addition processing with respect to the vertical direction, performed in parallel with the A/D conversion processing, in a resolution improving method of the first embodiment. For simplicity of the description, the offset component of the column A/D circuit is ignored. FIG. 11 is a diagram showing an effect when the count clock switch 516 is operated in the resolution improving method of the first embodiment.

Examples showing in FIGS. 9 and 10 are the addition processing for two pixels, and a weighted ratio between the two pixels is set to 1 to 2 (refer to a double-weighted addition). A first example shown in FIG. 9 is a case of the double-weighted addition in the ratio of 1 to 2 in which, of two addition object rows, a weight to a first row Iv during the A/D conversion processing is set to 1, a weight to a next row Jv during the A/D conversion processing is set to 2. On the other hand, a second example shown in FIG. 10 is a case of the double-weighted addition in the ratio of 2 to 1, in which, of two addition object rows, the weight of the first row Iv during the A/D conversion processing is set to 2, the weight to the next row Jv during the A/D conversion processing is set to 1.

If the weight is set to 2 during the addition processing in the vertical direction by the counter 254, that is, if an A/D conversion gain is doubled, any of following methods can be adopted: a first method for reducing a slope of the reference signal Vslop (to ½ times the slope in this example), a second method for increasing a frequency dividing speed of the counter faster (at twice the speed in this example), and a third method for combining a slope adjustment of the reference signal Vslop and a frequency dividing speed adjustment of the counter.

In the first method for reducing the slope of the reference signal Vslop, although it is possible to vary the slope arbitrarily, the A/D conversion period becomes longer. In other words, since a convertible voltage width (that is, a dynamic range) becomes narrowed during the A/D conversion period of a predetermined length, there are some drawbacks if the A/D conversion processing is required to operate at a high-speed or a broad dynamic range.

In contrast to the first method, the second method of increasing the frequency dividing speed of the counter faster, the weight can be set without exerting any influence on the A/D conversion period or the dynamic range. However, if the count clock CK0 itself to be supplied to the counter 254 is changed, the clock frequency can be arbitrarily changed, however, as adopted in the present embodiment, the weight value is limited to a power of two if adopting a mechanism of changing the frequency dividing speed of the counter 254 by a bit unit without changing the clock frequency of count clock CK0.

On the other hand, in the third method for combining the slope adjustment of the reference signal Vslop and the frequency dividing speed adjustment of the counter, respective merits of the adjustments can be incorporated. Even if adopting the mechanism for changing the frequency dividing speed of counter 254 by a bit unit without changing the clock frequency of the count clock CK0, it is possible to set an arbitrary weight value without exerting any influence on the A/D conversion period or the dynamic range.

[Weighted Addition in the Vertical Direction]

As shown in FIG. 9, in a case where a signal of the first row Iv of the two addition object rows is read out and the A/D conversion processing is performed thereon, first, the vertical selection signal φVSEL_Iv of the read-out object row Iv is set to the active H, and the output of the pixel signal So to the vertical signal line 19 is permitted. At this time, all of the data holding control pulses HLDC00 to HLDC11 are initially set to the active H (t1_Iv to t10_Iv) and set to the inactive L during the comparison processing and the count processing (t10_Iv to t14_Iv), and also, all of the count clock control signals TH00 to TH11 are set to the inactive L (t1_Iv to t26_Iv). Accordingly, by the comparison processing and the count processing (t1_Iv to t26_Iv), the counter 254 holds the digital value Dsig_Iv of Vsig_Iv (t26_Iv). This is the same as the processing shown in FIG. 7.

Next, in order to read out a signal of the next row Jv of the two addition object rows to perform the A/D conversion processing, the vertical selection signal φVSEL_Jv of the read-out object row Jv is set to the active H and the output of the pixel signal So to the vertical signal line 19 is permitted. At this time, without resetting the counter 254, the read-out operation and the A/D conversion processing for a signal of the unit pixel 3 in the row Jv (t1_Jv=t26_Iv) are successively performed. This is also the same as the processing shown in FIG. 7.

On the other hand, the characteristic feature of the present embodiment is as follows. When processing on the next row Jv (t1_Jv to t26_Jv), while changing the slope of the reference signal Vslop with the same as in the processing for the first row Iv (t1_Iv to t26_Iv), the data holding control pulse HLDC00 to the data holding unit 512_00 is set to the active H for the whole period (t1_Jv to t26_Jv). Meanwhile, the data holding control pulse HLDC01 to HLDC10 to the rest of the data holding units 512_01 to 512_10 are initially set to the active H (t1_Jv to t10_Jv) and set to the inactive L during the comparison processing and the count processing (t10_Jv to t14_Jv). Further, the count clock control signal TH00 is set to the active H, and all of the rest of the count clock control signals TH01 to TH11 are set to the inactive L (t1_Iv to t26_Iv).

In this manner, the data holding control pulse-HLDC00 first becomes the active H, and data recorded in the least significant bit flip-flop 510_00 is held. The least significant bit output becomes practically invalid when the next row Jv is processed (t1_Jv to t26_Jv). Accordingly, the processing for the next row Jv becomes a low resolution process.

When the next row Jv is processed (t1_Jv to t26_Jv), if the count clock control signal TH00 becomes the active H, an input clock of the least significant bit (at 0 bit) flip-flop 510_00 is transferred to a clock terminal of a second stage (at 1 bit) flip-flop 510_01. By transferring the least significant bit clock cycle to the next bit, the speed of the frequency dividing operation of the rest of the higher-order bit outputs, except for the least significant bit, is increased two times faster, the counter 254 counts up twice faster while performing quantization steps more coarsely than before.

For example, FIG. 11 shows the output from the flip-flops 510 of each bit when the count clock control signal TH00, the slope of the reference signal Vslop (and a gain in accordance with the slope) and the frequency dividing speed are changed. When the count clock control signal TH00 is switched to the active H, the count clock CIN supplied to the least significant bit flip-flop 510_00 is transferred to the second stage flip-flop 510_01, so that, after switching, the higher-order bit flip-flops can operate faster than before the switching. However, since the previous least significant bit output becomes invalid, the quantization is performed more coarsely than before.

For example, if a cycle of a count output D00 of the first stage flip-flop 510_00 is 100 MHz before the count clock control signal TH00 is switched, a cycle of a count output D01 of the second stage flip-flop 510_01 is 50 MHz. Meanwhile, when the count clock control signal TH00 is switched to the H level, the cycle of the count output D01 of the second stage flip-flop 510_01 is 100 MHz, so that the frequency dividing operation in the higher-order bit flip-flop 510 is operated a speed twice faster.

At this time, the slope of the reference signal Vslop is the same in the processing for the first row Iv (1_Iv to t26_Iv) and in the processing for the next row Jv (t1_Jv to t26_Jv). Accordingly, the relation between the counter value and the voltage value is $\Delta V/\Delta t$ during the processing for the first row Iv and a total gain of the A/D conversion processing becomes 1, on the other hand, the relation between the counter value and the voltage value is 2 $\Delta V/\Delta t$ during the processing for the next row Jv and the total gain of the A/D conversion processing becomes 2.

More specifically, in the present embodiment, when the next row Jv is processed (t1_Jv to t26_Jv), the frequency dividing speed of the counter is only made to K-times the speed (two times in the previous example), without changing the slope of the reference signal Vslop from the processing for the first row Iv. Accordingly, a double gain is applied to the A/D conversion processing for the signal component Vsig_Jv of the next row Jv compared to the A/D conversion processing for the signal component Vsig_Iv of the first row Iv.

Accordingly, assuming that a voltage value (conversion coefficient) per one digit in the A/D conversion for the first row Iv is $\alpha$ [V/digit] and an increasing degree of the speed in the counter 254 (corresponding to a gain in the counter 254) is Lv, a voltage value (conversion coefficient) per one digit in the A/D conversion for the next row Jv becomes Lv×$\alpha$. In the previous example, Lv=2 and the voltage value is 2$\alpha$.

Thus, the digital value to be held in the counter 254 after the completion of the A/D conversion for the row Jv, that is, the final counter value of the weighted digital addition processing, becomes "$\alpha$×Vsig_Iv+2$\alpha$×Vsig_Jv."

For example, it is assumed that, as shown as digital values in brackets on the line plot of the pixel signal voltage Vx in FIG. 9, both of the signal components Vsig_Iv and Vsig_Jv in the row Iv and the row Jv are 60, and both of the reset levels Srst_Iv and Srst_Jv thereof are 10.

In this case, in the A/D conversion for the signal level Ssig_Iv (signal component Vsig_Iv) in the row Iv, by performing the up-counting from the count value "−Drst_Iv" (=−10) obtained by the A/D conversion for the reset level Srst_Iv as a starting point, the count value "−10+70=60=Dsig_Iv" is to be held in the counter 254 after the processing.

Thereafter, in the A/D conversion for the row Jv, the count value "60=Dsig_Iv" obtained by the A/D conversion for the row Iv is used as a starting point, and the down-counting is first performed on the reset level Srst_Jv, and the value to be held in the counter 254 becomes "Dsig_Iv−2·Drst_Jv=50−2×10=40". Further, the up-counting is performed on the signal level Ssig_Jv from the count value 40 used as a starting point, and a count value to be stored in the counter 254 after the processing becomes "40+2×70=180." The count value represents the value "Dsig_Iv+2·Dsig_Jv" which is obtained by adding a double of digital value Dsig_Jv in the row Jv to the digital value Dsig_Iv in the row Iv.

In the first example shown in FIG. 9, the addition result "Dsig_Iv+Lv·Dsig_Iv" is obtained by making the frequency dividing operation to Lv (=2) times the speed in the processing for the next row Jv. However, as the second example shown in FIG. 10, when the first row Iv is processed, if the frequency dividing operation of the counter is made to Lv (=2) times faster than the frequency dividing operation for processing the next row Jv, "Lv·Dsig_Iv+Dsig_Iv" can be obtained as the addition result.

In the previous example, only the frequency dividing operation for the higher-order bit side in the counter is changed to L-times the speed and data of the lower-order bit side is treated as invalid so as to keep the frequency of the initial count clock CIN in the same speed and the increase of the power consumptions in the counter is avoided, which is not essential.

If the increase of the power consumption in the counter is acceptable, instead of performing the switching operation by the count clock switch 516, the initial count clock CIN itself may be changed to a high frequency with the use of a high-speed clock generated by the multiple function of the clock converter 23 so that the entire count executing section 504 can perform the frequency dividing operation at a high-speed. In this manner, since all of the bit data can be used as valid data, the A/D conversion accuracy is not lowered and the addition processing in the vertical direction can be implemented within the column A/D circuit 25.

Further, in order to control the flip-flops 510 to perform the counting operation (frequency dividing operation) at high-speed, the circuit is configured controlled so that, while keeping the weighted relation of bits of the flip-flop output at constant and the lower-order bit output is invalid, the frequency dividing operations of the rest of the higher-order bit output are performed at high-speed. However, this is merely one example, and any configuration may be possible as far as it can increase the speed of the frequency dividing operation of the flip-flops 510, and various modifications are possible.

For example, switch means may be provided, which is for shifting a bit output sequentially to the flip-flops 510 at the lower-order side while omitting the count clock switch 516 for changing a supplying mode of a count clock to be supplied to the flip-flops 510 at each stage. In this case, a data output from the flip-flops 510 at the subsequent stage may be dealt with as invalid. This case also deals with the lower bit data as invalid as the A/D conversion data. However, in this case, a circuit is required for loading a count value of each bit at the time of switching to the preceding stage side. Accordingly, a circuit structure will be more complicated than the structure of using the count clock switch 516 for switching a count clock as shown in the previous example. However, this case has an advantage that the low power consumption can be achieved since the count operation can be stopped, for example, by stopping the supply of count clocks to the flip-flops 510 at the subsequent stage after the switching operation.

Further, although an application example to the case of using an asynchronous counter as the counter 254 has been specifically described, the same idea can be applied to a case of using a synchronous counter. For example, if a synchronous counter is used, each flip-flop 510 is made to operate by using a common count clock, and each flip-flop 510 requires a gate circuit that allows a value of each flip-flop 510 to be inverted when values of the lower-order bits are 1 (at the up-counting) or values of all of the lower-order bits are 0 (at the down-counting).

In such structure, in order to increase the speed of the frequency dividing operation of the flip-flops 510 faster, a switch circuit may be provided to take a gate circuit output at a further lower-order bit side. However, a circuit structure will be more complicated than the structure of using the count clock switch 516 for switching a count clock in an asynchronous counter.

Alternatively, as described in the modification example of using an asynchronous counter, it may be configured so that a circuit is provided for loading a count value of each bit at the time of switching to the lower-order side, and the switch means is provided for shifting a bit output to the lower-order side.

[Double-Weighted Addition in the Horizontal Direction and a Final Addition Image]

FIGS. 12 to 14 are diagrams showing the pixel arrangement during the addition operation in the vertical direction and in the horizontal direction in the resolution improving method of the first embodiment. Similar to FIGS. 8A to 8D, as an example of performing the addition processing on two rows and two columns, it is shown a case where the Bayer arrangement filter which has color filters of R, G, B (G is denoted by Gr in a row R and by Bb in a row B to distinguish each other) is used as a color separation filter.

FIGS. 12A to 12F show a case where pixels are taken in the same row and column order shown in FIG. 8A and a double-weighted addition shown in FIG. 9 is applied on the pixels. FIGS. 13A to 13F show a case where pixels are taken in the same row and column order shown in FIG. 8A and a combination of the double-weighted addition shown in FIG. 9 and the double-weighted addition shown in FIG. 10 is applied on the pixels. FIGS. 14A to 14F show a case where the order of taking pixels is different from the order shown in FIG. 8A and the double-weighted addition as shown in FIG. 9 is applied on the pixels.

As to the double-weighted addition processing in the horizontal direction, the pixel added with the Lv-times weight in the vertical direction is transferred to the digital arithmetic unit 29, and the digital arithmetic unit 29 performs the addition processing in the horizontal direction. Performing the addition processing is the same as the processing shown in FIGS. 8A to 8D.

In the present embodiment, similar to the Lv-times (=2) weight addition processing, an Lh-times weighted addition is performed. Specifically, the addition data ADD_Jh of the next column Jh is obtained by adding an Lh-times weight to the addition data ADD_Ih of the first column Ih. Typically, it is set to Lh=Lv. According to the previous example, for example, it is set to be a double weight.

[Example of Double-Weighted Addition in the Ratio of 1 to 2]

In the case where pixels are taken in the same row and column order shown in FIG. 8A and the double-weighted addition shown in FIG. 9 is applied the pixels, first, as shown in FIG. 12A (same as FIG. 8A), the vertical selection signal φVSEL assigns the rows in the order of a first row, third row, second row, fourth row, fifth row, seventh row, sixth row and eighths row, . . . and so on, from the bottom.

As shown in the schematic diagram (FIG. 12B) in which the pixels are rearranged in the order to be read out by the column processor 26, each column A/D circuit 25 disposed in each vertical column of the column processor 26 performs the addition operation when two rows having the same color are input to the odd-numbered rows or the even-numbered rows in the vertical direction.

At this time, as can be understood from the description of FIG. 9, the frequency dividing operation of the counter 254 for the next row Jv is two-times faster than the processing for the first row Iv, and the addition processing is performed by setting a weight for the first row Iv (the first row, second row, fifth row, and sixth row) to 1, and a weight for the next row Jv (the third row, fourth row, seventh row, and eighth row) to 2 as denoted by "×2" in the right side of the drawing.

For example, the addition processing is sequentially performed on: the R component in the first row and the double R component in the third row and the Gr component in the first row and the double Gr component in the third row; the Gb component in the second row and the double Gb component in the fourth row and the B component in the second row and the double B component in the fourth row; the R component in the fifth row and the double R component in the seventh row and the Gr component in the fifth row and the double Gr component in the seventh row; the Gb component in the sixth row and the double Gb component in the eighth row and the B component in the sixth row and the double B component in the eighth row . . . and so on. In other words, when the same color components of two pixels in the vertical direction are input to the column A/D circuit 25, the column A/D circuit 25 performs the addition operation on the same color components by making the component of the next Jv double of the first row Iv.

The schematic diagram after the addition operation is shown in FIG. 12C. The center of pixels after the addition is shifted to the next row Jv side to which a larger weight is applied, instead of the center row between the two addition object rows, that is, the centroid in the vertical direction during the addition. Specifically, instead of the centroid in the vertical direction during the addition, a position obtained by internally dividing a spatial distance between the first row Iv and the next row Jv in the ratio of 2 to 1 becomes the center after the addition, and the center is shifted to the next row Jv side to which the larger weight is applied, by ⅓ row (refer to FIG. 12E).

For example, each of the centers are at: a position shifted to the third row side by ⅓ row from the second row after the double-weighted addition for the first row and third row; a position shifted to the fourth row side by ⅓ row from the third row after the double-weighted addition for the second row and fourth row; a position shifted to the seventh row side by ⅓ row from the sixth row after the double-weighted addition for the fifth row and seventh row; and a position shifted to the eighth row side by ⅓ row from the seventh row after the double-weighted addition for the sixth row and eighth row.

The digital arithmetic unit 29 sequentially takes the row addition data ADD, and performs the addition operation to the image in the above state when the same colors are input in the horizontal direction. For example, the digital arithmetic unit 29 sequentially performs the addition operation on: the R component in the first column and the double R component in the third column and the Gr component in the first column and the double Gr component in the third column; the Gb component in the second column and the double Gb component in the fourth column and the B component in the second column and the double B component in the fourth column; the R component in the fifth column and the double R component in the seventh column and the Gr component in the fifth column and the double Gr component in the seventh column; the Gr component in the sixth column and the double Gb component in the eighth column and the B component in the sixth column and the double B component in the eighth column, . . . and so on.

In other words, when the addition data of the same color components of two columns in the horizontal direction are input to the digital arithmetic unit 29, the digital arithmetic unit 29 performs the addition operation on the same color components by making the component of the next column Jv double of the first column Iv.

In the schematic diagram after the addition operation, the center of pixels after the addition is shifted to the next column Jh side to which a larger weight is applied, instead of the center column of the two addition object columns, that is, the centroid in the horizontal direction during the addition. Specifically, instead of the centroid in the horizontal direction during the addition, a position obtained by internally dividing a spatial distance between the first column Ih and the next column Jh in the ratio of 2 to 1 becomes the center after the addition, and the center is shifted to the next columns Jh side to which the larger weight is applied, by ⅓ column (refer to FIG. 12F).

For example, each of the centers are at: a position shifted to the third column side by ⅓ column from the second column after the double-weighted addition for the first column and third column; a position shifted to the fourth column side by ⅓ column from the third column after the double-weighted addition for the second column and fourth column; a position shifted to the seventh column side by ⅓ column from the sixth column after the double-weighted addition for the fifth column and seventh column; and a position shifted to the eighth column side by ⅓ column from the seventh column after the double-weighted addition for the sixth column and eighth column.

If the centers after the addition in the vertical direction shown in FIG. 12C are combined, the center after the addition is a position obtained by internally dividing a spatial distance between the first row Iv and the next row Jv in the ratio of 2 to 1 and by internally dividing a spatial distance between the first column Ih and the next column Jh in the ratio of 2 to 1, as shown in the right in FIG. 12D.

In this case, as can be understood from the comparison with the original positions of the pixels shown in the left side in FIG. 12D, although it is different from the state shown in the right side of FIG. 8D, the spatial positions of each color are not arranged at equal intervals.

[Example of Combined Double-Weighted Addition in the Ratio of 1 to 2 and in the Ratio of 2 to 1]

In the case where pixels are taken in the same row and column order shown in FIG. 8A and the double-weighted addition is applied on the pixels by combining the operation shown in FIG. 9 and the operation shown in FIG. 10, the double-weighted addition in the ratio of 1 to 2 (the mode in FIG. 9) and the double-weighted addition in the ratio of 2 to 1 (the mode in FIG. 10) are alternately repeated. This achieves the weighted addition in view of a shifting direction.

For example, as shown in FIG. 13A (same as FIG. 12A), the vertical selection signal φVSEL assigns the rows in the order of the first row, third row, second row, fourth row, fifth row, seventh row, sixth row and eighth row from the bottom.

As shown in the schematic diagram (FIG. 13B) in which the pixels are rearranged in the order to be read out by the column processor 26, each column A/D circuit 25 disposed in each vertical column of the column processor 26 performs the addition operation when the two same color rows of the odd-numbered rows or the even-numbered rows are input in the vertical direction.

At this time, the double-weighted addition in the ratio of 1 to 2 shown in FIG. 9 is performed for the first addition processing and the double-weighted addition in the ratio of 2 to 1 shown in FIG. 10 is performed for the next addition processing. In this manner, the counter 254 performs the frequency dividing operation for the first row Iv twice as fast as the processing for the next row Jv in the first addition processing, and the addition processing is performed by setting a weight of the first row Iv (first row and fifth row) to 2, as denoted as "×2" in the right side in the drawing, and a weight of the next row Jv (third row and seventh row) to 1. In the next addition processing, the counter 254 performs the frequency dividing operation for the next row Jv twice as fast as the processing for the first row Iv, and the addition processing is performed by setting a weight of the first row Iv (second row and sixth row) to 1, and a weight of the next row Jv (fourth row and eighth row) to 2 as denoted as "×2" in the right side in the drawing. The addition processing for the first row, fourth row, fifth row and eighth row are performed by doubling the weight.

For example, the addition processing is sequentially performed on: the double R component in the first row and the R component in the third row and the double Gr component in the first row and the Gr component in the third row; the Gb component in second row and the double Gb component in the fourth row and the B component in the second row and the double B component in the fourth row; the double R component in the fifth row and the R component in the seventh row and the double Gr component in the fifth row and the Gr component in the seventh row; the Gb component in the sixth row and the double Gb component in the eighth row and the B component in the sixth row and the double B component in the eighth row, and so on.

In other words, when the same color components of two pixels in the vertical direction are input to the column A/D circuit 25, the column A/D circuit 25 performs the addition operation on the same color components by doubling the component of the first row IV compared with that of the next Jv in the first addition operation, whereas, the A/D circuit 25 performs the addition operation on the same color components by doubling the component of the next row Jv compared with that of the first row Iv in the next addition processing, and repeats these operations.

The schematic diagram after the addition operation is as shown FIG. 13c, the center of the pixels after the addition is shifted to the next row Jv side to which a larger weight is applied, instead of the center row of the two addition object rows, that is, the centroid in the vertical direction during the addition. Specifically, instead of the centroid in the vertical direction during the addition, a position obtained by internally dividing a spatial distance between the first row Iv and the next row Jv in the ratio of 2 to 1 becomes the center after the addition, and the center is shifted to the next row Jv side to which a larger weight is applied, by ⅓ row (refer to FIG. 13E). This is the same as the case of FIG. 12C. However, the shift directions due to the weighting alternately differ in this case, the centers of the pixels after addition differ from those in FIG. 12C.

For example, each of the centers are at: a position shifted to the first row side by ⅓ row from the second row after the double-weighted addition in the ratio of 2 to 1 for the first row and third row; a position shifted to the fourth row side by ⅓ row from the third row after the double-weighted addition in the ratio of 2 to 1 for the second row and fourth row; a position shifted to the fifth row side by ⅓ row from the sixth row after the double-weighted addition in the ratio of 2 to 1 for the fifth row and seventh row; and a position shifted to the eighth row side by ⅓ row from the seventh row after the double-weighted addition in the ratio of 1 to 2 for the sixth row and the eighth row.

The digital arithmetic unit 29 sequentially takes the row addition data ADD and performs the addition operation to the image in the above state when the same colors are input in the horizontal direction. At this time, as similar to the processing in the vertical direction, the double-weighted addition in the ratio of 2 to 1 and the double-weighted addition in the ratio of 1 to 2 are alternately performed.

More specifically, the first addition processing is performed by setting the weight of the first column Ih (first column and fifth column) to 2 as denoted by "×2" in the lower side in the drawing, and the weight of the next column Jh (third column and seventh column) to 1. The next addition processing is performed by setting the weight of the first column Ih (second column and sixth column) to 1, and the weight of the next column Jh (fourth column and eighth column) to 2 as denoted by "×2" in the lower side in the drawing. The addition processing for the first column, fourth column, fifth column and eighth are performed by doubling the weight.

For example, the digital arithmetic unit 29 sequentially performs the addition operation on: the double R component in the first column and the R component in the third column and the double Gr component in the first column and the Gr component in the third column; the Gb component in the second column and the double Gb component in the fourth column and the B component in the second column and the double B component in the fourth column; the double R component in the fifth column and the R component in the seventh column and the double Gr component in the fifth column and the Gr component in the seventh column; the Gb component in the sixth column and the double Gb component in the eighth column and the B component in the sixth column and the double B component in the eighth column, . . . and so on.

In other words, when the same color components of two pixels in the horizontal direction are input to the digital arithmetic unit 29, the digital arithmetic unit 29 performs the addition operation on the same color components by making the component of the first column Ih double of the next Jv in the first addition operation, whereas, the digital arithmetic unit 29 performs the addition operation on the same color components by making the component of the second row Jv double of the first row Iv in the next addition processing, and repeats these operations.

In the schematic diagram after the addition operation, with respect to the horizontal direction, the center of pixels after the addition is shifted to the next column Jh side to which the larger weight is applied, instead of the center row of the two addition object rows, that is, the centroid in the horizontal direction during the addition. Specifically, instead of the centroid in the horizontal direction during the addition, a position obtained by internally dividing a spatial distance between the first column Ih and the next column Jh in the ratio of 2 to 1 becomes the center after the addition, and shifted to the next columns Jh side to which the larger weight is applied, by ⅓ column (refer to FIG. 13F). This is the same as the case of FIG. 12D, however, since the shift directions by weighting are alternately changed in this example, the pixel center after the addition becomes different from the case of FIG. 12D.

For example, each of the centers are at: a position shifted to the first column side by ⅓ column from the second column after the double-weighted addition in the ratio of 2 to 1 for the first column and third column; a position shifted to the fourth column side by ⅓ column from the third column after the double-weighted addition in the ratio of 1 to 2 for the second column and fourth column; a position shifted to the fifth column side by ⅓ column from the sixth column after the double-weighted addition in the ratio of 2 to 1 for the fifth column and seventh column; and a position shifted to the eighth column side by ⅓ column from the seventh column after the double-weighted addition in the ratio of 1 to 2 for the sixth column and eighth column.

If the centers after the addition in the vertical direction shown in FIG. 13C are combined to the above, the center after the addition is a position obtained by internally dividing: a spatial distance between the first row Iv and the next row Jv in the ratio of 2 to 1, and a spatial distance between a the first column Ih and the next column Jh in the ratio 2 to 1, in each color, as shown in the right side of FIG. 13D. In this example, pixels are read out in the same row order shown in FIG. 8A, and the shift direction due to weighting during the addition processing is alternately changed. Therefore, the pixel centers after the addition are arranged at more equal intervals than the case of performing the simple addition. As a result, a higher resolution signal (digital data) can be obtained than the case of performing a simple addition processing in which the weight values are uniformly applied.

[Example of the Switching of Taking Order and the Double-Weighted Addition in the Ratio of 1 to 2]

In the case where the double-weighted addition in the ratio of 1 to 2 shown in FIG. 9 is applied and the order of taking the row or column are differed from the case shown in FIG. 8A, by alternately switching the taking order, practically, the double-weighted addition in the ratio of 1 to 2 and the double-weighted addition in the ratio of 2 to 1 are alternately repeated, in relation to the spatial relations in the arrangement of rows and the columns. This achieves the weighted addition in view of the shifting direction.

For example, the addition processing in the vertical direction, as shown in FIG. 14A, the vertical selection signal φVSEL assigns the rows in the order of the third row, first row, second row, fourth row, seventh row, fifth row, sixth row and eighths row from the bottom.

As shown the schematic diagram (FIG. 14B) in which the pixels are rearranged in the order to be read out by the column processor 26, each column A/D circuit 25 disposed in each vertical column of the column processor 26 performs the addition operation when the two same color rows of the odd-numbered rows or the even-numbered rows are input in the vertical direction. At this time, since the column A/D circuit 25 is operated at the timing shown in FIG. 9, the counter 254 performs the frequency dividing operation for the next row Jv twice as fast as the processing for the first row Iv at every addition operations. The addition processing are performed by setting the weight of the first row Iv (third row, second row, seventh row, and sixth row) to 1 and the weight of the next row Jv (first row, fourth row, fifth row and eighth row) to 2, as denoted by "×2" in the right side in the drawing.

Under the control of the vertical scanning circuit 14 in advance, in relation to the spatial relations in the arrangement of rows, practically, the rows Iv and Jv to be subjected to the addition are switched to be alternately processed by the double-weighted addition in the ratio of 1 to 2 and by the double-weighted addition in the ratio of 2 to 1, repeatedly. In terms of performing the addition processing by doubling the weight of the first row, fourth row, fifth row, and eighth row, the processing is the same as the case shown in FIGS. 13A to 13F. As a result, as shown in FIG. 14C, the schematic diagram after the addition operation becomes the same diagram shown in FIG. 13C.

The digital arithmetic unit 29 sequentially takes the row addition data ADD and performs the addition operation to the image in the above state when the same colors are input in the horizontal direction. At this time, similar to the processing in the vertical direction, the digital arithmetic unit 29 takes the addition data in the order of the third column, first column, second column, fourth column, seventh column, fifth column, sixth column, and eighth column, . . . and so on, from the left, and performs the double-weighted addition in the ratio of 1 to 2.

At every addition operations, the addition processing is performed by setting the weight for the first column Ih (third column, second column, seventh column and sixth column) to 1, and the weight for the next column Jh (first column, fourth column, fifth column, and eighth column) to 2 as denoted by "×2" in the lower side in the drawing.

Under the control of the horizontal scanning circuit 12 in advance, in relation to the spatial relations in the arrangement of columns, practically, the columns Ih and Jh to be subjected to the addition are switched to be alternately processed by the double-weighted addition in the ratio of 1 to 2 and by the double-weighted addition in the ratio of 2 to 1, repeatedly. In terms of performing the addition processing by doubling the weight of the first column, fourth column, fifth column, and eighth column, the processing is the same as the case shown in FIGS. 13A to 13F. As a result, as shown in FIG. 14D, the schematic diagram after the addition operation becomes the same diagram shown in FIG. 13D.

In this example, at every addition processing, as the weighting control for the counter 254 (the control for the count clock control signal TH, in a specific sense), the double-weighted addition in the ratio of 1 to 2 shown in FIG. 9 is performed, and, practically, the double-weighted addition in the ratio of 1 to 2 and the double-weighted addition in the ratio of 2 to 1 are alternately repeated by alternately switching the order of the rows or columns to be taken, in relation to the spatial relations in the arrangement of rows and the columns. As a result, similar to the case showing in FIG. 13, the pixel centers after the addition are arranged at more equal intervals compared with the case of performing the simple addition. As a result, signals with higher resolution (digital data) can be obtained than the case of performing the simple addition in which the weight values are uniformly applied.

As can be understood from the above description, it is not always possible to certainly arrange the positions of pixels after the addition at equal intervals by simply applying the weighted addition. In order to arrange the pixel centers at more equal intervals after the weighted addition, it should be considered how to select the addition object pixels and what value to be used as the weight value.

Further, when capturing color images, the images may be affected by a color arrangement of a color separation filter. In other words, in order to perform the addition processing without occurring the color mixture and the spatial distance relation is made to be the same color arrangement of the original the color separation filter, it is conceivable that there will be a certain degree of restriction on the relation between the selection of addition object pixels and the weight value.

[Modification Example of the Weight Value]

In the above-mentioned detailed description, the double-weighted addition processing for the two rows and two columns in the Bayer arrangement is described. However, this is merely one example and various modifications may be possible in terms of the weight value, the spatial position for taking the addition object rows and columns, and a number of the addition object rows and columns.

For example, in terms of the weight value, it is not limited to a double, but possible to use a larger number, such as 4, 8 . . . in power of two. For example, in the above-mentioned description, there is shown a case where the counter 254 performs the frequency dividing operation during the A/D conversion processing at twice the speed, but not limited to it, and the flip-flops 510 are controlled to perform the counting operation (frequency dividing operation) at a higher speed. In this case, a quantization step can be performed more coarsely.

For example, if the count execution unit 504 is configured as shown in FIG. 4 and FIG. 5, by setting the count clock control signals TH00 and TH01 to the active H, the frequency dividing operation of the counter 254 for after 2-bit can be increased at 4-times faster. This allow to obtain, for example, digital data "Dsig_Iv+4·Dsig_Iv" by adding the digital value Dsig_Iv of the signal component Vsig_Iv in the row Iv to 4-times the digital value Dsig_Jv of the signal component Vsig_Jv in the row Jv.

Further, by setting the count clock control signal TH02 to the active H, the frequency dividing operation of the counter 254 for after 3-bit can be increased at 8-times faster. This allows to obtain digital data "Dsig_Iv+8·Dsig_Iv" by adding 8-times the digital value Dsig_Jv of the signal component Vsig_Jv in the row Jv to the digital value Dsig_Iv of the signal component Vsig_Iv in the row Iv.

Similarly, if the count clock control signal TH0T (T=S−1) is set to the active H, the frequency dividing operation of the counter 254 for after an S-bit can be increased at 2^S-times faster, so that a gain can be increased 2^times larger. This allows to obtain digital data "Dsig_Iv+2^·Dsig_Iv" by adding the digital value Dsig_Iv of the signal component Vsig_Iv in the row Iv to 2^S-times the digital value Dsig_Jv of the signal component Vsig_Jv in row Jv.

When the frequency dividing operation of the counter is made to the high-speed frequency dividing operation (faster) through several stages, such as L1-times (=2), L2-times (=4), L3-times (=8), . . . and so on, if the lower-order bit outputs are sequentially made invalid and only the frequency dividing operation of the rest of the higher-order bit outputs are carried out at a higher speed to perform the quantization steps more coarsely, the initial count clock for controlling the higher-order bit outputs may be kept at the same speed as the count clock CIN. Although the resolution of the A/D conversion for the signal component Vsig_Jv in the weighted object row Jv is lowered, in terms of the counter operation, there is no practical difference in that the entire counter operates according to the original count clock CIN, and thus, the power consumption is thus not increased.

As described above, the weight value can be applied by a power of two, such as 2-times, 4-times, 8-times, . . . and so on, by changing the setting of the count clock control signal TH, and the weight value can be adjusted so that the spatial positions of pixels after the addition are arranged to obtain images with higher resolution, that is, the pixel positions after the addition can be arranged at equal intervals more completely.

Figure 15:
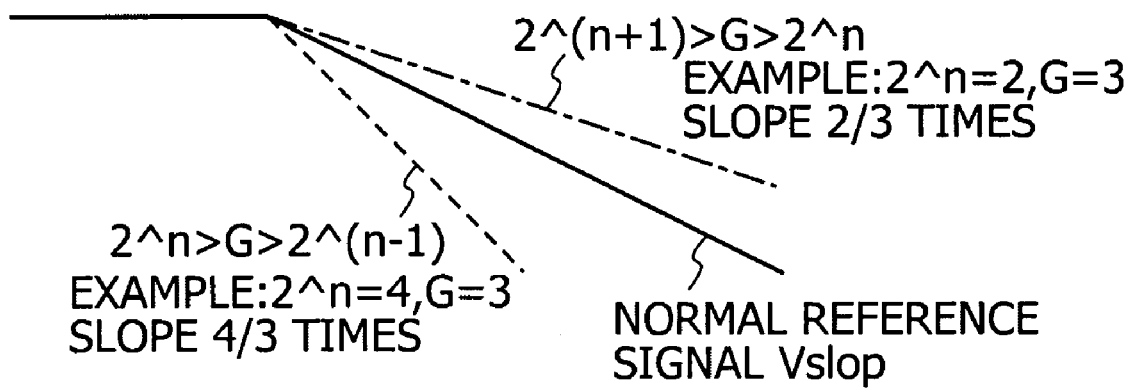
FIG. 15 is a diagram showing an example of a mechanism for setting a weight value of any integer.

FIG. 15 is a diagram illustrating a mechanism for setting the weight value by an arbitrary integer.

In terms of setting the weight value, not only a power of two but also an arbitrary value can be used. In this case, if the slope of the reference signal Vslop is kept at a constant degree, it is good to change the count clock CK0 to be supplied to the counter 254, per se, to a higher-speed clock.

Further, when adopting a mechanism in which, without changing the clock frequency of the count clock CK0, the setting of the count clock control signal TH is changed to change the frequency dividing speed of the counter 254 by a bit unit and a weight value is set by an arbitrary integer, the slope of the reference signal Vslop is adjusted by changing the setting of the slope change instruction signal CHNG. At this time, there are two types of relations between the setting values of the slope of the reference signal Vslop, the setting value of the frequency dividing speed of the counter 254 and a weight value G to be set, as shown in FIG. 15.

Specifically, assuming that the weight value to be set is G, methods conceivable are: a first method in which the frequency dividing speed of the counter 254 is set to $2^n$-times and the slope of the reference signal Vslop is set to $2^n/G$ to satisfy the equation where "$2^{(n+1)}>G>2^n$", and a second method in which the frequency dividing speed of the counter 254 is set to $2^n$-times and the slope of the reference signal Vslop is set to $2^n/G$ to satisfy the equation where "$2^n>G>2^{(n-1)}$." In either methods, a product G is to be obtained by multiplying the A/D conversion gain $2^n$ obtained by increasing the frequency dividing speed faster and the A/D conversion gain $G/2^n$ (a reciprocal of multiplying coefficient of the slope) obtained by changing the slope of the reference signal Vslop.

For example, if the weight value is set to 3, the frequency dividing speed is set to twice the speed and the slope of the reference signal Vslop is set to ⅔-times the slope in the first method, and, in the second method, the frequency dividing speed is set to 4-times the speed and the slope of the reference signal Vslop is set to ⅘-times the slope. As can be understood from the drawing, in the second method, the multiplying coefficient of the frequency dividing speed to be set to the counter 254 is larger, so that the slope of the reference signal Vslop can be larger by the amount of the difference, there is an advantage that the A/D conversion period is made to be shorten even the resolution is lowered. On the other hand, in the first method, although the multiplying coefficient of the frequency dividing speed to be set to the counter 254 is smaller and the A/D conversion period becomes longer, the resolution is not lowered.

As described above, it is possible to change the weight value by using an arbitrary value in addition to a power of two by changing the setting of the count clock control signal TH and the setting of the slope change instruction signal CHNG. Accordingly, the weight value can be adjusted so that the spatial positions of pixels after the addition are arranged at more completely equal intervals, thereby obtaining the images with higher resolution. As described above, it is possible to set the weight value so that the pixel positions after the addition are arranged at completely equal intervals by setting the weight value with an arbitrary value, even in a case where the pixel positions after the addition are not able to be arranged at completely equal intervals by adjusting the weight value with a power of two.

For example, FIGS. 16A to 16F show a case of "the addition in the ratio of 3 to 1+the addition in the ratio of 1 to 3" where the weight value is set to 3, and FIGS. 17A to 17F show a case of "the addition in the ratio of 4 to 1+the addition in the ratio of 1 to 4" where the weight value is set to 4. Arbitrarily setting the adjustment of the weight value by a power of two and the adjustment by an arbitrary value other than a power of two increases flexibility in adjusting the spatial positions of the pixels after the addition and makes it possible to find a proportion of the weight value that allows the spatial positions of pixels after the addition to be arranged at equal intervals.

[The Resolution Improving Method for the Addition Image: Second Embodiment]

FIGS. 18 to 21 are diagrams illustrating the second embodiment of the method for solving the resolution degradation problem in the digital addition processing in the vertical direction by the counter 254 and the digital addition processing in the horizontal direction by the digital arithmetic unit 29.

Figure 18A:
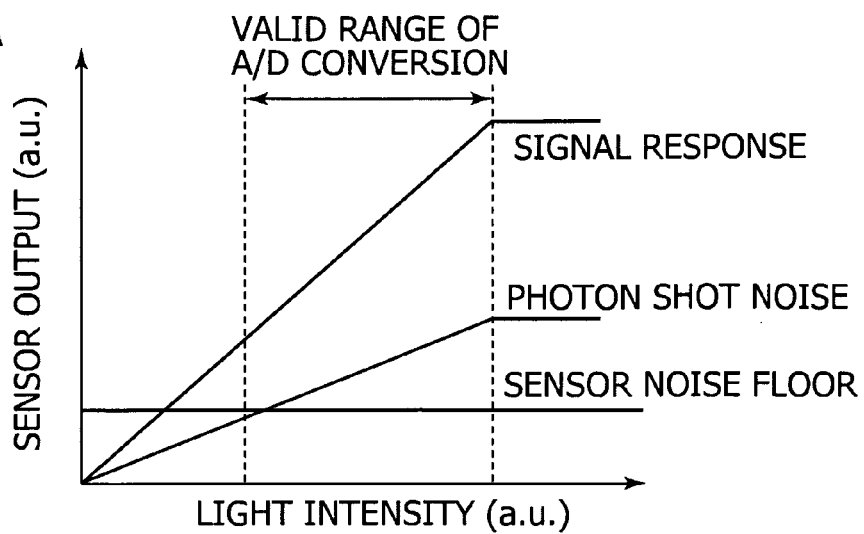
FIGS. 18A to 18C are graphs illustrating an example of a method for shortening a comparison processing period of a single-slope integration A/D conversion system.
Figure 18B:
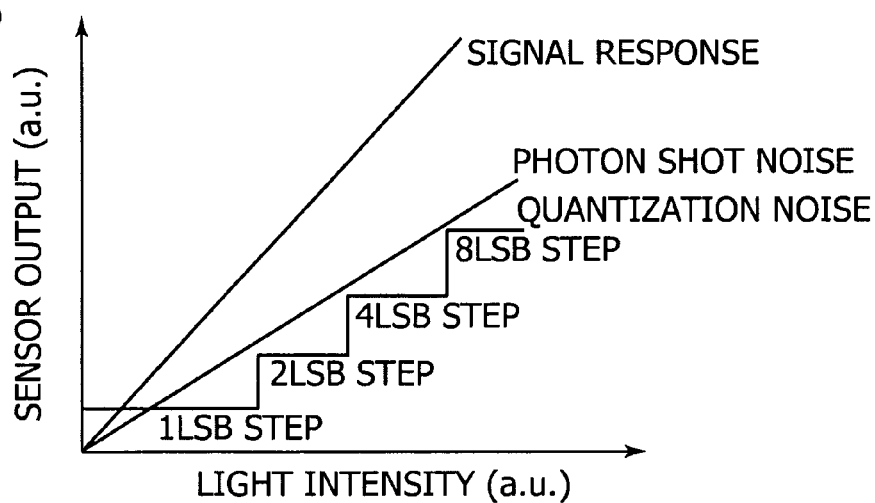
Figure 18C:
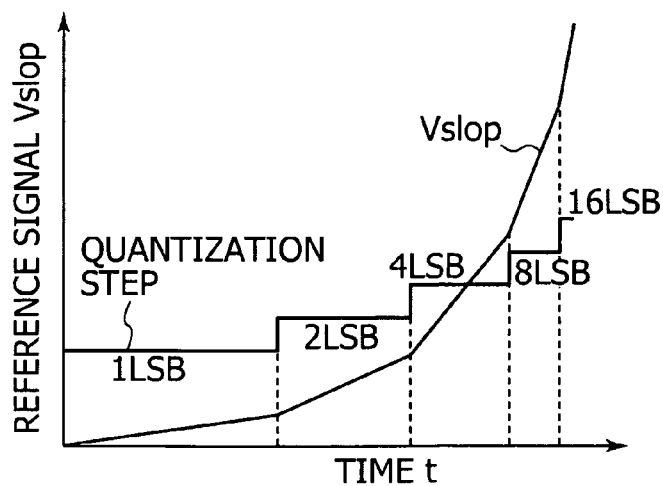

FIGS. 18A to 18C are diagrams illustrating a disadvantage of the single-slope integration A/D conversion system. More particularly, the diagrams explain an influence exerted to the A/D conversion performance, particularly to the conversion processing speed, by the comparison processing period in which the analog pixel signal voltage Vx is compared with the reference signal Vslop used for the digital data conversion, and also illustrating an example of a method for shortening the comparison processing period.

Figure 20:
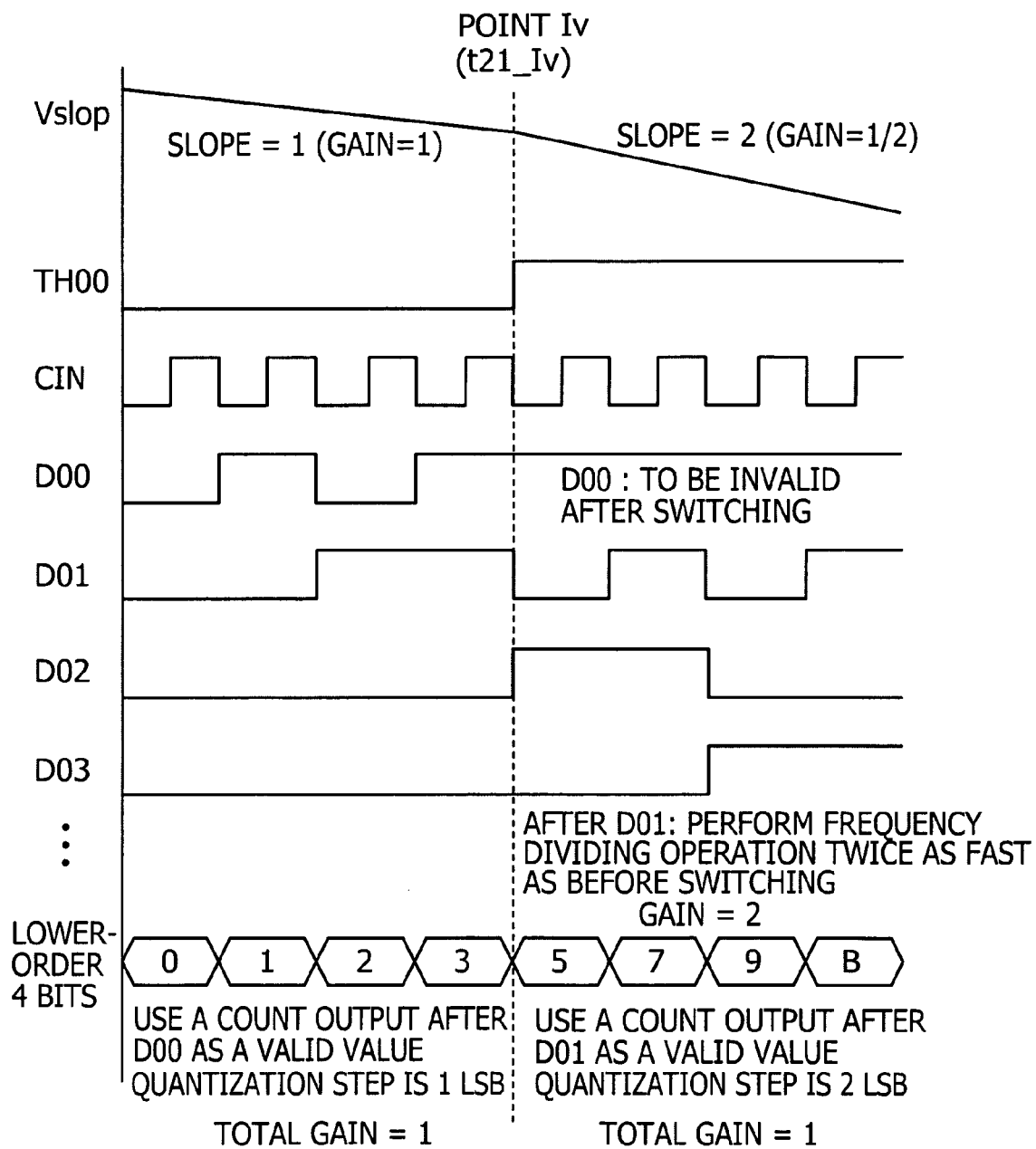
FIG. 20 is a diagram illustrating an effect when the count clock switch is operated in the resolution improving method of the second embodiment.
Figures 21, 22A, 22B:
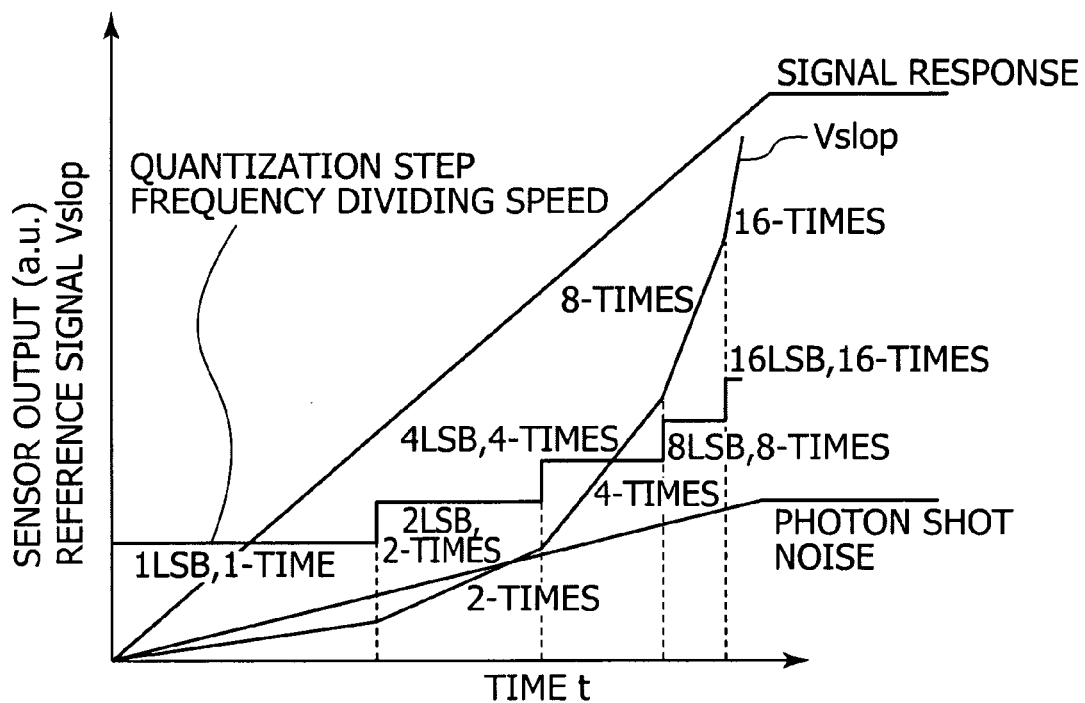
FIG. 21 is a graph showing a relation between a slope change control of a reference signal and a frequency dividing speed control of the counter.
FIGS. 22A and 22B are diagrams illustrating a third embodiment of a method for solving resolution lowering in the digital addition processing in the vertical direction by the counter and the digital addition processing in the horizontal direction by the digital arithmetic unit.

FIG. 19 is a timing chart for illustrating the addition processing with respect to the vertical direction, performed in parallel with the A/D conversion processing, which explains an example of the second embodiment. FIG. 20 is a diagram illustrating an effect when the count clock switch 516 is operated in the resolution improving method of the second embodiment. FIG. 21 is a diagram showing the relation between the control of changing the slope of the reference signal Vslop and the control of the frequency dividing speed of the counter.

In addition to the addition processing operation of the first embodiment, the second embodiment has a characteristic feature in that, even in the processing for one row, when the signal level Ssig is processed, before the comparison processing is completed during the comparison processing period in the voltage comparator 252, the slope of the reference signal Vslop and the frequency dividing speed of the counter 254 are made to change in conjunction with each other so as to keep an A/D conversion gain at constant value in the row, that is, the weight value with respect to the pixels in the row are kept at constant value. This makes it possible to obtain the addition images with higher resolution at a high-speed.

Specifically, the slope change instruction signal CHNG is supplied to the reference signal generator 27 to change the slope of the reference signal Vslop to J-times the slope, and the count mode control signal UDC, the reset control signal CLR, the data holding control pulse HLDC, and the count clock control signal TH are supplied to the count execution unit 504 of the counter 254, so that the frequency dividing operation of each bit output in the execution unit 504 is changed at K-times the speed (preferably, K-times=J-times).

At the same time of changing the slope of the reference signal Vslop at J-times the slope, the flip-flops 510 are controlled to operate the counting operation (frequency dividing operation) at K-times the speed (preferably, at J-times the speed), but as far as errors (variations) are within the allowable range, it does not have to be exactly "at the same time" or an exact J-times multiplying coefficient. This is the same as that, a general technique allows an error in a setting value to be controlled as far as the error (variation) is within an allowable range.

However, fundamentally (in principle), in the A/D conversion processing for the signal component Vsig, multiplying coefficients and changing timings are necessary to be the same to obtain the digital data Dsig truly reflecting the signal component Vsig without a correction operation, even if the reference signal Vslop is changed before the signal level Ssig and the reference signal Vslop are matched.

The column processor 26 (particularly, the column A/D circuit 25) in the present embodiment performs the single-slope integration A/D conversion processing on each of a reset level (reset potential) and a signal level (signal potential). At this time, the reset potential is processed by either of the modes of the up-counting or the down-counting (the down-counting mode in the previous example), and the signal potential is processed by the other mode of the up-counting or the down-counting (the up-counting mode in the previous example), so that digital data of a difference value result between the two processing can be automatically obtained from the count processing result of the second processing.

In the single-slope integration A/D conversion system adopted in the present embodiment, the resolution of the A/D conversion, that is a size of 1 LSB, is determined by the count speed (that is, a frequency of a count clock) of the counter 254 during the period for changing the reference signal Vslop and the slope of the reference signal Vslop.

For example, assuming that a period required for counting one count by the counter 254 is a count cycle, an amount of the reference signal Vslop changed during the count cycle becomes the resolution of the A/D conversion (a width of 1 LSB). When the width of 1 LSB is small (narrow), the resolution of the A/D conversion is high, whereas when the width of 1 LSB is large (broad), the resolution of the A/D conversion is low.

Accordingly, for example, in terms of the count speed, the faster the speed is, the shorter the count cycle becomes. If the slope of the reference signal Vslop is the same, the amount of changing the reference signal Vslop during the count cycle, that is, the width of 1 LSB, is small, so that the resolution of the A/D conversion becomes high. When the slope of the reference signal Vslop is the same, if the count speed is faster, the counting value is advanced to the point at which the reference signal Vslop and a signal voltage on the vertical signal line 19 are matched, so that large digital data can be obtained and the gain of the A/D conversion becomes high. This means that the changing of the count speed is equivalent to adjusting the A/D conversion gain and to controlling a read-out gain.

Further, in terms of the slope of the reference signal Vslop, when the count speed is the same, the more the slope is, the smaller the amount of changing the reference signal Vslop during the period, that is, the width of 1 LSB, is and the higher the resolution of the A/D conversion becomes. Further, when the count speed is the same, the more the slope is, the more time it takes to match the reference signal Vslop and the signal voltage on the vertical signal line 19, so that large digital data can be obtained and the A/D conversion gain becomes high.

In other words, when the count speed is the same, the slope of the reference signal Vslop is changed so as to control the width of 1 LSB, the time at which the reference signal Vslop and the pixel signal voltage Vx on the vertical signal line 19 are matched is adjusted. As a result, even if the pixel signal voltage Vx on the vertical signal line 19 is the same, the counting value at the time of matching, that is, digital data of the signal voltage, is adjusted. This means that the changing of the slope of the reference signal Vslop is equivalent to adjusting the A/D conversion gain and to controlling a read-out gain.

With the use of the above, in the first embodiment, the frequency dividing speed is set at a higher speed during the addition processing (the reference signal Vslop is further changed depending on the weight value), and the weighted addition is performed.

At this time, in order to achieve a higher speed or a higher accuracy in the processing, it is necessary to make the speed of the column A/D circuit 25 faster. In the column A/D circuit 25, in order to achieve the higher speed, if the slope of the reference signal Vslop is not adjusted, the counter 254 is required to operate faster. In order to increase the speed of the counter, the count clock speed is to be increased. However, there may occur problems of increasing the power consumption or the like because a high-speed clock has to be passed through the column A/D circuit 25 and all column A/D circuits 25 in each column performs the counting operation at a high-speed.

In order to achieve the high-speed A/D conversion processing while solving these problems, it is conceivable that, without increasing the speed of the count clock faster, the gradation of the A/D conversion is made to be variable by adjusting the reference signal Vslop side so as to compress the count time and achieve the high-speed processing.

For example, as showing in FIG. 18A, it is known that, to a light signal output (sensor output) related to a light intensity output from the unit pixel 3, noise components such as a background noise (sensor noise floor) in the pixel signal generator 5 and an optical shot noise (photon shot noise) are added, in addition to a signal component (signal response) corresponding to a light particle.

When the sensor output is A/D converted, if the sensor output below the level of the sensor noise floor is A/D converted, it is meaningless since the signal component of the sensor output is buried under the sensor noise floor. Thus, the sensor outputs exceeding at least the sensor noise floor level are in a valid range for the A/D conversion.

The photon shot noise is changed with respect to a photoelectron corresponding to a light signal by ½ power. Accordingly, when a signal amount is small, there is less photon shot noise, so that the light signals can accurately be A/D converted by performing the A/D conversion with high resolution. However, when the signal amount is larger, the amount of the photon shot noises are considerably larger, so that, even if the light signals are A/D converted with high resolution, the light signals are not always accurately A/D converted due to the amount of the photon shot noises.

In the region where the amount of the light signal is large and much photon shot noises are contained, it is enough to have the resolution for the signal component from which the photon shot noises are removed. For this reason, if the resolution of the A/D conversion is lowered (in other words, if the quantization steps become more coarsely) in that range, there is no problem about the accuracy of the A/D conversion result. With the use of the above, it is conceivable that, when the signal amount becomes larger, by adjusting the accuracy of the A/D conversion, in other words, by adopting a method for adjusting the resolution or the quantization steps, the speed of the A/D conversion can be made faster in accordance with the signal amount.

For example, as shown in FIG. 18B, when the sensor output (a number of photoelectron corresponding to the signal component Vsig: the unit is "a.u.") is in between Level 0 to Level 1, the quantization step is set to 1 LSB, and the sensor output is between Level 1 to Level 2, the quantization step is set to 2 LSB, and similarly, gradually, in accordance with the levels which are going up, the quantization steps is made more coarse, that is, the resolution is made lower.

This means that if the sensor output level is up, the outputs of the lower-order bit flip-flops 510 constituting the count execution unit 504 in the counter 254 are ignored in the order of the sensor output level, and only the higher-order bit flip-flops 510 can be operated.

On the other hand, in order to gradually change the resolution in accordance with the sensor output level, as can be understood from the above description, the slope of the reference signal Vslop is gradually changed to steep slope, and a voltage change per unit time, that is, a voltage difference (mV/digit) per 1 count, is changed, as shown in FIG. 18C.

However, in the above case, because the A/D conversion gain becomes small, the linearity of the A/D conversion result with respect to the sensor output is impaired. For example, if a voltage value (conversion coefficient) per one digit before the change point in the A/D conversion period Trst for the reset level Srst and in the A/D conversion period Tsig for the signal level Ssig is α [V/digit], a voltage value (conversion coefficient) per one digit after the change point becomes α/J. Accordingly, if a count value D of the A/D conversion result is converted into a voltage value as it is, if a count value at the change point is "m", it becomes "α·m+(D−m)·α/J", which makes the size of the sensor output not accurate.

In order to avoid this, it is conceivable that a gain correction is added by making the count clock faster so as to offset a change degree of the slope of the reference signal Vslop, that is, the relation between the count value and the voltage value of ΔV/Δt is kept at a constant value. At this time, a technique of simply making the count clock faster cannot actually be adopted because the problems mentioned-above may occur.

Accordingly, if a mechanism is adopted in which the initial count clock is not changed in practice, and the counter value of the A/D conversion result is automatically corrected, for example, to "α·m+(D−m)·α/J·J" according to the slope of the reference signal Vslop, from a point of changing the slope, the count value becomes "α·m+(D−m)−α=α·D", so that a size of the sensor output can be obtained accurately. In the second embodiment, as the mechanism for automatic correction, a mechanism for changing the frequency dividing speed of the counter 254 is adopted. The detailed description is made below, in which the order of the addition is assumed to be the same as the processing shown in FIG. 13.

In the A/D conversion period Trst for the reset level Srst, the reset levels Srst_Iv and Srst_Jv of the unit pixel 3 are read out, and the counter 254 down-counts the reset levels Srst_Iv and Srst_Jv. At this time, all of the count clock control signals TH00 to TH11 are set to the inactive L.

Next, in the A/D conversion period Tsig for the signal level Ssig, the reference signal Vslop is changed as the same slope as that of the A/D conversion period Trst at the beginning, and the counter 254 starts the up-counting from each digital value Drst_Iv and Drst_Jv. At this time, all of the data holding control pulses HLDC00 to HLDC11 are set to the inactive L, and all of the count clock control signals TH00 to TH11 are set to the inactive L.

At a point R(t21_Iv), the slope of the reference signal Vslop is changed to J-times the slope (for example, twice the slope), and the frequency dividing operation of the flip-flop 510 before the point R is made to K-times the speed (preferably, K=J).

For example, during the processing for the first addition object row Iv, the slope of the reference signal Vslop is changed to twice the slope at the point R_Iv (t21_Iv), at the same time, the data holding control pulse HLDC00 to the data holding unit 512_00 is switched to the active H and the count clock control signal TH00 to the count clock switch 516_00 is switched to the active H.

At this time, the pixel signal voltage Vx_Iv in the row Iv on the vertical signal line 19 in a certain column is digitally converted into a counter value m0_Iv. A number of actual up-counting by the counter 254 is determined by the period between "t21_Iv-t20_Iv" and the cycle of the count clock, the counter value m0_Iv at the point R_Iv (t21_Iv) is determined since the up-counting is started from the negative value Drst_Iv.

Further, at this time, since the data holding control pulse HLDC00 is set to the active H, data recorded in the least significant bit flip-flop 510_00 is held. Practically, after the point R_Iv (t21_Iv), the least significant bit output is made invalid. Since the least significant bit output is made invalid after the point R_Iv (t21_Iv), the period after the point R_Iv (t21_Iv) becomes a low resolution period Tsig_L1Iv.

Further, at the same time, if the count clock control signal TH00 is switched to the active H, an input clock of the least significant bit (at 0-bit) flip-flop 510_00 is transferred to a clock terminal of the second stage (at 1-bit) flip-flop 510_01. By transferring the clock cycle of the least significant bit to the next bit, the frequency dividing operations of the rest of the higher-bit outputs are performed at twice the speed except for the least significant bit, the counter 254 starts the count up at twice the speed while making the quantization steps coarser than before.

For example, FIG. 20 is the diagram showing the output of each-bit flip-flop 510 when the count clock control signal TH00 and the slope of the reference signal Vslop are changed. Switching of the count clock control signal TH00 to the active H at the point R_Iv (t21_Iv) causes the count clock CIN supplied to the least significant bit flip-flop 510_00 to be transferred to the second stage flip-flop 510_01, so that the lower-order bit flip-flop 510 operates at a high-speed after the switching. However, since the least significant bit output becomes invalid, the quantization steps become coarser than before.

For example, if the cycle of the count output D00 of the first stage flip-flop 510_00 is 100 MHz before the count clock control signal TH00 is switched, the cycle of the count output D01 of the second stage flip-flop 510_01 is 50 MHz. In the contrast to the above, when the count clock control signal TH00 is switched to the H level, the cycle of the count output D01 of the second stage flip-flop 510_01 is 100 Hz, so that the frequency dividing operation in the higher-order bit flip-flop 510 is operated at twice the speed.

Further, as to the pixel signal voltage Vx_Iv, in the low resolution period Tsig_L1Iv after the point R_Iv (t21_Iv), when the signal level Ssig_Iv and the reference signal Vslop are matched (t22_Iv), the counter 254 stops, while holding a count value z0_Iv at the time of matching.

At this time, the slope of the reference signal Vslop becomes twice the slope before the point R_Iv (t21_Iv), and the higher-order bit flip-flops 510 in the counter 254 are also perform the frequency dividing operation at twice the speed. Accordingly, the relation between the counter value and the voltage value becomes 2ΔV/2Δt=ΔV/Δt, and the relation between the counter value and the voltage value ΔV/Δt is stabilized, which results in keeping the linearity of the A/D conversion result with respect to the sensor output. The final count value z0_Iv itself automatically becomes the digital data Dsig truly reflecting the signal component Vsig, therefore no correction by an external circuit is required.

After the A/D conversion period for the row Iv is completed, without resetting the counter 254, the read-out operation and the A/D conversion processing for the signal of the unit pixel 3 in the row Jv are successively performed, and the read-out operation similar to the processing for the row Iv is repeated.

At this time, the slope of the reference signal Vslop is made to be the same as that of the processing for the row Iv. The data holding control pulse HLDC_00 and the count clock control signal TH_00 are kept at the active H. In this manner, the slope of the reference signal Vslop is the same as that of the processing for the row Iv, and the higher-order bit flip-flops 510 in the counter 254 perform the frequency dividing operation at twice the speed, so that the relation between the counter value and the voltage value becomes 2ΔV/Δt. Accordingly, at the beginning of the processing for the row Jv, the pixel signal voltage Vx_Jv is processed with a double gain compared with the processing for the row Iv.

At the same time of changing the slope of the reference signal Vslop at twice the slope at the point R(t21_Jv), the data holding control pulse HLDC01 to the data holding unit 512_01 is switched to the active H and the count clock control signal TH01 to the count clock switch 516_01 is switched to the active H.

At this time, the pixel signal voltage Vx_Jv in the row J is digitally converted into a counter value m0_Jv. A number of actual up-counting by the counter 254 is determined by the period between "t21_Jv–t20_Jv" and the cycle of the count clock, and a counter value m0_Jv at the point R_Jv (t21_Jv) is determined since the up-counting is started from the negative value Drst_Jv.

Further, at this time, since the data holding control pulses HLDC00 and HLDC01 are at the active H, data of the least significant bit (at 0-bit) flip-flop 510_00 and the second stage (at 1-bit) flip-flop 510_01 are held. Practically, after the point R_Jv (t21_Jv), the least significant bit (0-bit) output and the second stage (1-bit) output are made invalid. Since each out put of 0-bit and 1-bit is made invalid after the point R_Jv (t21_Jv), the period after the point R_Jv (t21_IJ) becomes a further low resolution period Tsig_L1Iv.

Further, at the same time, if the count clock control signal TH00 becomes the active H, an input clock of the 1-bit flip-flop 510_01 is transferred to a clock terminal of a third stage (at 2-bit) flip-flop 510_02. By transferring the clock cycle to the next bit, the frequency dividing operations of the rest of the higher-order bit outputs except for the outputs of the 0-bit and 1-bit are performed at twice the speed of the previous operation performing twice the speed, that is, 4-times the speed, so that the counter 254 starts the count up at 4-times the speed while making the quantization steps coarser.

Further, as to the pixel signal voltage Vx_Jv, during the low resolution period Tsig_L1Jv after the point R_Jv (t21_Jv), when the signal level Ssig_Jv and the reference signal Vslop are matched (t22_Jv), the counter 254 stops while retaining a count value z0_Jv at the time of matching.

At this time, the slope of the reference signal Vslop becomes twice larger than the slope before the point R_Jv (t21_Jv), and the higher-order bit flip-flops 510 in the counter 254 also perform the frequency dividing operation at 4-times the speed. Accordingly, the relation between the counter value and the voltage value becomes $2\Delta V/2\Delta t=\Delta V/\Delta t$ and the relation between the counter value and the voltage value $\Delta V/\Delta t$ is stabilized, so that the linearity of the A/D conversion result with respect to the sensor output can be kept. The final count value z0_Jv itself automatically becomes the digital data Dsig truly reflecting the signal component Vsig, therefore it is unnecessary to be corrected by an external circuit.

After the A/D conversion period for the row Jv is completed, without resetting the counter 254, the read-out operation and the A/D conversion processing for the signal of the unit pixel 3 in the row Jv are successively performed, and the read-out operation similar for the row Jv is repeated.

At this time, the slope of the reference signal Vslop becomes twice larger as similar to after the point R_Iv (t21_Iv) in the row Iv, on the other hand, the higher-order bit flip-flops 510 in the counter 254 perform the frequency dividing operation at 4-times the speed. Accordingly, the relation between the counter value and the voltage value becomes $4\Delta V/2\Delta t=2\Delta V/\Delta t$, and the relation between the counter value and the voltage value is stabilized as before, so that the pixel signal voltage Vx_Jv is processed with a double gain compared with the processing for the row Iv.

As a result, for example, if a voltage value (conversion coefficient) per one digit before the change point R during the A/D conversion period Trst for the reset level Srst and during the A/D conversion period Tsig for the signal level Ssig is α [V/digit], a final count value to be held in the counter 254 is "αVsig_Iv+2α×Vsig_Jv", and the weighted addition is completed.

For example, assuming that, as shown as digital values in brackets on the line plot of the pixel signal voltage Vx in FIG. 19, both of the signal components Vsig_Iv and Vsig_Jv in the row Iv and the row Jv are 60, and both of the reset levels Srst_Iv and Srst_Jv thereof are 10 and then the double-weighted addition is performed. The counter value to be held at each timing becomes similar to that of the case shown in FIG. 9.

More specifically, in the A/D conversion for the signal level Ssig_Iv (signal component Vsig_Iv) in the row Iv, by performing the up-counting from the count value "−Drst_Iv" (=−10) obtained by the A/D conversion for the reset level Srst_Iv as a starting point, the count value to be held in the counter 254 after the processing becomes "−10+70=60= Dsig_Iv".

After that, in the A/D conversion for the row Jv, the down-counting for the reset level Srst_Jv is performed with the count value "60=Dsig_Iv" obtained by the A/D conversion in the row Iv as a starting point, the count value to be held in the counter 254 becomes "50−2×10=40." Further, the up-counting for the signal level Ssig_Jv is performed from this count value 40 as a starting point, and the count value to be held in the counter 254 after the processing becomes "40+2×70=180." This count value represents "Dsig_Iv+ 2·Dsig_Jv" obtained by adding the digital value Dsig_Iv of the signal component Vsig_Iv in the row Iv to twice the digital value Dsig_Jv of the signal component Vsig_Jv in the row Jv.

As can be understood from the above description, even the slope of the reference signal Vslop is changed during the A/D conversion processing in the row, if the frequency dividing speed is changed so as to offset the change in slope, the final counter value z, that is, the digital data Dsig of the signal component Vsig, is not affected by the change in slope, and if the signal component Vsig is the same, the final counter value z(=Dsig) is matched. It is unnecessary to correct the final counter value, and, it is of course unnecessary to have a function unit for holding the counter value m at the change point.

Since the slope of the reference signal Vslop is set to be larger after the change point R, the A/D conversion period can be shorten by the difference amount, so that the addition image can be obtained at a higher speed.

In the above description, explained is the case where the slope of the reference signal Vslop is set at twice the slope and the frequency dividing operation of the counter 254 is increased at twice the speed during the A/D conversion processing for a certain row. However, not limited to this case, there may be a case where the slope of the reference signal Vslop is changed in accordance with rising of a sensor output level, through several stages and the flip-flops 510 are controlled to perform the counting operation (dividing operation) at a higher speed. In this case, the quantization steps become further coarser.

For example, if the count execution unit 504 is configured as shown in FIGS. 4 and 5, in the processing for the row Iv, the slope of the reference signal Vslop is set to 4-times larger and the count clock control signal TH01 is set to the active H, thereby enabling the dividing operation for after the 2-bit of the counter 254 to be operated at a speed 4-times faster, as shown in FIG. 19. Further, if the slope of the reference signal Vslop is set to 8-times larger and the count clock control signal TH02 is set to the active H, thereby enabling the dividing operation for after the 3-bit of the counter 254 to be operated at a speed 8-times faster.

Similarly, the slope of the reference signal Vslop is set to 2^S-times (S is a positive integer; "^" is power), and the count clock control signal TH0T (T=S−1) is set to the active H, thereby enabling the dividing operation for after S-bit of the counter 254 to be operated at 2^S-times faster.

As described above, if the slope of the reference signal Vslop is changed through several stages (gradually changed to steep slope) depending on the size of the signal component Vsig (in the other words, the size of the photon shot noise), such as J1-times (=2-times), J2-times (=4-times), J3-times (=8-times) and so on, the period for full swing of the reference signal Vslop is further shortened, thereby enabling the A/D conversion to perform at a higher speed.

Further, the dividing operation of the counter is changed to operate at a higher speed through several stages, in accordance with the change in slope of the reference signal Vslop, such as K1-times (=2-times), K2-times (=4-times), K3-times (=8-times) and so on, and the lower-order data is made invalid, so that an accurate count value corresponding to the signal component Vsig is obtained as a final output regardless of the counter value at the point of changing of the reference signal Vslop. Since more lower-order bit data is handled as invalid, the quantization steps become further coarser and the resolution during the A/D conversion is further lowered, but in relation to the photon shot noise, the lower accuracy will not practically cause a problem in the A/D conversion result.

Since the time required for the comparison processing is shortened by setting the slope of the reference signal Vslop to be steeper (larger), a number of the operation of the counter can be reduced, so that the high-speed A/D conversion can be implemented, that is, the A/D conversion period can be shortened. To the contrary, if the A/D conversion period is the same, a number of the counter operation can be reduced, so that the lower power consumption can be achieved.

Further, when the dividing operation of the counter is made faster through several stages, if the lower-order bit outputs are sequentially made invalid and only the frequency dividing operation of the rest of the higher-order bit outputs are made to operate at a high speed to perform the quantization steps more coarsely, the initial count clock for controlling the higher-order bit outputs may be kept at the same speed as the count clock CIN. Although the resolution of the A/D conversion is lowered, the entire counter practically operates according to the original count clock CIN, the power consumption is thus not increased. Further, by using the photon shot noise, the quantization steps become coarser to lower the A/D conversion accuracy as the signal component Vsig becomes larger, so that the practical A/D conversion accuracy is not seriously undermining the A/D conversion accuracy.

The point R at which the slope of the reference signal Vslop is changed is variable and the mode switching is performed depending on the purpose of asking for whether the higher accuracy or the faster speed, on the basis of the relation between the photon shot noise and the quantization noise.

Further, in the previous example, when the slope of the reference signal Vslop is set to 2^S-times, it shows the case of changing S by one, such as 1, 2, 3, however, the present invention is not limited to this case, any change step is possible, for example, 2, 4, and so on. In this relation, the mode switching is performed depending on the purpose of asking for whether the higher accuracy or the faster speed, on the basis of the relation between the photon shot noise and the quantization noise.

When the weighted addition is performed, by using the photon shot noise, a number of operation of the counter can be reduced without seriously undermining the A/D conversion accuracy, so that the high-speed A/D conversion can be implemented during the weighted addition processing. To the contrary, if the A/D conversion period is the same, and a number of the counter operation can be reduced, so that the lower power consumption can be achieved.

[Resolution Improving Method for Addition Image: Third Embodiment]

FIG. 20 is the diagram illustrating the third embodiment of the method for solving degradation of the resolution in the digital addition processing in the vertical direction by the counter 254 and the digital addition processing in the horizontal direction by the digital arithmetic unit 29.

In the third embodiment, it is not the case where the weighted addition processing for the two rows and two columns but the case where the weighted addition processing for three rows and three columns. The weighted addition processing for three columns in the column direction is not indispensable.

When the addition processing performed on three pixels, for example, the weight for three pixels may be different from each other or the weight for only one pixel is different from that for other two pixels. In the latter case, for example, the relation between them is set in a ratio of 1 to n to 1 (n is a value more than 1). Preferably, n is a positive integer or an arbitrary value more than 2, such as 2, 3, 4, . . . and so on, and more preferably, a value is a power of two, such as 2, 4, 8, . . . and so on. A method for setting these weight values is similar to that in the weighted addition for two pixels.

For example, as shown in FIGS. 22A and 22B, the weighted addition operation for the three rows and three columns can be achieved by combining the weighted addition processing in the vertical direction in which the addition processing is performed on a unit of three rows in the vertical direction by the column A/D circuit 25 and the weighted addition processing in the horizontal direction in which the addition processing is performed on a unit of three columns by the digital arithmetic unit 29.

As a usage of the weighted addition processing for the three rows and three columns, for example, if coefficients of all processing object pixel signals are set to the same value, it will be a smoothing filter processing as shown in FIG. 20A, but if a weight value is set so that a coefficient of the center pixel is set to be larger than that of peripheral pixels, the weighted addition processing for emphasizing the center pixel can be achieved as shown in FIG. 20B.

In such a case, for example, the weighted addition in the ratio of 1 to 2 to 1 is possible, and the centroid position after the addition can be emphasized when pixels are read out by interlace scanning, so that the images with high resolution can be obtained.

The relation between the weighted addition in the ratio of 1 to 2 to 1 and the point at which the spatial positions after the addition are changed is as follows. More specifically, in the weighted addition in the ratio of 1 to 2 to 1, the spatial positions after the addition are not changed, similarly to the weighted addition in the ratio of 1 to 1 to 1, but in terms of emphasizing the center position after the addition, the image with high resolution can be obtained as in the processing in which the spatial positions after the addition are changed.

[Imaging Apparatus]

Figure 23:
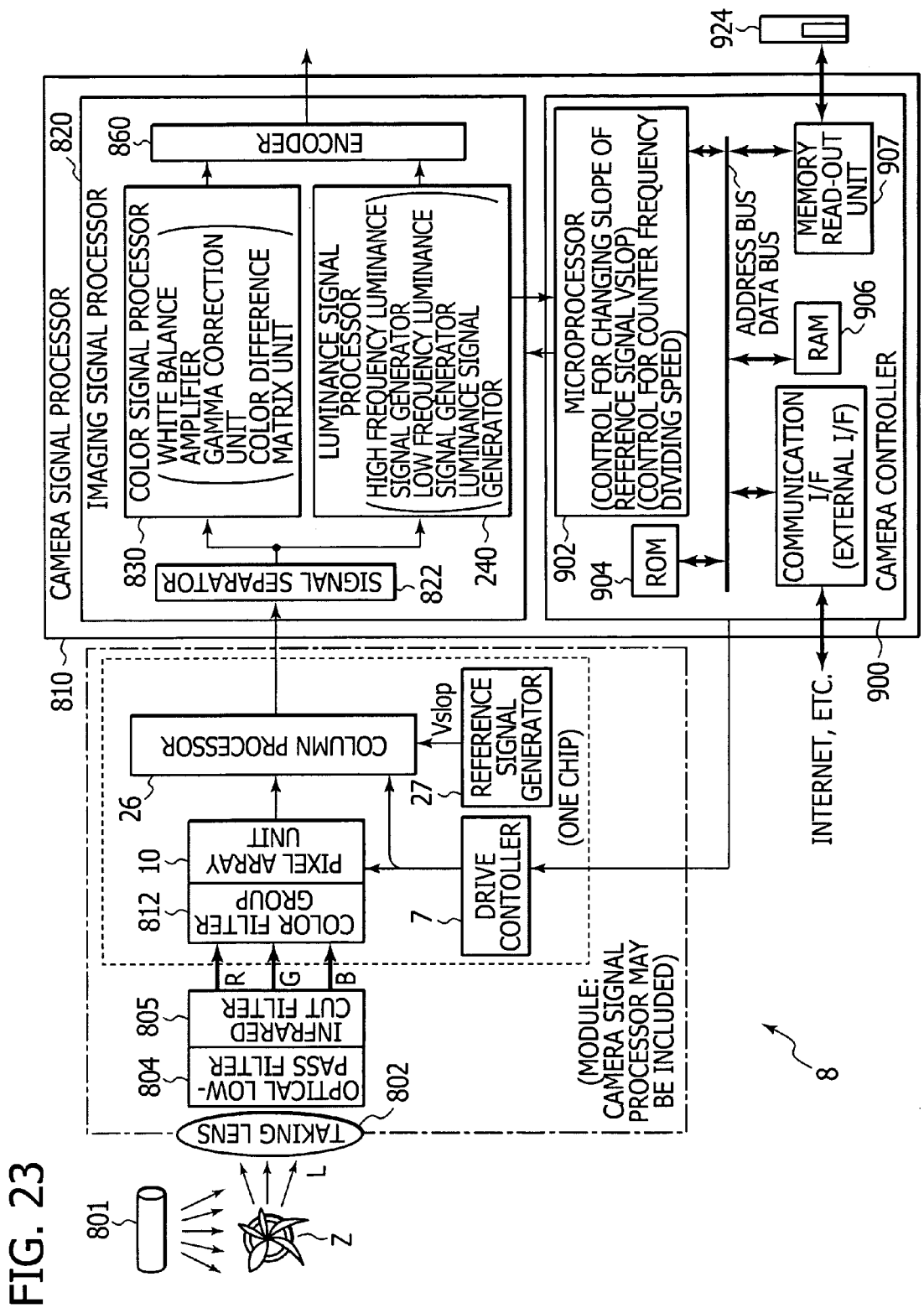
FIG. 23 is a diagram showing a schematic configuration of an imaging apparatus utilizing a mechanism similar to that of the solid-state imaging device.

FIG. 23 shows a schematic configuration of an imaging apparatus which is an example of physical information acquisition device utilizing a mechanism similar to the above-described solid-state imaging device 1. An imaging apparatus 8 is an imaging apparatus for capturing visible light color images.

The mechanism of the above-described solid-state imaging device 1 is not only for a solid-state imaging device but also applicable to an imaging apparatus. In this case, as an imaging apparatus, it is possible to implement a mechanism for obtaining the high resolution by changing the spatial positions after the addition by the weighted addition.

At this time, the control of making the frequency dividing speed faster of the counter to set the weight, or the control of the slope of the reference signal Vslop can be arbitrarily assigned by setting data to an external main controller data, which instructs the switching mode to the communication/timing controller 20.

Specifically, the imaging apparatus 8 includes: a taking lens 802, an optical low-pass filter 804, a color filter group 812, a pixel array unit 10, a drive controller 7, a column processor 26, a reference signal generator 27 and a camera signal processor 810. The taking lens 802 guides a light L carrying an image of an object Z existing under an illuminating device, such as a fluorescent light, to an imaging apparatus side and products the image of the object Z. The color filter group 812 has, for example, color filters of R, G, B arranged in the Bayer arrangement. The drive controller 7 drives the pixel array unit 10. The column processor 26 performs processing a CDS processing or an A/D conversion processing on a pixel signal output from the pixel array unit 10. The reference signal generator 27 supplies a reference signal Vslop to the column processor 26. The camera signal processor 810 performs processing an image signal output from the column processor 26.

The optical low-pass filter 804 is used for blocking a frequency component higher than the Nyquist frequency to avoid aliasing. Further, an infrared cut filter 805 for reducing an infrared component may be provided with the optical low-pass filter 804. This is the same as a general imaging apparatus.

The camera signal processor 810 provided at the subsequent stage of the column processor 26 has an imaging signal processor 820 and a camera controller 900 that functions as a main controller for controlling the whole imaging apparatus 8.

The imaging signal processor 820 has a signal separator 822 and a color signal processor 830. The signal separator 822 has a primary color separation function for separating a digital imaging signal supplied from an A/D conversion function unit in the column processor 26 to primary color signals of R (red), G (green), and B (blue), when a color filter other than a primary color filter is used. The color signal processor 830 for signal processing for a color signal C on the basis of the primary color signals R, G, B separated by the signal separator 822.

Further, the imaging signal processor 820 has: a luminance signal processor 840 for signal processing with respect to a luminance signal Y on the basis of the primary color signals R, G, B separated by the signal separator 822; and an encoder 860 for generating a video signal VD on the basis of the luminance signal Y/color signal C.

The color signal processor 830 has, although not illustrate, for example, a white balance amplifier, a gamma correction unit, a color difference matrix unit. The white balance amplifier adjusts (white balance adjustment) a gain of the primary color signal supplied from the primary color separation function unit in the signal separator 822 on the basis of a gain signal supplied from a not-shown white balance controller, and supplies the adjusted gain to the gamma correction unit and the luminance signal processor 840.

Based on the primary color signal whose white balance is adjusted, the gamma correction ($\gamma$) is performed for reproducing an accurate color, and a gamma-corrected output signal for each color R, G, B are input to the color difference matrix unit. The color difference matrix unit performs color difference matrix processing and inputs the obtained color difference signal R-Y, B-Y to the encoder 860.

The luminance signal processor 840 has, although not illustrated, for example, a high frequency luminance signal generator, a low frequency luminance signal generator and a luminance signal generator. The high frequency luminance signal generator generates a luminance signal YH containing a relatively high frequency component depending on the primary color signal supplied from the primary color separation function unit in the signal separator 82. The low frequency luminance signal generator generates a luminance signal YL containing only a relatively low frequency component depending on the primary color signal whose white balance is adjusted supplied from the white balance amplifier. The luminance signal generator generates a luminance signal Y depending on two kinds of luminance signals YH, YL, and supplies the luminance signal Y to the encoder 860.

The encoder 860 digitally modulates the color difference signals R-Y, B-Y using a digital signal corresponding to a color signal sub-carrier wave and combines them to the luminance signal Y generated by the luminance signal processor 840, and converts them into a digital video signal VD(=Y+ S+C; S is a synchronization signal, C is a chroma signal).

The digital video signal VD output from the encoder 860 is supplied to a not-shown camera signal output unit at a further subsequent stage, then used as a monitor output or data record in a recording media. At this time, the digital video signal VD is converted into an analog video signal V through D/A conversion, if necessary.

The camera controller 900 in the present embodiment has: a microprocessor 902 which is the central core of the electric computer, represented by a central processing unit (CPU), in which functions of operation and control performed by a computer are integrated on an ultra-small sized integrated circuit; a read only memory (ROM) 904 served as a memory dedicated for reading out; a random access memory (RAM) 906 which is an example of a volatile memory and available for writing and reading out as needed basis; and other not-shown peripheral members. The microprocessor 902, the ROM 904, and the RAM 906 are also collectively-referred to as a microcomputer (microcomputer).

In the above, a "volatile memory" means a memory device that erases memory contents when power of an apparatus is turned off. On the other hand, a "nonvolatile memory" means a memory device that holds memory contents even when a main power of an apparatus is turned off. As a memory device, not only a nonvolatile semiconductor memory device but also any memory device may be used as far as they can keep holding memory contents. Alternatively, besides nonvolatile semiconductor memories, those configured to be nonvolatile by providing a back-up power source may be used.

Further, the memory is not limited to be formed of a semiconductor memory device, but may be configured by using media, such as a magnetic disk, an optical disc. For example, a hard disk drive can be used as a nonvolatile memory. Further, a configuration can be used as a nonvolatile memory, in which information is read out from a recording medium such as a CD-ROM.

The camera controller 900 controls the whole system. In particular, in the above-mentioned processing for achieving the high-speed A/D conversion processing, the camera controller 900 has a function for adjusting on/off timings of various control pulses for the control of slope change of the reference signal Vslop in the reference signal generator 27 and for the control of frequency dividing speed in the counter 254.

In the ROM 904, control programs of the camera controller 900 are stored, particularly in the present example, programs for setting on/off timings of various control pulses by the camera controller 900 are stored.

In the RAM 906, data for performing various processing by the camera controller 900 is stored.

Further, the camera controller 900 is configured to be capable of having recording media 924 such as a memory card inserted or removed, and to connecting to a communication network such as the internet. For example, the camera controller 900 has a memory read-out unit 907 and a communication I/F (interface) 908, in addition to the microprocessor 902, the ROM 904, and the RAM 906.

The recording medium 924 is used for, storing data, such as program data causing the microprocessor 902 to perform software processing, and various setting values, such as a flux range of photometric data DL and exposure control processing (including an electric shutter control) based on luminance system signals supplied from the luminance signal processor 840, and on/off timings of the various control pulses for the control of slope change of the reference signal Vslop in the reference signal generator 27 and the control of frequency dividing speed in the counter 254.

The memory read-out unit 907 stores (installs) data read out from the recording medium 924 to the RAM 906. The communication I/F 908 connects and passes communication data between the communication network, such as the Internet.

In such imaging apparatus 8, the drive controller 7 and the column processor 26 are shown in a module separated from the pixel array unit 10. However, needless to say, as described in the above with regard to the solid-state imaging device 1, it is possible to use a one-chip solid-state imaging device 1 in which the drive controller 7 and the column processor 26 are integrally formed on the same semiconductor substrate where the pixel array unit 10 is also mounted.

In the drawing, the imaging apparatus 8 has the optical system including the taking lens 802, the optical low-pass filter 804, or the infrared cut filter 805 in addition to the pixel array unit 10, the drive controller 7, the column processor 26, the reference signal generator 27, and the camera signal processor 810, which is preferable to form a module having imaging function and including such members as a package.

The above-described solid-state imaging device 1 may be provided as the module having the imaging function, as shown in the drawing, which includes the pixel array unit 10 (imaging unit) and the signal processor (except for the camera signal processing unit at the subsequent stage of the column processor 26) closely related with the pixel array unit 10 side including the column processor 26 provided with the A/D conversion function and the difference value (CDS) processing function, as a package. The whole imaging apparatus 8 may be configured by providing the camera signal processor 810 as the rest of the signal processor at the subsequent stage of the module-form solid-state imaging device 1.

Alternatively, although it is not shown, the whole imaging apparatus 8 may be configured by also providing the camera signal processor 810 into the module-form solid-state imaging device 1 having the imaging function, in which the pixel array unit 10 and the optical system such as the taking lens 802 are packaged together.

Further, as a module in the solid-state imaging device 1, the camera signal processor 810 corresponding to the camera signal processor 200 may be included. In this case, practically, it is possible to consider that the solid-state imaging device 1 and the imaging apparatus 8 are the same.

Such imaging apparatus 8 is provided as a mobile device for performing "imaging", for example, a camera or mobile equipment having an imaging function. In the present specification, "imaging" means not only for capturing normal images by a camera but also fingerprint detection in a broad sense.

The imaging apparatus 8 configured as above includes all functions of the above-mentioned solid-state imaging device 1, and the basic configuration and operations are made to be the same as the above-mentioned solid-state imaging device 1. Accordingly, in the imaging apparatus 8, since the weighted addition can be performed so as to change the spatial positions of pixels after the addition, it is possible to achieve a mechanism for obtaining the higher resolution than the case of performing the simple addition in which all coefficients are uniform.

For example, programs causing a computer to execute the above-mentioned processing are distributed using the recording medium 924 such as a flash memory, an IC card, or a nonvolatile semiconductor memory card such as a miniature card. Further, the programs may be downloaded or updated from a server through the communication network such as the Internet.

It is possible to store part of the processing or all functions of the solid-state imaging device 1 described in the embodiments (particularly, the function related to the processing for implementing the high-speed A/D conversion in which the slope change control of the reference signal Vslop and the speed change control of the counter frequency dividing operation are performed in conjunction each other) in an IC card or a semiconductor memory such as a miniature card, as an example of the recording medium 924. Accordingly, it is possible to provide the programs or a recording medium storing the programs therein. For example, a program for implementing the high-speed A/D conversion in which the slope change control of the reference signal Vslop and the speed change control of the counter frequency dividing operation are performed in conjunction each other, that is, software to be installed in the RAM 906 or the like, has a control pulse setting function for implementing the high-speed A/D conversion as software, similarly to the processing for implementing the high-speed A/D conversion described in the description of the solid-state imaging device 1.

The software is read out by the RAM 906 and executed by the microprocessor 902. For example, the microprocessor 902 performs control pulse setting processing on the basis of the program stored in the ROM 904 and the RAM 906, which are examples of recording medium, to control the operation for selecting rows or columns to be added, the adjustment of the counter frequency dividing speed and the adjustment (change) of the slope of the reference signal Vslop in conjunction each other. Thus, it is possible to achieve a function, as software, for changing the spatial positions of pixels after the addition so as to obtain images with high resolution, compared with the case of performing the simple addition in which all coefficients are uniform.

According to an embodiment of the present invention, since the weight values can be appropriately set in conjunction with the selection operation for selecting the addition object pixel, the pixel positions after the addition can be adjusted by setting the appropriate weight values so as to minimize the degradation of the resolution. As a result, it is possible to obtain an addition image with high resolution.

It should be understood by those skilled in the art that various modifications, combinations, sub-combinations and alterations may occur depending on design requirements and other factors insofar as they are within the scope of the appended claims or the equivalents thereof.

CROSS REFERENCES TO RELATED APPLICATIONS

The present document contains subject matter related to Japanese Patent Applications JP 2007-008104 and JP 2007-291467 filed in the Japanese Patent Office on Jan. 17, 2007 and Nov. 9, 2007, respectively, the entire contents of which being incorporated herein by reference.

What is claimed is:

1. A solid-state imaging device comprising:
    a second row of unit pixels between a first row of the unit pixels and a third row of the unit pixels, each of the rows extending along a horizontal direction;
    a second column of the unit pixels between a first column of the unit pixels and a third column of the unit pixels, each of the columns extending along a vertical direction;
    a column processor configured to convert analog signals from each pixel within said first row of the unit pixels into a first row of digital data and to convert analog signals from each pixel within said third row of the unit pixels into a third row of digital data;
    a digital arithmetic unit configured to produce a center row of digital data by applying a weight value during a weighted row addition, said weight value being applied to said first row of digital data or said third row of digital data,
    wherein said first row of digital data is added to said third row of digital data during said weighted row addition, a spatial position of the center row being shifted from said second row of the unit pixels in said vertical direction by a ratio of the weight value.

2. The solid-state imaging device according to claim 1, wherein said weight value has a positive integer value of two or more.

3. The solid-state imaging device according to claim 1, wherein said spatial position of the center row is shifted in the vertical direction toward said first row of digital data when said weight value is applied to said first row of digital data.

4. The solid-state imaging device according to claim 1, wherein said spatial position of the center row is shifted in the vertical direction toward said third row of digital data when said weight value is applied to said third row of digital data.

5. The solid-state imaging device according to claim 1, wherein said third row of the unit pixels is between a fourth row of the unit pixels and said second row of the unit pixels, said third column of the unit pixels being between a fourth column of the unit pixels and said second column of the unit pixels.

6. The solid-state imaging device according to claim 1, wherein said weight value is applied to a first column component or a third column component, said first column component being said digital data in said center row from the first column and said third column component being said digital data in said center row from the third column.

7. The solid-state imaging device according to claim 6, wherein said digital arithmetic unit is configured to produce a center pixel by applying said weight value during a weighted column addition.

8. The solid-state imaging device according to claim 7, wherein said first column component is added to said third column component during said weighted column addition, a spatial position of the center pixel being shifted from said second column in said horizontal direction by said ratio of the weight value.

9. The solid-state imaging device according to claim 8, wherein said spatial position of the center pixel is shifted in the horizontal direction toward said first column when said weight value is applied to said first column component.

10. The solid-state imaging device according to claim 8, wherein said spatial position of the center pixel is shifted in the horizontal direction toward said third column when said weight value is applied to said third column component.

11. The solid-state imaging device according to claim 1, wherein said center row is produced by adding said first row of digital data to said third row of digital data during said weighted row addition.

* * * * *